US012720061B2

(12) United States Patent
Chen et al.

(10) Patent No.: US 12,720,061 B2
(45) Date of Patent: Aug. 25, 2026

(54) METHODS AND DEVICES FOR CANDIDATE DERIVATION FOR AFFINE MERGE MODE IN VIDEO CODING

(71) Applicant: BEIJING DAJIA INTERNET INFORMATION TECHNOLOGY CO., LTD., Beijing (CN)

(72) Inventors: Wei Chen, San Diego, CA (US); Xiaoyu Xiu, San Diego, CA (US); Yi-Wen Chen, San Diego, CA (US); Hong-Jheng Jhu, San Diego, CA (US); Che-Wei Kuo, San Diego, CA (US); Ning Yan, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/677,817

(22) Filed: May 29, 2024

(65) Prior Publication Data

US 2024/0314318 A1 Sep. 19, 2024

Related U.S. Application Data

(63) Continuation of application No. PCT/US2022/052952, filed on Dec. 15, 2022.

(Continued)

(51) Int. Cl.

*H04N 19/129* (2014.01)
*H04N 19/105* (2014.01)

(Continued)

(52) U.S. Cl.

CPC ......... *H04N 19/129* (2014.11); *H04N 19/105* (2014.11); *H04N 19/139* (2014.11);

(Continued)

(58) Field of Classification Search

CPC .. H04N 19/105; H04N 19/129; H04N 19/139; H04N 19/159; H04N 19/176; H04N 19/42; H04N 19/463; H04N 19/52

See application file for complete search history.

(56) References Cited

U.S. PATENT DOCUMENTS 11,172,196 B2 * 11/2021 Zhang .................. H04N 19/577
11,595,683 B2 * 2/2023 Zhang .................... H04N 19/70

(Continued)

FOREIGN PATENT DOCUMENTS

JP 2020523853 A 8/2020
JP 2020145484 A 9/2020
KR 20190134521 A 12/2019

OTHER PUBLICATIONS

First Office Action issued to Japanese Application No. 2024-526726 dated May 9, 2025, (4p).

(Continued)

*Primary Examiner* — Jeremiah C Hallenbeck-Huber
(74) *Attorney, Agent, or Firm* — Arch & Lake LLP

(57) ABSTRACT

A method of video decoding, apparatuses and non-transitory computer-readable storage media thereof are provided. The method of video decoding includes obtaining a first parameter based on a first neighbor block of a current block; obtaining a second parameter based on the first neighbor block and/or a second neighbor block of the current block; constructing an affine model using the first parameter and the second parameter; and obtaining a control point motion vector (CPMV) for the current block based on the affine model. The first neighbor block and the second neighbor (Continued)

block are obtained from a plurality of neighbor blocks to the current block based on at least one scanning area and at least one scanning distance. The first neighbor block and the second neighbor block are obtained by scanning the at least one scanning area at the at least one scanning distance.

20 Claims, 26 Drawing Sheets

Related U.S. Application Data

(60) Provisional application No. 63/290,638, filed on Dec. 16, 2021.

(51) Int. Cl.
*H04N 19/139* (2014.01)
*H04N 19/159* (2014.01)
*H04N 19/176* (2014.01)
*H04N 19/42* (2014.01)
*H04N 19/463* (2014.01)
*H04N 19/52* (2014.01)

(52) U.S. Cl.
CPC ......... *H04N 19/159* (2014.11); *H04N 19/176* (2014.11); *H04N 19/42* (2014.11); *H04N 19/463* (2014.11); *H04N 19/52* (2014.11)

(56) References Cited

U.S. PATENT DOCUMENTS

| | | | | |
|---|---|---|---|---|
| 2020/0221116 | A1* | 7/2020 | Chen | H04N 19/70 |
| 2020/0359049 | A1* | 11/2020 | Zhao | H04N 19/43 |
| 2020/0404253 | A1 | 12/2020 | Chen et al. | |
| 2020/0404302 | A1* | 12/2020 | Heo | H04N 19/132 |
| 2021/0092427 | A1 | 3/2021 | Chen et al. | |
| 2021/0127129 | A1* | 4/2021 | Zhang | H04N 19/96 |
| 2021/0195234 | A1* | 6/2021 | Zhang | H04N 19/70 |
| 2021/0211646 | A1* | 7/2021 | Lee | H04N 19/96 |
| 2021/0211704 | A1 | 7/2021 | Lee | |
| 2021/0258603 | A1* | 8/2021 | Lee | H04N 19/184 |
| 2021/0344969 | A1* | 11/2021 | Zhang | H04N 19/159 |
| 2021/0385483 | A1 | 12/2021 | Liu et al. | |
| 2022/0303526 | A1* | 9/2022 | Urban | H04N 19/105 |

OTHER PUBLICATIONS

International Search Report issued in Application No. PCT/US2022/052952 dated Apr. 18, 2023, (3p).

The extended European Search Report of EP Application No. 22908420.7 dated Nov. 5, 2025, (12p).

Kwai Inc., Wei Chen et al., "AHG12: Non-adjacent spatial neighbors for affine merge mode", Joint Video Experts Team (JVET) of ITU-T SG 16 WP 3 and ISO/IEC JTC 1/SC 29 24th Meeting, by teleconference, Oct. 6-15, 2021, JVET- X0151-v2, (4p).

First Office Action of the counterpart Korean application No. 10-2024-7018793, Official mailing date: Mar. 18, 2026, (10p).

First Office Action issued to Indian Application No. 202447043996 dated Jun. 5, 2026, (8p).

* cited by examiner

Figure 8:
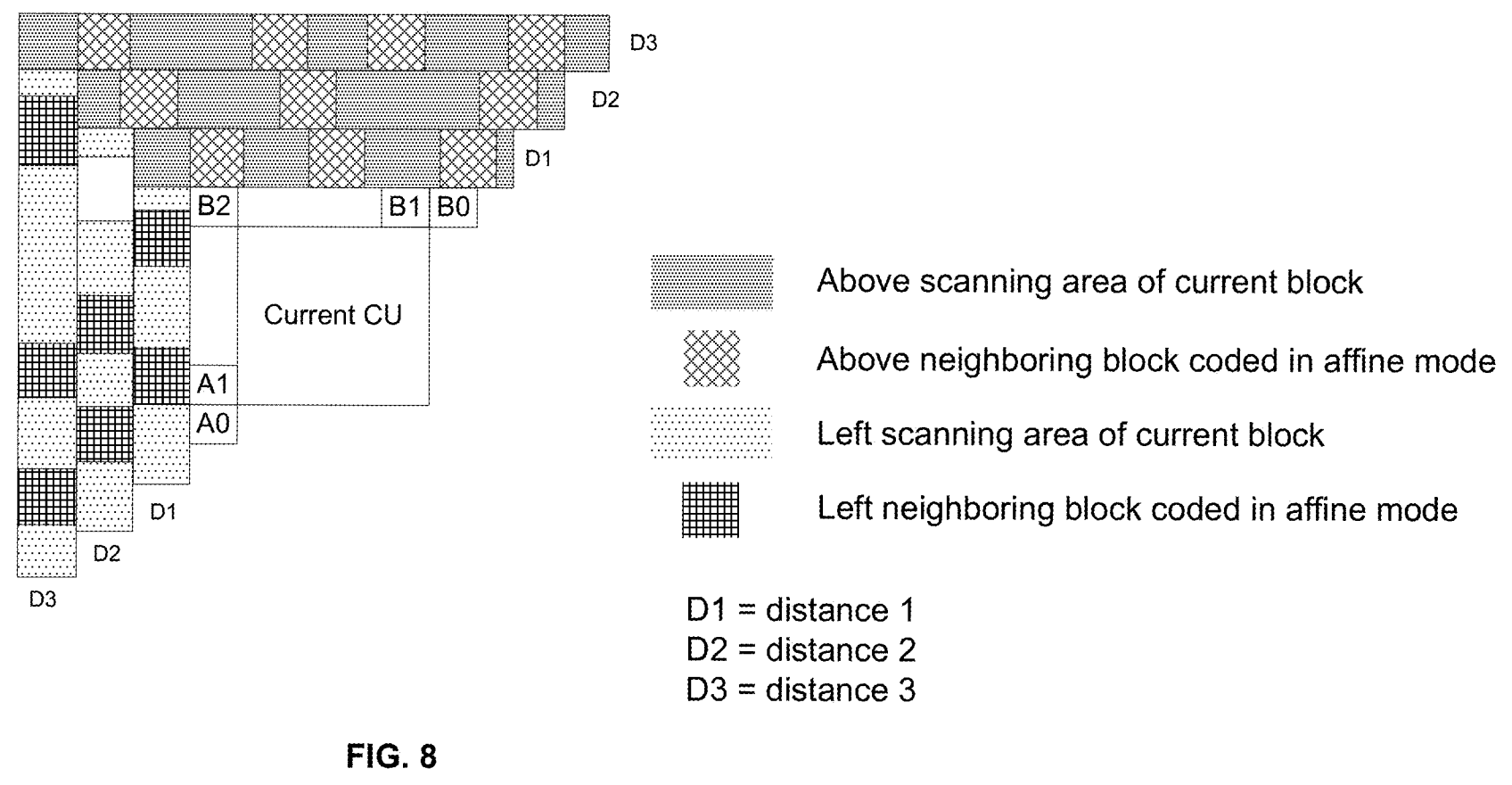

D3
D2
D1
B0
B1
Current CU
B2
A1
A0
D1
D2
D3

Above scanning area of current block
Above neighboring block coded in affine mode
Left scanning area of current block
Left neighboring block coded in affine mode D1 = distance 1
D2 = distance 2
D3 = distance 3

Current CU

C

Combined scanning

Adjacent 4x4 motion field

Non-adjacent 4x4 motion field

Scanning direction 1306
1305
Cur
1307
1308
1305 non-adjacent neighbor blocks on the left side
1306 non-adjacent neighbor blocks on the above side
Cur
1307 Current block Scanning positions of non-adjacent neighbor blocks Scanning positions of adjacent neighbor blocks Scanning positions of non-adjacent neighbor blocks Scanning positions of adjacent neighbor blocks

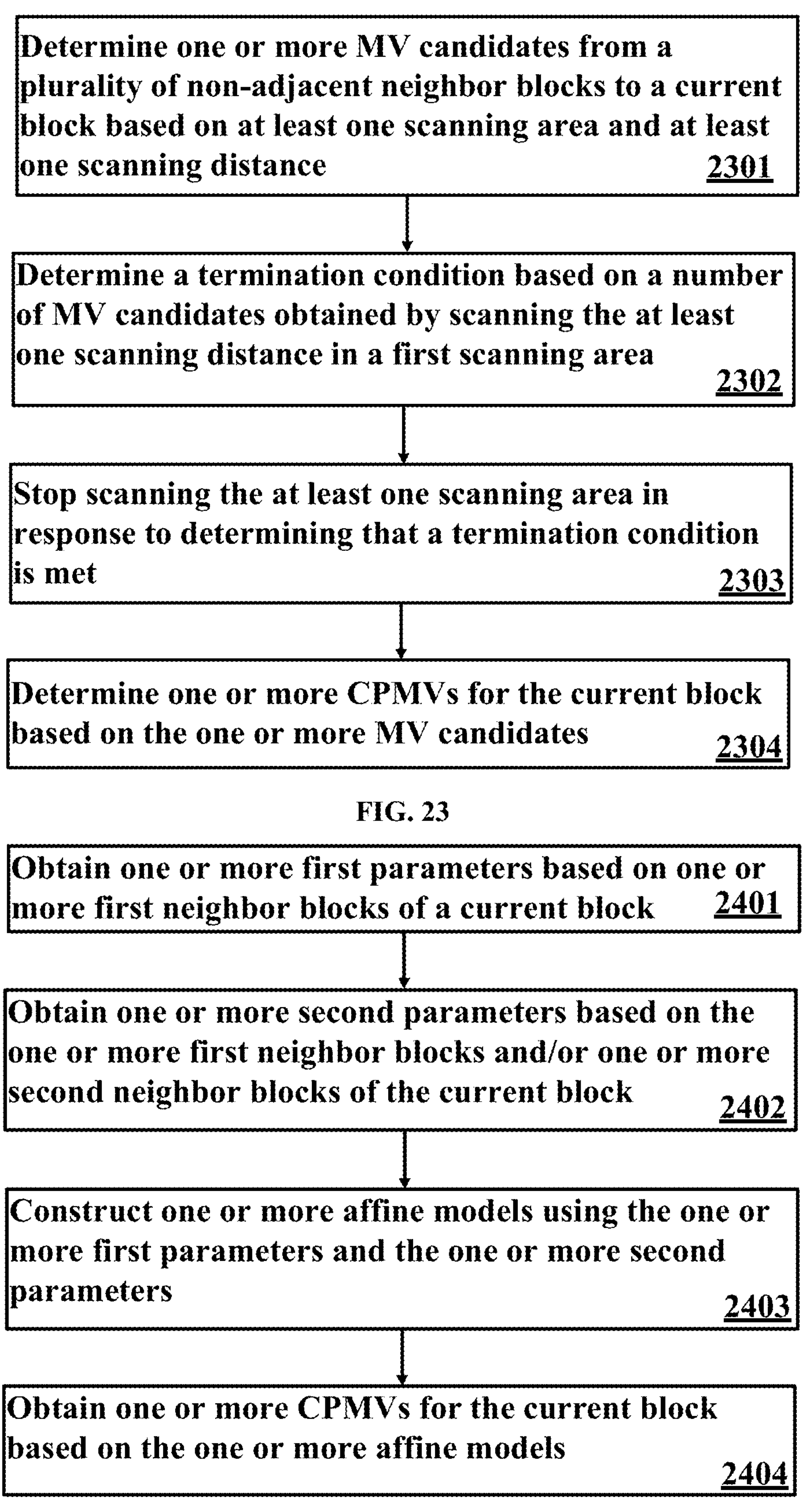
Determine one or more MV candidates from a plurality of non-adjacent neighbor blocks to a current block based on at least one scanning area and at least one scanning distance 2301
Determine a termination condition based on a number of MV candidates obtained by scanning the at least one scanning distance in a first scanning area 2302
Stop scanning the at least one scanning area in response to determining that a termination condition is met 2303
Determine one or more CPMVs for the current block based on the one or more MV candidates 2304
FIG. 23
Obtain one or more first parameters based on one or more first neighbor blocks of a current block 2401
Obtain one or more second parameters based on the one or more first neighbor blocks and/or one or more second neighbor blocks of the current block 2402
Construct one or more affine models using the one or more first parameters and the one or more second parameters 2403
Obtain one or more CPMVs for the current block based on the one or more affine models 2404
FIG. 24

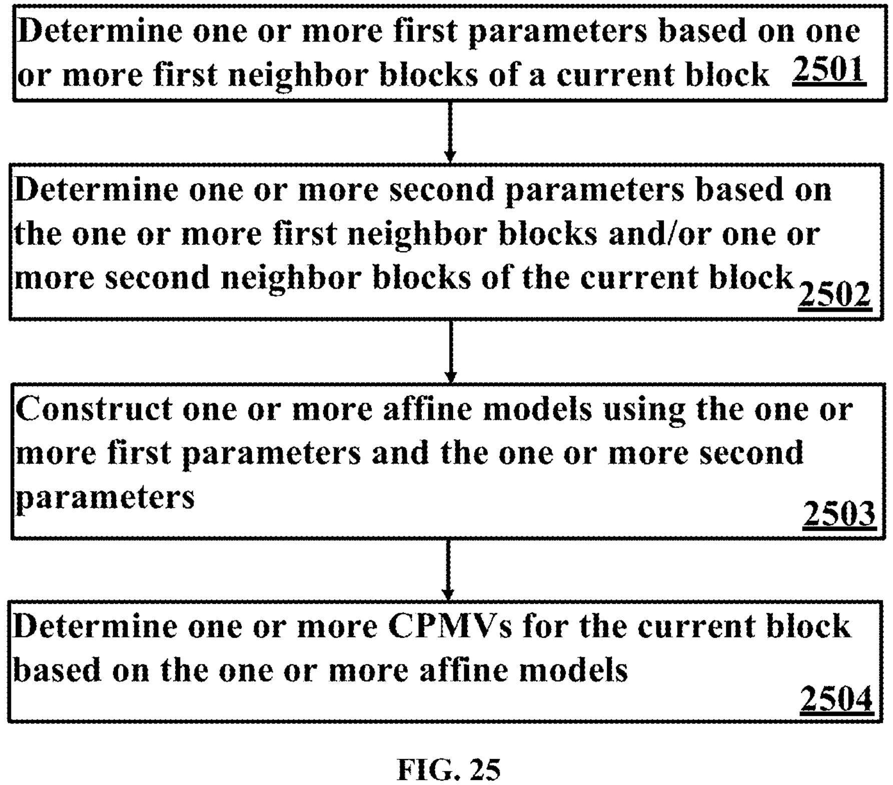

FIG. 25

Obtain one or more MV candidates from one or more candidate lists according to a pre-determined order, where the one or more candidate lists include an affine AMVP candidate list, a regular merge candidate list, and an affine merge candidate list, and the one or more MV candidates are from a plurality of neighbor blocks to a current block 2601

Obtain one or more CPMVs for the current block based on the one or more MV candidates 2602

FIG. 26

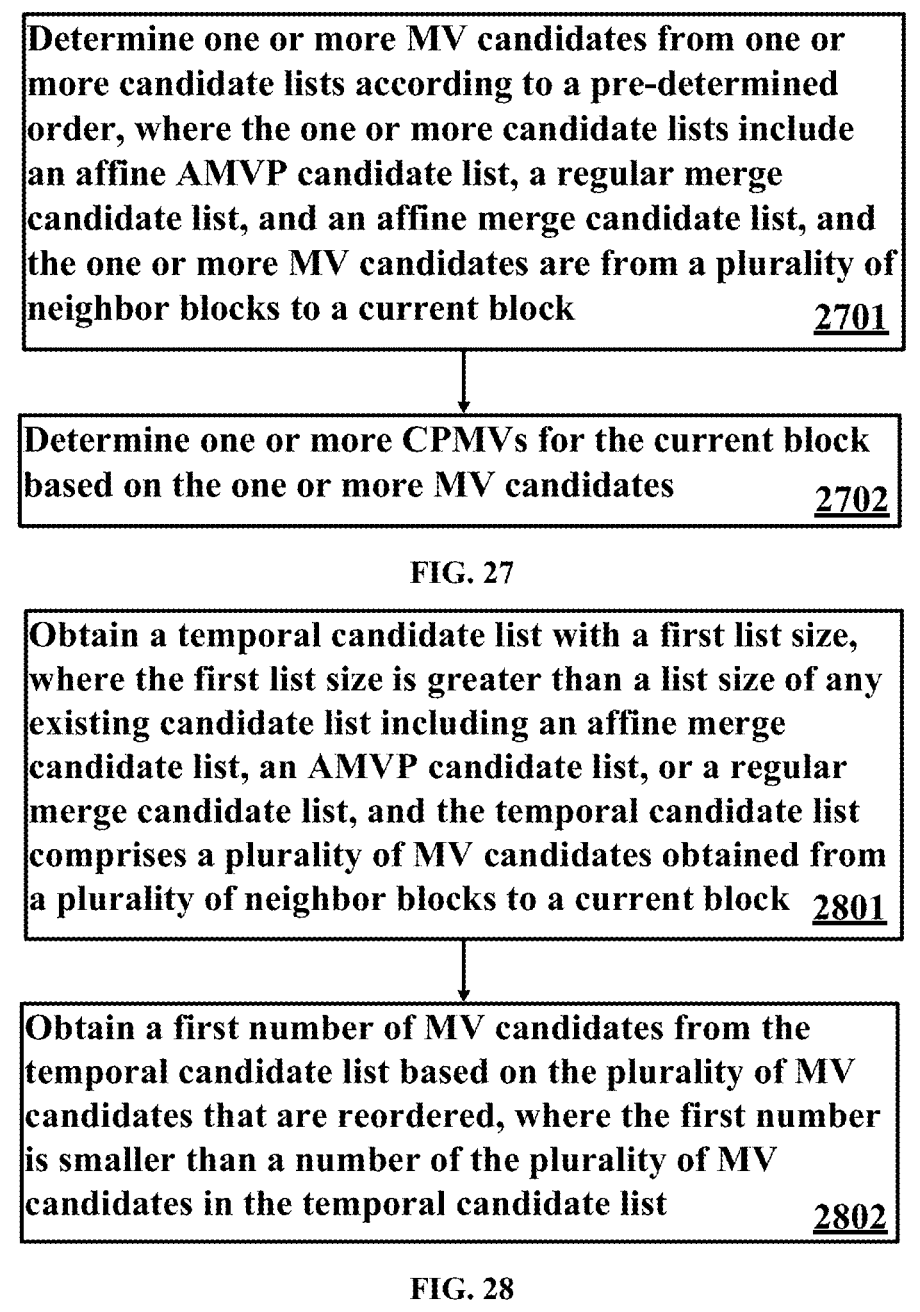

Determine one or more MV candidates from one or more candidate lists according to a pre-determined order, where the one or more candidate lists include an affine AMVP candidate list, a regular merge candidate list, and an affine merge candidate list, and the one or more MV candidates are from a plurality of neighbor blocks to a current block 2701

Determine one or more CPMVs for the current block based on the one or more MV candidates 2702

FIG. 27

Obtain a temporal candidate list with a first list size, where the first list size is greater than a list size of any existing candidate list including an affine merge candidate list, an AMVP candidate list, or a regular merge candidate list, and the temporal candidate list comprises a plurality of MV candidates obtained from a plurality of neighbor blocks to a current block 2801

Obtain a first number of MV candidates from the temporal candidate list based on the plurality of MV candidates that are reordered, where the first number is smaller than a number of the plurality of MV candidates in the temporal candidate list 2802

FIG. 28

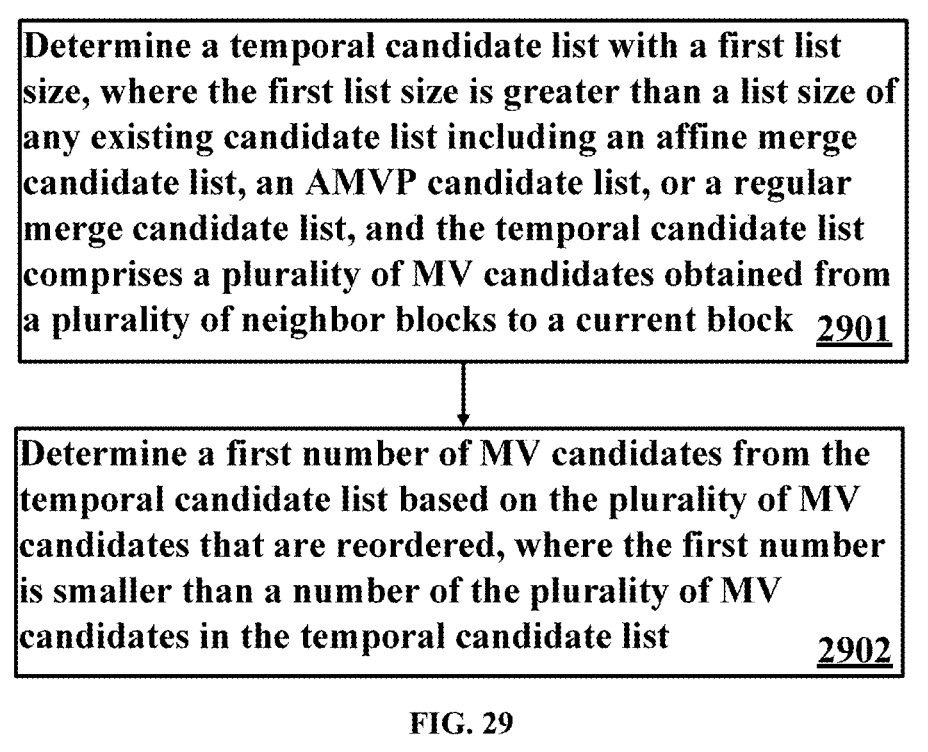

Determine a temporal candidate list with a first list size, where the first list size is greater than a list size of any existing candidate list including an affine merge candidate list, an AMVP candidate list, or a regular merge candidate list, and the temporal candidate list comprises a plurality of MV candidates obtained from a plurality of neighbor blocks to a current block 2901

Determine a first number of MV candidates from the temporal candidate list based on the plurality of MV candidates that are reordered, where the first number is smaller than a number of the plurality of MV candidates in the temporal candidate list 2902

FIG. 29

METHODS AND DEVICES FOR CANDIDATE DERIVATION FOR AFFINE MERGE MODE IN VIDEO CODING

CROSS-REFERENCE TO RELATED APPLICATION

This application is a continuation of International Application No. PCT/US2022/052952, filed on Dec. 15, 2022, which claims priority to U.S. Provisional Application No. 63/290,638, entitled "Methods and Devices for Candidate Derivation for Affine Merge Mode in Video Coding," filed on Dec. 16, 2021, all of which are incorporated by reference in their entireties for all purposes.

FIELD

The present disclosure relates to video coding and compression, and in particular but not limited to, methods and apparatus on improving the affine merge candidate derivation for affine motion prediction mode in a video encoding or decoding process.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. In May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

SUMMARY

The present disclosure provides examples of techniques relating to improving the motion vector candidate derivation for motion prediction mode in a video encoding or decoding process.

According to a first aspect of the present disclosure, there is provided a method of video decoding. The method may include obtain one or more motion vector (MV) candidates from a plurality of non-adjacent neighbor blocks to a current block based on at least one scanning area and at least one scanning distance, where one of the at least one scanning distance may indicate a number of blocks away from one side of the current block. Furthermore, the method may include determine a termination condition based on a number of MV candidates obtained by scanning the at least one scanning distance in a first scanning area, where the at least one scanning area may include the first scanning area.

Moreover, the method may include stop scanning the at least one scanning area in response to determining that a termination condition is met and obtain one or more control point motion vectors (CPMVs) for the current block based on the one or more MV candidates.

According to a second aspect of the present disclosure, there is provided a method of video decoding. The method may include obtain one or more first parameters based on one or more first neighbor blocks of a current block, obtain one or more second parameters based on the one or more first neighbor blocks and/or one or more second neighbor blocks of the current block, construct one or more affine models using the one or more first parameters and the one or more second parameters, and obtain one or more CPMVs for the current block based on the one or more affine models. Furthermore, the one or more first neighbor blocks and the one or more second neighbor blocks may be obtained from a plurality of neighbor blocks to the current block based on at least one scanning area and at least one scanning distance. Moreover, one of the at least one scanning distance may indicate a number of blocks away from one side of the current block, and the one or more first neighbor blocks and the one or more second neighbor blocks may be obtained by exhaustively scanning the at least one scanning area at the at least one scanning distance.

According to a third aspect of the present disclosure, there is provided a method of video decoding. The method may include obtain one or more MV candidates from one or more candidate lists according to a pre-determined order, where the one or more candidate lists may include an affine advanced motion vector prediction (AMVP) candidate list, a regular merge candidate list, and an affine merge candidate list, and the one or more MV candidates may be from a plurality of neighbor blocks to a current block. Furthermore, the method may include obtain one or more CPMVs for the current block based on the one or more MV candidates.

According to a fourth aspect of the present disclosure, there is provided a method of video decoding. The method may include obtain a temporal candidate list with a first list size, where the first list size is greater than a list size of any existing candidate list including an affine merge candidate list, an AMVP candidate list, or a regular merge candidate list, and the temporal candidate list may include a plurality of MV candidates obtained from a plurality of neighbor blocks to a current block. Furthermore, the method may include obtain a first number of MV candidates from the temporal candidate list based on the plurality of MV candidates that are reordered, where the first number is smaller than a number of the plurality of MV candidates in the temporal candidate list.

According to a fifth aspect of the present disclosure, there is provided a method of video encoding. The method may include determine one or more MV candidates from a plurality of non-adjacent neighbor blocks to a current block based on at least one scanning area and at least one scanning distance, where one of the at least one scanning distance may indicate a number of blocks away from one side of the current block. Furthermore, the method may include determine a termination condition based on a number of MV candidates obtained by scanning the at least one scanning distance in a first scanning area, where the at least one scanning area may include the first scanning area.

Moreover, the method may include stop scanning the at least one scanning area in response to determining that a termination condition is met and determine one or more CPMVs for the current block based on the one or more MV candidates.

According to a sixth aspect of the present disclosure, there is provided a method of video encoding. The method may include determine one or more first parameters based on one or more first neighbor blocks of a current block, determine one or more second parameters based on the one or more first neighbor blocks and/or one or more second neighbor blocks of the current block, construct one or more affine models using the one or more first parameters and the one or more second parameters, and determine one or more CPMVs for the current block based on the one or more affine models. Furthermore, the one or more first neighbor blocks and the one or more second neighbor blocks may be determined from a plurality of neighbor blocks to the current block based on at least one scanning area and at least one scanning distance. Moreover, one of the at least one scanning distance may indicate a number of blocks away from one side of the current block, and the one or more first neighbor blocks and the one or more second neighbor blocks may be determined by exhaustively scanning the at least one scanning area at the at least one scanning distance.

According to a seventh aspect of the present disclosure, there is provided a method of video encoding. The method may include determine one or more MV candidates from one or more candidate lists according to a pre-determined order, where the one or more candidate lists may include an AMVP candidate list, a regular merge candidate list, and an affine merge candidate list, and the one or more MV candidates may be from a plurality of neighbor blocks to a current block. Furthermore, the method may include determine one or more CPMVs for the current block based on the one or more MV candidates.

According to an eighth aspect of the present disclosure, there is provided a method of video encoding. The method may include determine a temporal candidate list with a first list size, where the first list size is greater than a list size of any existing candidate list including an affine merge candidate list, an AMVP candidate list, or a regular merge candidate list, and the temporal candidate list may include a plurality of MV candidates obtained from a plurality of neighbor blocks to a current block. Furthermore, the method may include determine a first number of MV candidates from the temporal candidate list based on the plurality of MV candidates that are reordered, where the first number is smaller than a number of the plurality of MV candidates in the temporal candidate list According to a ninth aspect of the present disclosure, there is provided an apparatus for video decoding. The apparatus includes one or more processors and a memory configured to store instructions executable by the one or more processors. Further, the one or more processors, upon execution of the instructions, are configured to perform the method according to the first aspect, the second aspect, the third aspect, or the fourth aspect.

According to a tenth aspect of the present disclosure, there is provided an apparatus for video encoding. The apparatus includes one or more processors and a memory configured to store instructions executable by the one or more processors. Further, the one or more processors, upon execution of the instructions, are configured to perform the method according to the fifth aspect, the sixth aspect, the seventh aspect, or the eighth aspect.

According to an eleventh aspect of the present disclosure, there is provided a non-transitory computer-readable storage medium storing computer-executable instructions that, when executed by one or more computer processors, cause the one or more computer processors to receive a bitstream, and perform the method according to the first aspect, the second aspect, the third aspect, or the fourth aspect.

According to a twelfth aspect of the present disclosure, there is provided a non-transitory computer-readable storage medium storing computer-executable instructions that, when executed by one or more computer processors, cause the one or more computer processors to perform the method according to the fifth aspect, the sixth aspect, the seventh aspect, or the eighth aspect to encode the current block into a bitstream, and transmit the bitstream.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 8 illustrates non-adjacent neighboring blocks for inherited affine merge candidates in accordance with some examples of the present disclosure.

FIG. 23 is a flow chart illustrating a method for video encoding corresponding to the method for video decoding as shown in FIG. 22 in accordance with some examples of the present disclosure.

FIG. 24 is a flow chart illustrating a method for video decoding in accordance with some examples of the present disclosure.

FIG. 25 is a flow chart illustrating a method for video encoding corresponding to the method for video decoding as shown in FIG. 24 in accordance with some examples of the present disclosure.

FIG. 26 is a flow chart illustrating a method for video decoding in accordance with some examples of the present disclosure.

FIG. 27 is a flow chart illustrating a method for video encoding corresponding to the method for video decoding as shown in FIG. 26 in accordance with some examples of the present disclosure.

FIG. 28 is a flow chart illustrating a method for video decoding in accordance with some examples of the present disclosure.

FIG. 29 is a flow chart illustrating a method for video encoding corresponding to the method for video decoding as shown in FIG. 28 in accordance with some examples of the present disclosure.

DETAILED DESCRIPTION

Figure 1A:
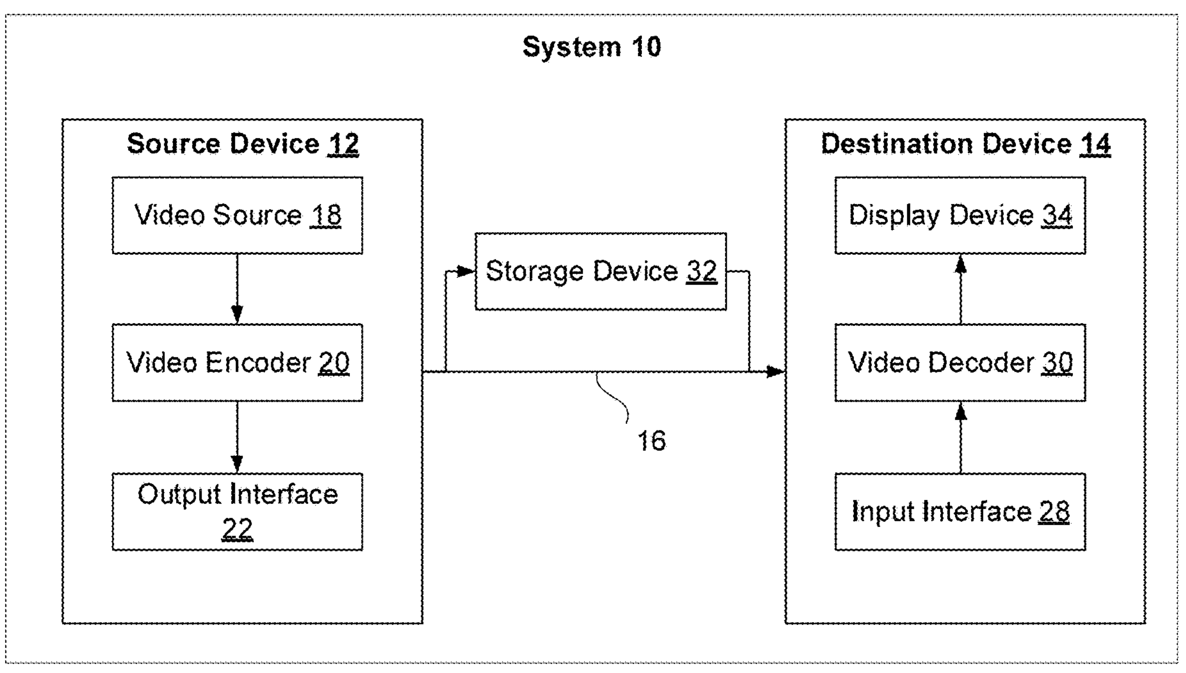
FIG. 1A is a block diagram illustrating a system for encoding and decoding video blocks in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Terms used in the disclosure are only adopted for the purpose of describing specific embodiments and not intended to limit the disclosure. "A/an," "said," and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1A is a block diagram illustrating an exemplary system 10 for encoding and decoding video blocks in parallel in accordance with some implementations of the present disclosure. As shown in FIG. 1A, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of moving the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 1A, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Like HEVC, VVC is built upon the block-based hybrid video coding framework. FIG. 1B is a block diagram illustrating a block-based video encoder in accordance with some implementations of the present disclosure. In the encoder 100, the input video signal is processed block by block, called coding units (CUs). The encoder 100 may be the video encoder 20 as shown in FIG. 1A. In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

Figures 3A, 3B, 3C, 3D, 3E, 4A:
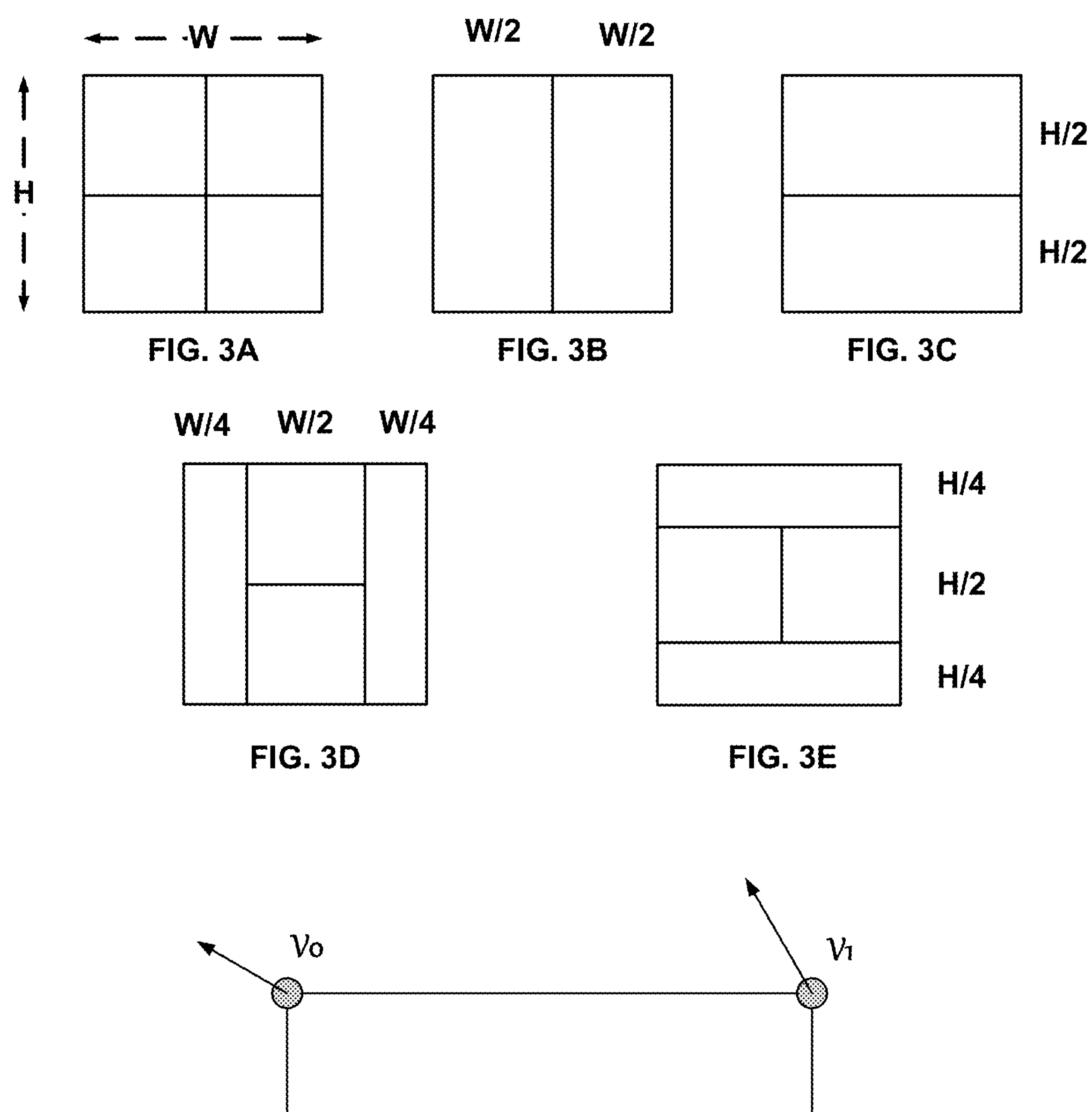
FIG. 3A is a diagram illustrating block partitions in a multi-type tree structure in accordance with some examples of the present disclosure.
FIG. 3B is a diagram illustrating block partitions in a multi-type tree structure in accordance with some examples of the present disclosure.
FIG. 3C is a diagram illustrating block partitions in a multi-type tree structure in accordance with some examples of the present disclosure.
FIG. 3D is a diagram illustrating block partitions in a multi-type tree structure in accordance with some examples of the present disclosure.
FIG. 3E is a diagram illustrating block partitions in a multi-type tree structure in accordance with some examples of the present disclosure.
FIG. 4A illustrates 4-parameter affine model in accordance with some examples of the present disclosure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG. 3B), horizontal binary partitioning (FIG. 3C), vertical extended ternary partitioning (FIG. 3D), and horizontal extended ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 1B:
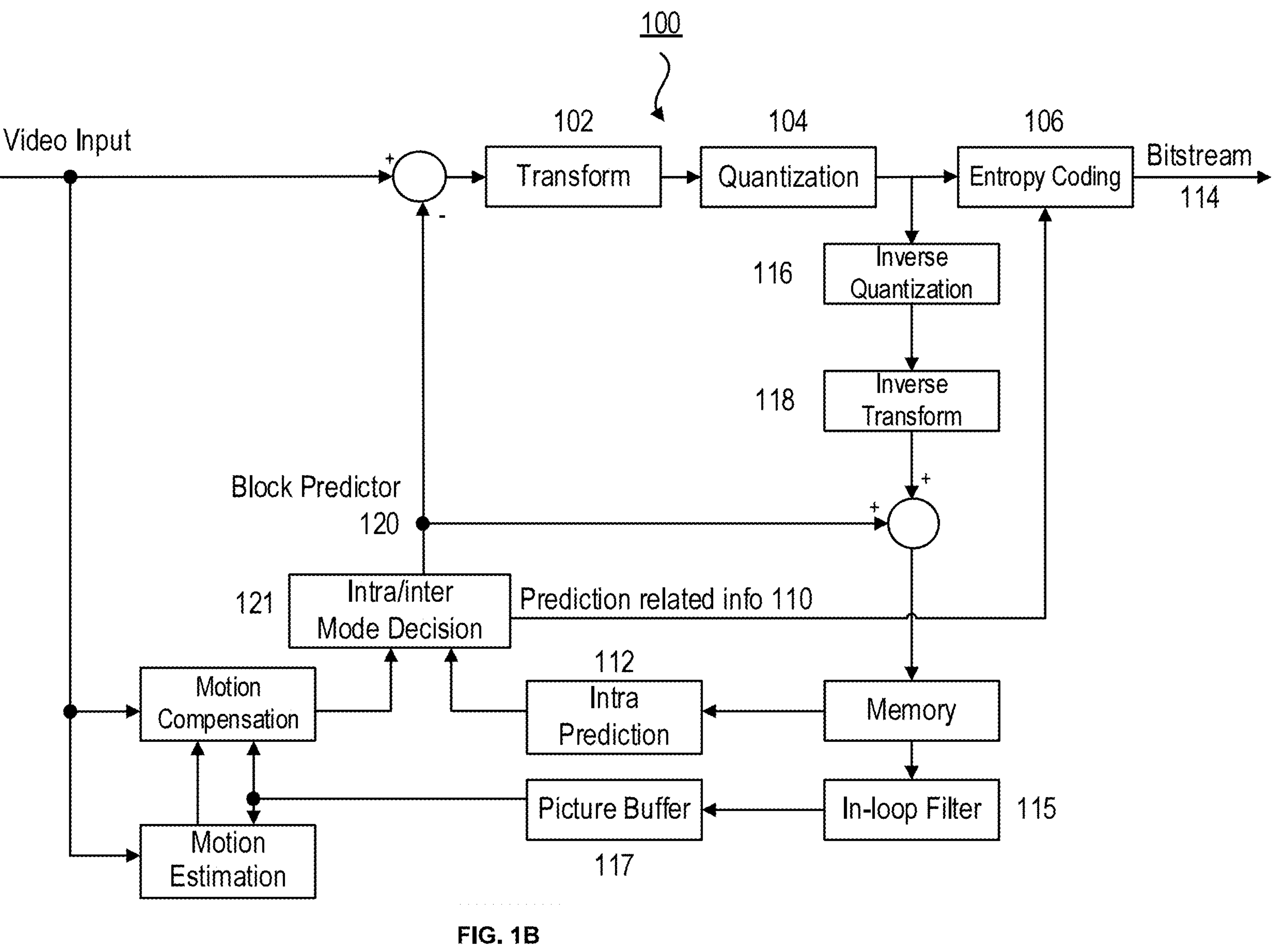
FIG. 1B is a block diagram of an encoder in accordance with some examples of the present disclosure.
Figure 2:
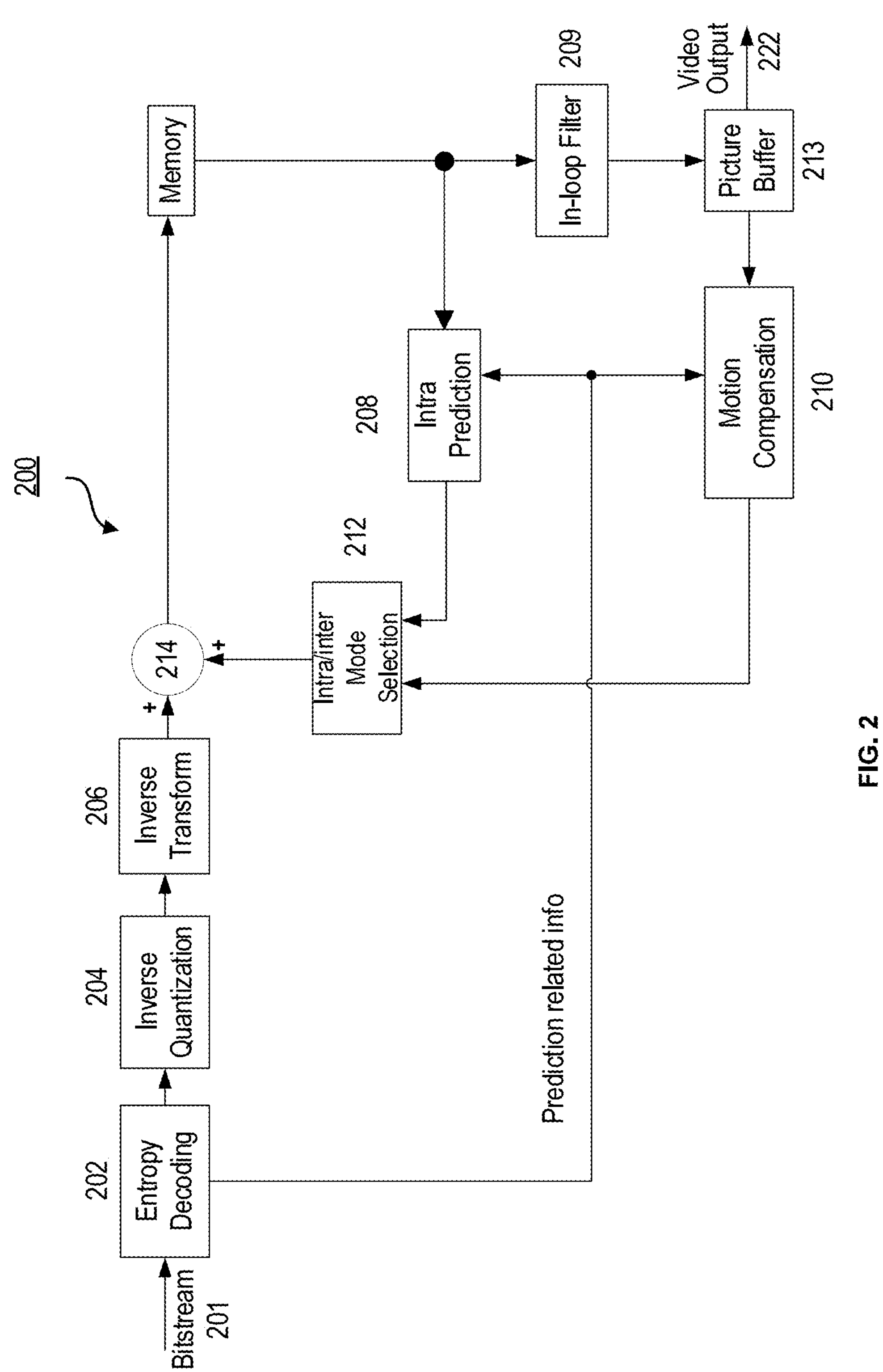
FIG. 2 is a block diagram of a decoder in accordance with some examples of the present disclosure.

FIG. 2 is a block diagram illustrating a block-based video decoder 200 which may be used in conjunction with many video coding standards. This decoder 200 is similar to the reconstruction-related section residing in the encoder 100 of FIG. 1B. The block-based video decoder 200 may be the video decoder 30 as shown in FIG. 1A. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

In the current VVC and AVS3 standards, motion information of the current coding block is either copied from spatial or temporal neighboring blocks specified by a merge candidate index or obtained by explicit signaling of motion estimation. The focus of the present disclosure is to improve the accuracy of the motion vectors for affine merge mode by improving the derivation methods of affine merge candidates. To facilitate the description of the present disclosure, the existing affine merge mode design in the VVC standard is used as an example to illustrate the proposed ideas. Please note that though the existing affine mode design in the VVC standard is used as the example throughout the present disclosure, to a person skilled in the art of modern video coding technologies, the proposed technologies can also be applied to a different design of affine motion prediction mode or other coding tools with the same or similar design spirit.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 1C:
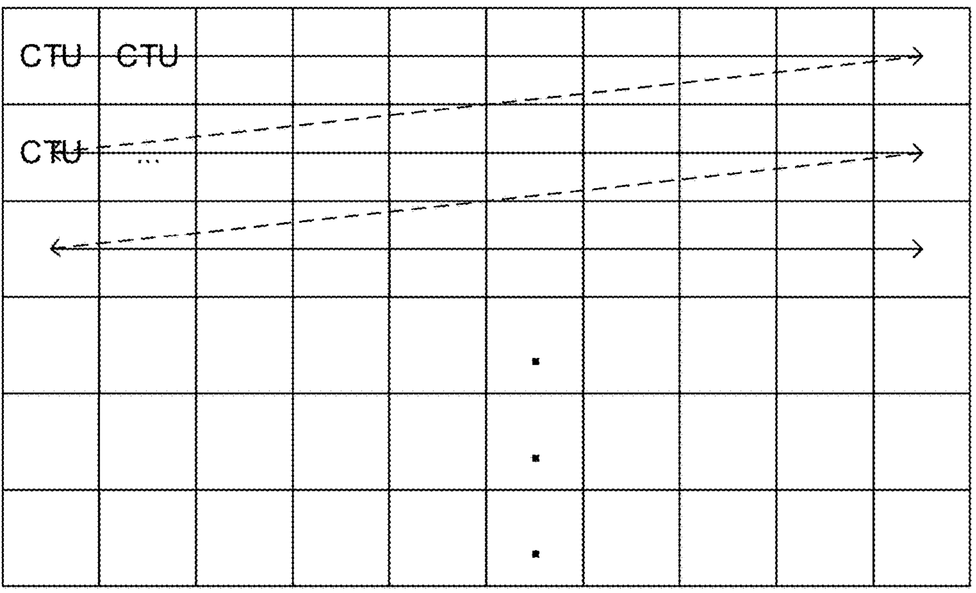
FIGS. 1C-1F are block diagrams illustrating how a frame is recursively partitioned into multiple video blocks of different sizes and shapes in accordance with some examples of the present disclosure.
Figure 1D:
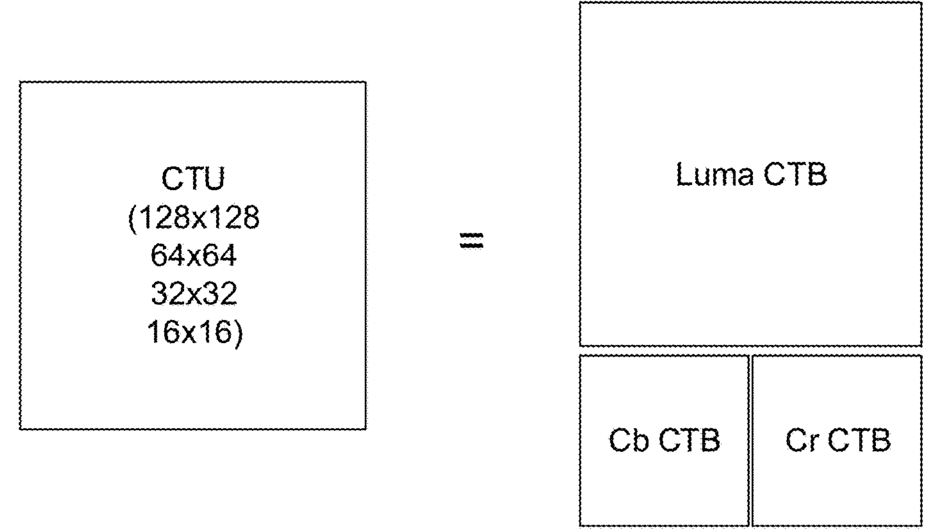

As shown in FIG. 1C, the video encoder 20 (or more specifically a partition unit in a prediction processing unit of the video encoder 20) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 1D, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 1F:
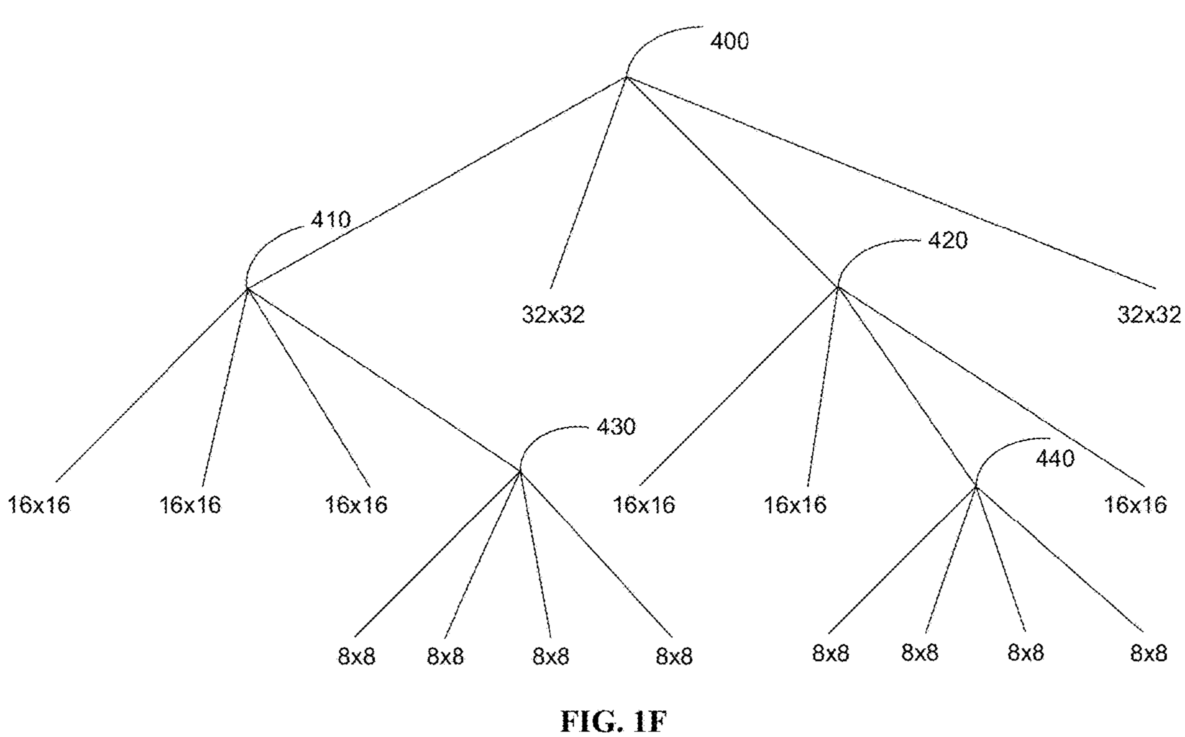
Figure 1E:
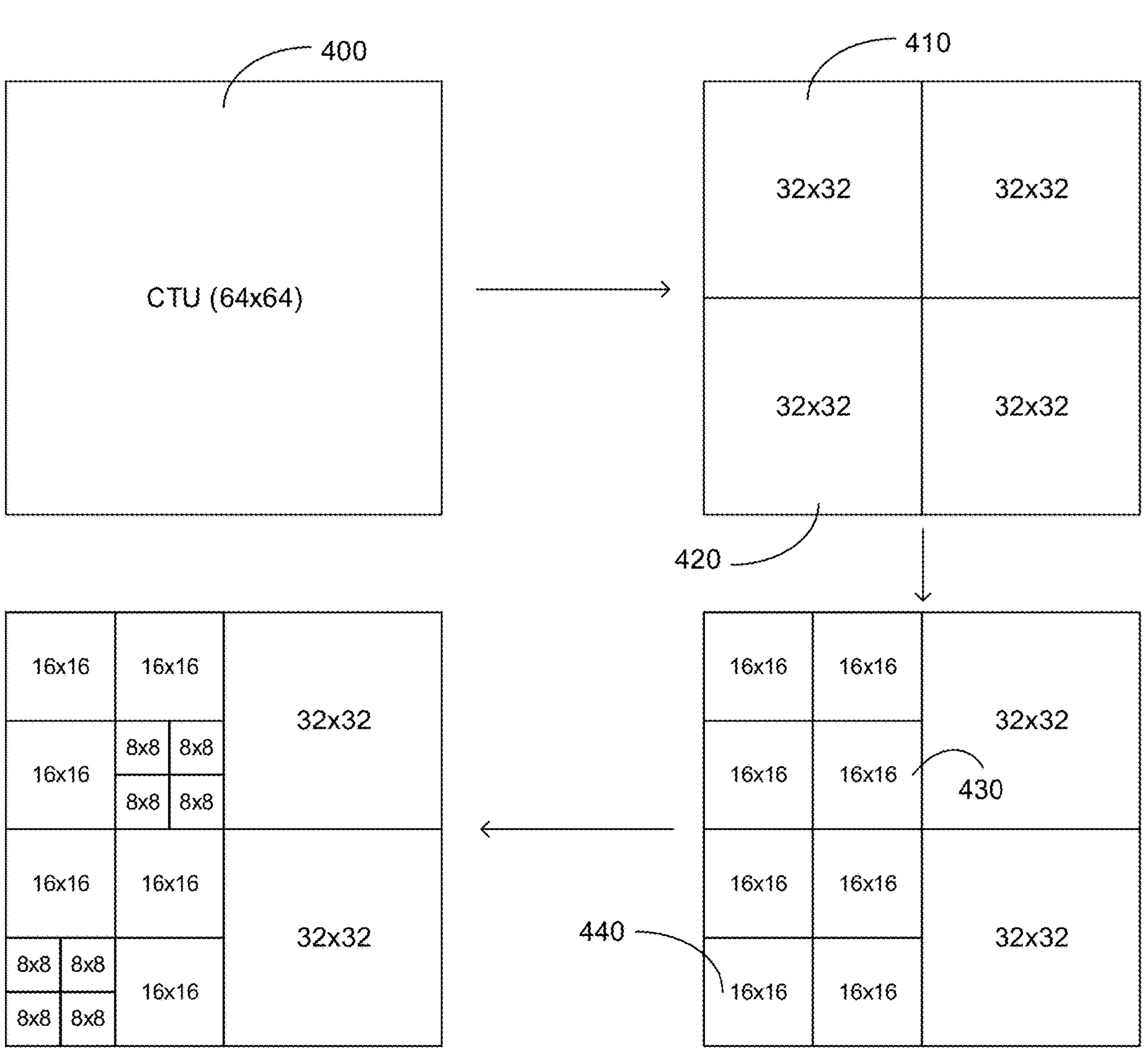

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 1E, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 1F depicts a quad-tree data structure illustrating the end result of the partition process of the CTU 400 as depicted in FIG. 1E, each leaf node of the quad-tree corresponding to one CU of a respective size ranging from 32×32 to 8×8. Like the CTU depicted in FIG. 1D, each CU may include a CB of luma samples and two corresponding coding blocks of chroma samples of a frame of the same size, and syntax elements used to code the samples of the coding blocks. In monochrome pictures or pictures having three separate color planes, a CU may include a single coding block and syntax structures used to code the samples of the coding block. It should be noted that the quad-tree partitioning depicted in FIGS. 1E-1F is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIGS. 3A-3E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 1E, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit as described above in connection with FIG. 1B, the motion vector predictor of the current CU is subtracted from the actual motion vector of the current CU to produce a Motion Vector Difference (MVD) for the current CU. By doing so, there is no need to encode the motion vector determined by the motion estimation unit for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

Affine Model

In HEVC, only translation motion model is applied for motion compensated prediction. While in the real world, there are many kinds of motion, e.g., zoom in/out, rotation, perspective motions and other irregular motions. In the VVC and AVS3, affine motion compensated prediction is applied by signaling one flag for each inter coding block to indicate whether the translation motion model or the affine motion model is applied for inter prediction. In the current VVC and AVS3 design, two affine modes, including 4-paramter affine mode and 6-parameter affine mode, are supported for one affine coding block.

Figure 4B:
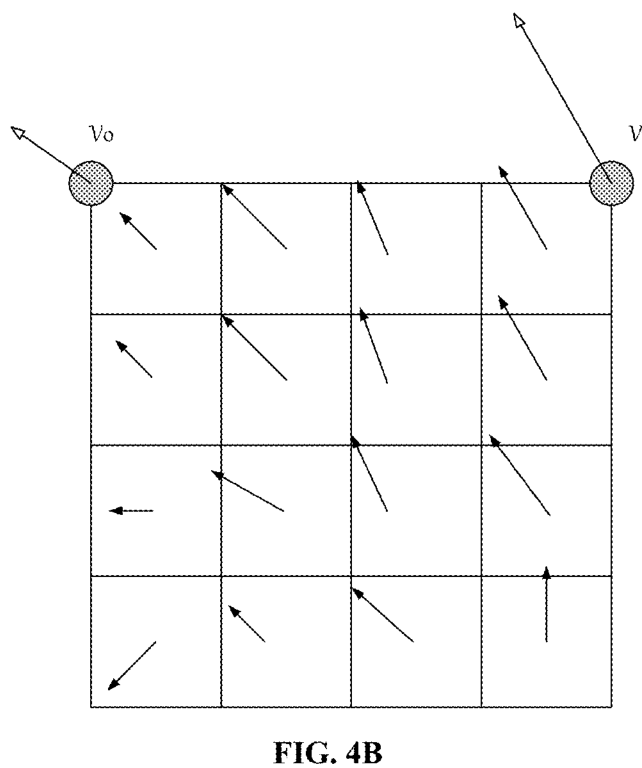
FIG. 4B illustrates 4-parameter affine model in accordance with some examples of the present disclosure.

The 4-parameter affine model has the following parameters: two parameters for translation movement in horizontal and vertical directions respectively, one parameter for zoom motion and one parameter for rotational motion for both directions. In this model, horizontal zoom parameter is equal to vertical zoom parameter, and horizontal rotation parameter is equal to vertical rotation parameter. To achieve a better accommodation of the motion vectors and affine parameter, those affine parameters are to be derived from two MVs (which are also called control point motion vector (CPMV)) located at the top-left corner and top-right corner of a current block. As shown in FIGS. 4A-4B, the affine motion field of the block is described by two CPMVs ($V_0$, $V_1$). Based on the control point motion, the motion field ($v_x$, $v_y$) of one affine coded block is described as $$v_x = \frac{(v_{1x} - v_{0x})}{w}x - \frac{(v_{1y} - v_{0y})}{w}y + v_{0x} \tag{1}$$

$$v_y = \frac{(v_{1y} - v_{0y})}{w}x + \frac{(v_{1x} - v_{0x})}{w}y + v_{0y}$$

Figure 5:
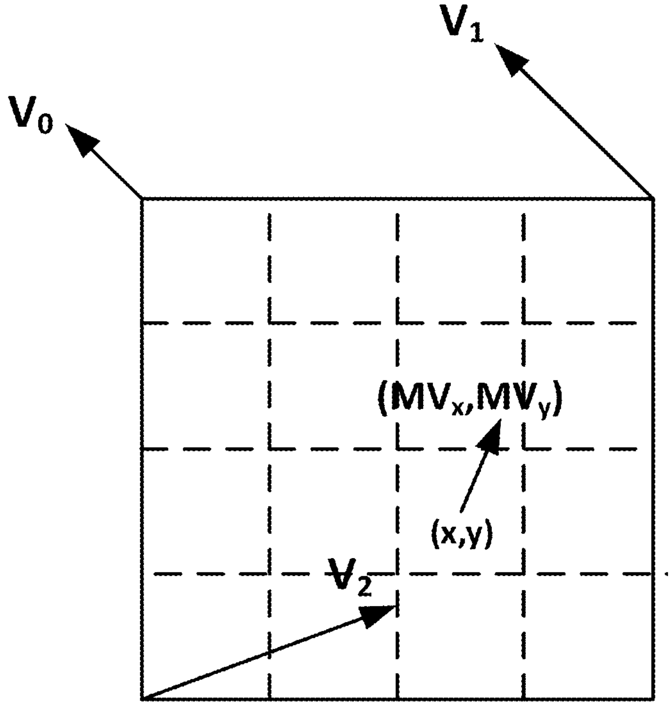
FIG. 5 illustrates 6-parameter affine model in accordance with some examples of the present disclosure.

The 6-parameter affine mode has the following parameters: two parameters for translation movement in horizontal and vertical directions respectively, two parameters for zoom motion and rotation motion respectively in horizontal direction, another two parameters for zoom motion and rotation motion respectively in vertical direction. The 6-parameter affine motion model is coded with three CPMVs. As shown in FIG. 5, the three control points of one 6-paramter affine block are located at the top-left, top-right and bottom left corner of the block. The motion at top-left control point is related to translation motion, and the motion at top-right control point is related to rotation and zoom motion in horizontal direction, and the motion at bottom-left control point is related to rotation and zoom motion in vertical direction. Compared to the 4-parameter affine motion model, the rotation and zoom motion in horizontal direction of the 6-paramter may not be same as those motion in vertical direction. Assuming ($V_0$, $V_1$, $V_2$) are the MVs of the top-left, top-right and bottom-left corners of the current block in FIG. 5, the motion vector of each sub-block ($v_x$, $v_y$) is derived using the three MVs at control points as:

$$v_x = v_{0x} + (v_{1x} - v_{0x}) * \frac{x}{w} + (v_{2x} - v_{0x}) * \frac{y}{h} \tag{2}$$

$$v_y = v_{0y} + (v_{1y} - v_{0y}) * \frac{x}{w} + (v_{2y} - v_{0y}) * \frac{y}{h}$$

Affine Merge Mode

In affine merge mode, the CPMVs for the current block are not explicitly signaled but derived from neighboring blocks. Specifically, in this mode, motion information of spatial neighbor blocks is used to generate CPMVs for the current block. The affine merge mode candidate list has a limited size. For example, in the current VVC design, there may be up to five candidates. The encoder may evaluate and choose the best candidate index based on rate-distortion optimization algorithms. The chosen candidate index is then signaled to the decoder side. The affine merge candidates can be decided in three ways. In the first way, the affine merge candidates may be inherited from neighboring affine coded blocks. In the second way, the affine merge candidates may be constructed from translational MVs from neighboring blocks. In the third way, zero MVs are used as the affine merge candidates.

Figure 6:
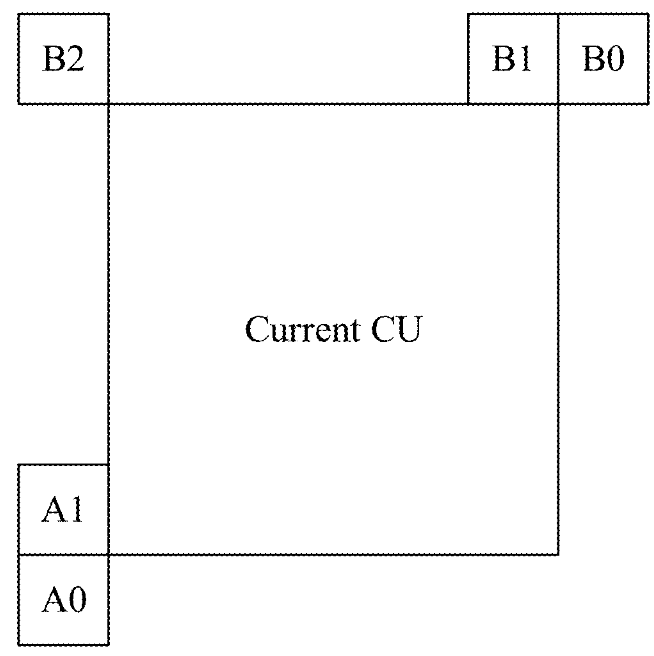
FIG. 6 illustrates adjacent neighboring blocks for inherited affine merge candidates in accordance with some examples of the present disclosure.

For the inherited method, there may be up to two candidates. The candidates are obtained from the neighboring blocks located at the bottom-left of the current block (e.g., scanning order is from A0 to A1 as shown in FIG. 6) and from the neighboring blocks located at the top-right of the current block (e.g., scanning order is from B0 to B2 as shown in FIG. 6), if available.

For the constructed method, the candidates are the combinations of neighbor's translational MVs, which may be generated by two steps.

Step 1: obtain four translational MVs including MV1, MV2, MV3 and MV4 from available neighbors.

Figure 7:
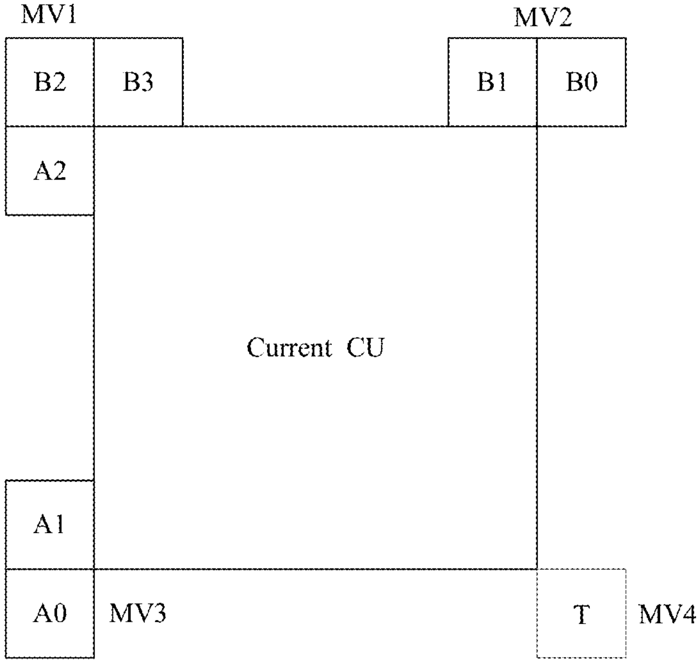
FIG. 7 illustrates adjacent neighboring blocks for constructed affine merge candidates in accordance with some examples of the present disclosure.

MV1: MV from the one of the three neighboring blocks close to the top-left corner of the current block. As shown in FIG. 7, the scanning order is B2, B3 and A2.

MV2: MV from the one of the one from the two neighboring blocks close to the top-right corner of the current block. As shown in FIG. 7, the scanning order is B1 and B0.

MV3: MV from the one of the one from the two neighboring blocks close to the bottom-left corner of the current block. As shown in FIG. 7, the scanning order is A1 and A0.

MV4: MV from the temporally collocated block of the neighboring block close to the bottom-right corner of current block. As shown in the Fig, the neighboring block is T.

Step 2: derive combinations based on the four translational MVs from Step 1.

Combination 1: MV1, MV2, MV3;

Combination 2: MV1, MV2, MV4;

Combination 3: MV1, MV3, MV4;

Combination 4: MV2, MV3, MV4;

Combination 5: MV1, MV2;

Combination 6: MV1, MV3.

When the merge candidate list is not full after filling with inherited and constructed candidates, zero MVs are inserted at the end of the list.

Affine AMVP Mode

Affine advanced motion vector prediction (AMVP) mode may be applied for CUs with both width and height larger than or equal to 16. An affine flag in CU level is signaled in the bitstream to indicate whether affine AMVP mode is used and then another flag is signaled to indicate whether 4-parameter affine or 6-parameter affine. In this mode, the difference of the CPMVs of current CU and their predictors CPMVPs is signaled in the bitstream. The affine AVMP candidate list size is 2 and the affine AMVP candidate list is generated by using the following four types of CPMV candidate in order below:

Inherited affine AMVP candidates that extrapolated from the CPMVs of the neighbour CUs;

Constructed affine AMVP candidates CPMVPs that are derived using the translational MVs of the neighbor CUs;

Translational MVs from neighboring CUs;

Temporal MV from collocated CUs; and

Zero MVs.

The checking order of inherited affine AMVP candidates is the same to the checking order of inherited affine merge candidates. The only difference is that, for AMVP candidate, only the affine CU that has the same reference picture as in current block is considered. No pruning process is applied when inserting an inherited affine motion predictor into the candidate list.

Constructed AMVP candidate is derived from the same spatial neighbors as affine merge mode. The same checking order is used as done in affine merge candidate construction. In addition, reference picture index of the neighboring block is also checked. The first block in the checking order that is inter coded and has the same reference picture as in current CUs is used. When the current CU is coded with 4-parameter affine mode, and $mv_0$ and $mv_1$ are both available, $mv_0$ and $mv_1$ are added as one candidate in the affine AMVP candidate list. When the current CU is coded with 6-parameter affine mode, and all three CPMVs are available, they are added as one candidate in the affine AMVP candidate list. Otherwise, constructed AMVP candidate is set as unavailable.

If affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

Regular Inter Merge Mode

In some embodiments, the regular inter merge candidate list is constructed by including the following five types of candidates in order:

(1) Spatial MVP from spatial neighbor CUs;

(2) Temporal MVP from collocated CUs;

(3) History-based MVP from a first in first out (FIFO) table;

(4) Pairwise average MVP; and (5) Zero MVs.

The size of merge list is signaled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided above. In some embodiments, parallel derivation of the merging candidate lists may be supported for all CUs within a certain size of area.

Spatial Candidate Derivation

Figure 4C:
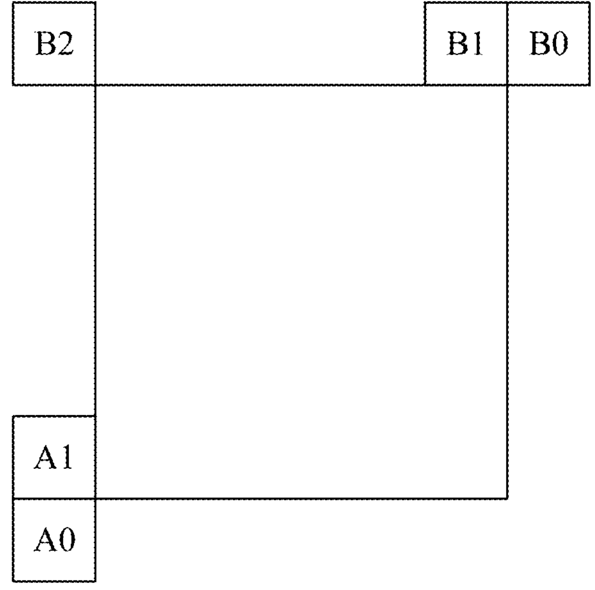
FIG. 4C illustrates positions of spatial merge candidates in accordance with some examples of the present disclosure.
Figure 4D:
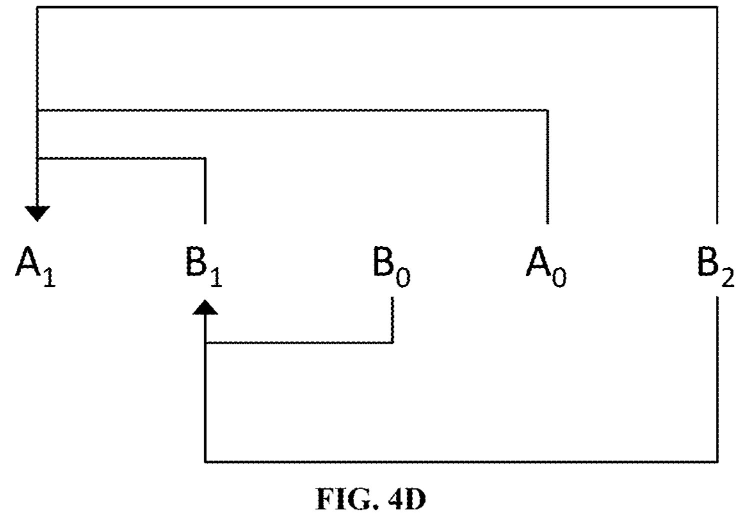
FIG. 4D illustrates candidate pairs that are considered for redundancy check of spatial merge candidates in accordance with some examples of the present disclosure.

The derivation of spatial merge candidates in VVC is same to that in HEVC except the positions of first two merge candidates are swapped. A maximum of four merge candidates are selected among candidates located in the positions depicted in FIG. 4C. The order of derivation is B0, A0, B1, A1 and B2. Position B2 is considered only when one or more than one CUs of position B0, A0, B1, A1 are not available (e.g., because it belongs to another slice or tile) or is intra coded. After candidate at position A1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead, only the pairs linked with an arrow in FIG. 4D are considered and a candidate is only added to the list if the corresponding candidate used for redundancy check has not the same motion information. FIG. 4D illustrates candidate pairs that are considered for redundancy check of spatial merge candidates.

Temporal Candidate Derivation

Figure 4E:
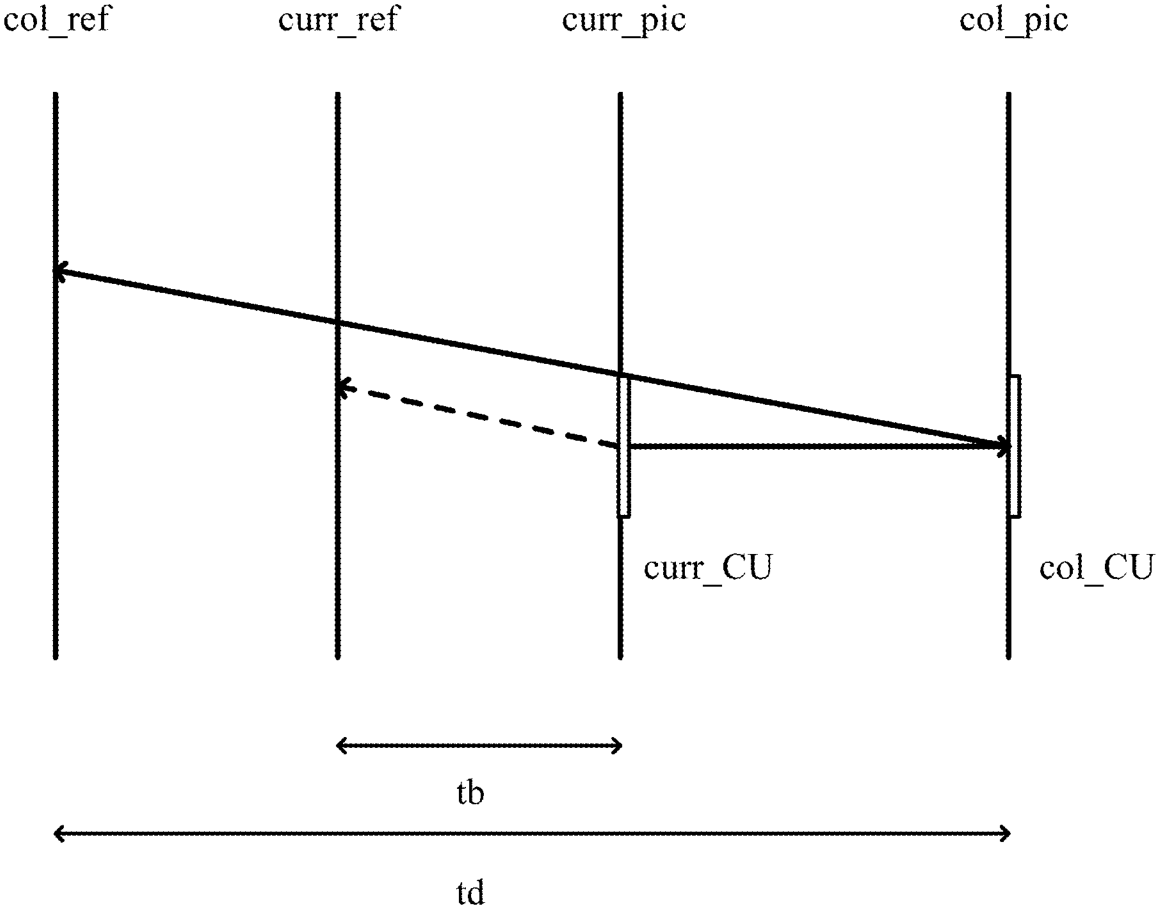
FIG. 4E illustrates motion vector scaling for temporal merge candidates in accordance with some examples of the present disclosure.

In this step, only one candidate is added to the list. Particularly, in the derivation of this temporal merge candidate, a scaled motion vector is derived based on co-located CU belonging to the collocated reference picture. The reference picture list and the reference index to be used for derivation of the co-located CU is explicitly signaled in the slice header. The scaled motion vector for temporal merge candidate is obtained as illustrated by the dotted line in FIG. 4E, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 4F:
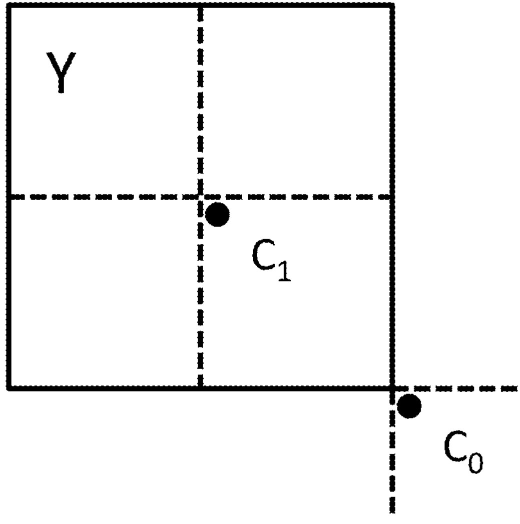
FIG. 4F illustrates candidate positions for temporal merge candidates $C_0$ and $C_1$ in accordance with some examples of the present disclosure.

The position for the temporal candidate is selected between candidates C0 and C1, as depicted in FIG. 4F. If CU at position C0 is not available, is intra coded, or is outside of the current row of CTUs, position C1 is used. Otherwise, position C0 is used in the derivation of the temporal merge candidate.

History-based Merge Candidate Derivation

The history-based MVP (HMVP) merge candidates are added to merge list after the spatial MVP and temporal motion vector prediction (TMVP). In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S may be set to be 6, which indicates up to 5 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of operations for redundancy check, the following simplifications are introduced. First, the last two entries in the table are redundancy checked to A1 and B1 spatial candidates, respectively. Second, once the total number of available merge candidates reaches the maximally allowed merge candidates minus 1, the merge candidate list construction process from HMVP is terminated.

Pair-Wise Average Merge Candidates Derivation

Pairwise average candidates are generated by averaging predefined pairs of candidates in the existing merge candidate list, using the first two merge candidates. The first merge candidate is defined as p0Cand and the second merge candidate can be defined as p1Cand, respectively. The averaged motion vectors are calculated according to the availability of the motion vector of p0Cand and p1Cand separately for each reference list. If both motion vectors are available in one list, these two motion vectors are averaged even when they point to different reference pictures, and its reference picture is set to the one of p0Cand; if only one motion vector is available, use the one directly; if no motion vector is available, keep this list invalid. Also, if the half-pel interpolation filter indices of p0Cand and p1Cand are different, it is set to 0.

When the merge list is not full after pair-wise average merge candidates are added, the zero MVPs are inserted at the end of the merge list until the maximum merge candidate number is encountered.

Adaptive Reordering of Merge Candidates with Template Matching (ARMC)

The reordering method, named as ARMC, is applied to regular merge mode, template matching (TM) merge mode, and affine merge mode (excluding the SbTMVP candidate), where the SbTMVP represents the Subblock-based Temporal Motion Vector Prediction candidate. For the TM merge mode, merge candidates are reordered before the refinement process.

After a merge candidate list is constructed, merge candidates are divided into several subgroups. The subgroup size is set to 5. Merge candidates in each subgroup are reordered ascendingly according to cost values based on template matching. For simplification, merge candidates in the last but not the first subgroup are not reordered.

The template matching cost is measured by the sum of absolute differences (SAD) between samples of a template of the current block and their corresponding reference samples. The template includes a set of reconstructed samples neighboring to the current block. Reference samples of the template are located by the same motion information of the current block.

Figure 19:
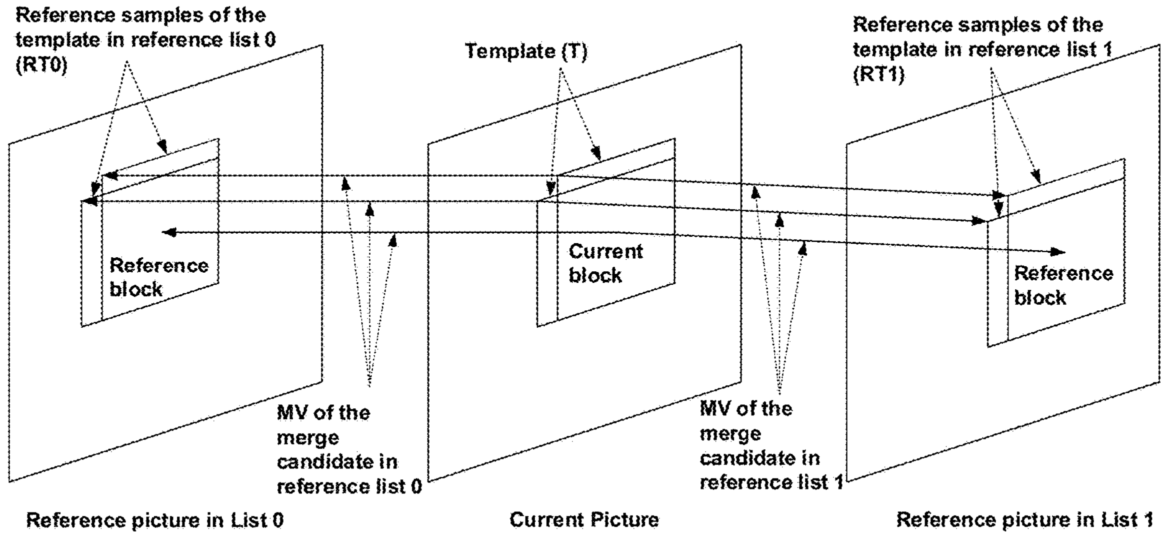
FIG. 19 illustrates template and reference samples of a template in reference list 0 and reference list 1 in accordance with some examples of the present disclosure.

When a merge candidate utilizes bi-directional prediction, the reference samples of the template of the merge candidate are also generated by bi-prediction as shown in FIG. 19.

Figure 20:
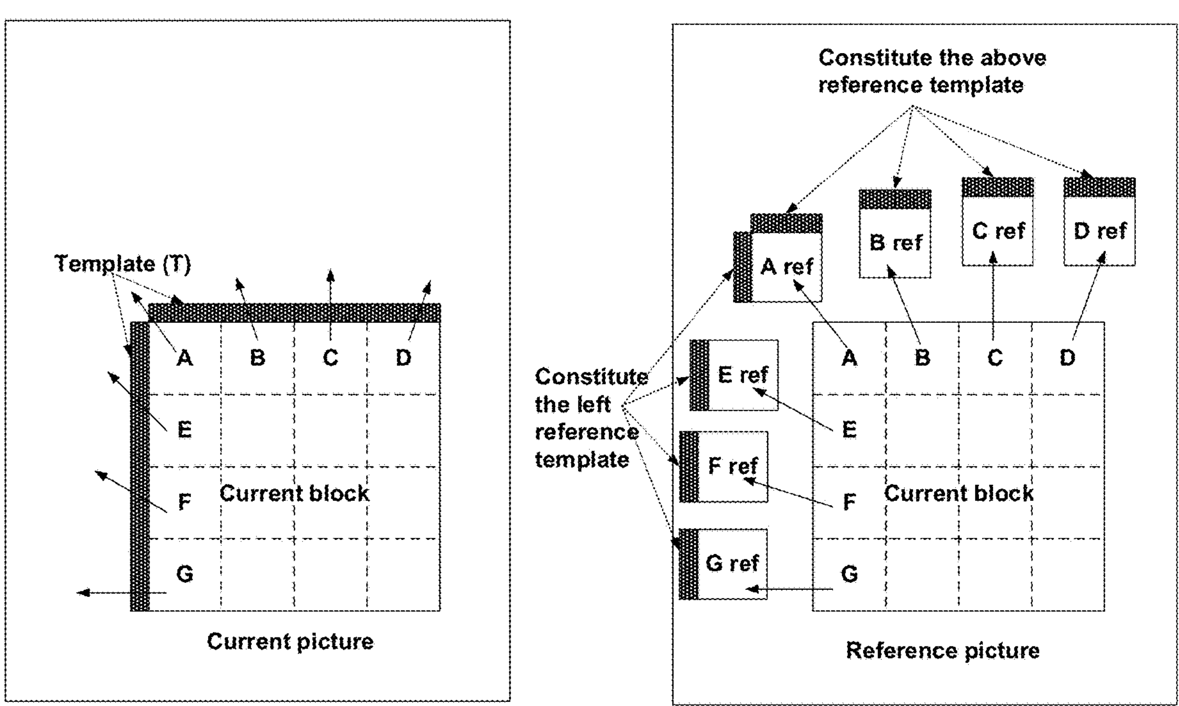
FIG. 20 illustrates template and reference samples of a template for block with sub-block motion using the motion information of the subblocks of a current block in accordance with some examples of the present disclosure.

For subblock-based merge candidates with subblock size equal to Wsub*Hsub, the above template includes several sub-templates with the size of Wsub×1, and the left template includes several sub-templates with the size of 1×Hsub. Wsub is the width of the subblock and Hsub is the height of the subblock. As shown in FIG. 20. The motion information of the subblocks in the first row and the first column of current block is used to derive the reference samples of each sub-template.

For the current video standards VVC and AVS, only adjacent neighboring blocks are used to derive affine merge candidates for the current block, as shown in FIG. 6 and FIG. 7 for inherited candidates and constructed candidates respectively. To increase the diversity of merge candidates and further explore spatial correlations, it is straightforward to extend the coverage of neighboring blocks from adjacent areas to non-adjacent areas.

In the current video standards VVC and AVS, each affine inherited candidate is derived from one neighboring block with affine motion information. On the other hand, each affine constructed candidate is derived from two or three neighboring blocks with translational motion information. To further explore spatial correlations, a new candidate derivation method which combines affine motion and translational motion may be investigated.

The candidate derivation methods proposed for affine merge mode, may be extended to other coding modes, such as affine AMVP mode and regular merge mode.

In the present disclosure, the candidate derivation process for affine merge mode is extended by using not only adjacent neighboring blocks but also non-adjacent neighboring blocks. Detailed methods may be summarized in following aspects including affine merge candidate pruning, non-adjacent neighbor based derivation process for affine inherited merge candidates, non-adjacent neighbor based derivation process for affine constructed merge candidates, inheritance based derivation method for affine constructed merge candidates, HMVP based derivation method for affine constructed merge candidates, and candidate derivation method for affine AMVP mode and regular merge mode.

Affine Merge Candidate Pruning

As the affine merge candidate list in a typical video coding standards usually has a limited size, candidate pruning is an essential process to remove redundant ones. For both affine merge inherited candidates and constructed candidates, this pruning process is needed. As explained in the introduction section, CPMVs of a current block are not directly used for affine motion compensation. Instead, CPMVs need to be converted into translational MVs at the location of each sub-block within the current block. The conversion process is performed by following a general affine model as shown below:

$$\begin{cases} v_x(x, y) & = a + c*x + d*y \\ v_y(x, y) & = b + e*x + f*y \end{cases} \tag{3}$$

where (a, b) are delta translation parameters, (c, d) are delta zoom and rotation parameters for horizontal direction, (e, f) are delta zoom and rotation parameters for vertical direction, (x, y) are the horizontal and vertical distance of the pivot location (e.g., the center or top-left corner) of a sub-block relative to the top-left corner of the current block (e.g., the coordinate (x, y) shown in FIG. 5), and ($v_x$, $v_y$) is the target translational MVs of the sub-block.

For 6-parameter affine model, three CPMVs, termed as V0, V1 and V2, are available. Then the six model parameters a, b, c, d, e and f can be calculated as $$\begin{cases} a & = v_{0x} \\ b & = v_{0y} \\ c & = (v_{1x} - v_{0x})/w \\ d & = (v_{2x} - v_{0x})/h \\ e & = (v_{1y} - v_{0y})/w \\ f & = (v_{2y} - v_{0y})/h \end{cases} \tag{4}$$

For 4-parameter affine model, if top-left corner CPMV and top-right corner CPMV, termed as V0 and V1, are available, the six parameters of a, b, c, d, e and f can be calculated as $$\begin{cases} a &= v_{0x} \\ b &= v_{0y} \\ c &= (v_{1x} - v_{0x})/w \\ d &= -(v_{1y} - v_{0y})/w \\ e &= (v_{1y} - v_{0y})/w \\ f &= (v_{1x} - v_{0x})/w \end{cases} \quad (5)$$

For 4-parameter affine model, if top-left corner CPMV and bottom-left corner CPMV, termed as V0 and V2, are available, the six parameters of a, b, c, d, e and f can be calculated as $$\begin{cases} a &= v_{0x} \\ b &= v_{0y} \\ c &= (v_{2y} - v_{0y})/h \\ d &= (v_{2x} - v_{0x})/h \\ e &= -(v_{2x} - v_{0x})/h \\ f &= (v_{2y} - v_{0y})/h \end{cases} \quad (6)$$

In above equations (4), (5), and (6), w and h represent the width and height of the current block, respectively.

When two merge candidate sets of CPMVs are compared for redundancy check, it is proposed to check the similarity of the 6 affine model parameters. Therefore, the candidate pruning process can be performed in two steps.

In Step 1, given two candidate sets of CPMVs, the corresponding affine model parameters for each candidate set are derived. More specifically, the two candidate sets of CPMVs may be represented by two sets of affine model parameters, e.g., ($a_1$, $b_1$, $c_1$, $d_1$, $e_1$, $f_1$) and ($a_2$, $b_2$, $c_2$, $d_2$, $e_2$, $f_2$).

In Step 2, based on one or more pre-defined threshold values, similarity check is performed between the two sets of affine model parameters. In one embodiment, when the absolute values of ($a_1$-$a_2$), ($b_1$-$b_2$), ($c_1$-$c_2$), ($d_1$-$d_2$), ($e_1$-$e_2$) and ($f_1$-$f_2$) are all below a positive threshold value, such as the value of 1, the two candidates are considered to be similar and one of them can be pruned/removed and not put in the merge candidate list.

In some embodiments, the divisions or right shift operations in Step 1 may be removed to simplify the calculations in the CPMV pruning process.

Specifically, the model parameters of c, d, e and f may be calculated without being divided by the width w and height h of the current block. For example, take above equation (4) as an example, the approximated model parameters of c', d', e' and f' may be calculated as below equation (7).

$$\begin{cases} c' &= (v_{1x} - v_{0x}) \\ d' &= (v_{2x} - v_{0x}) \\ e' &= (v_{1y} - v_{0y}) \\ f' &= (v_{2y} - v_{0y}) \end{cases} \quad (7)$$

In the case that only two CPMVs are available, part of the model parameters is derived from the other part of the model parameters, which are dependent on the width or height of the current block. In this case, the model parameters may be converted to take the impact of the width and height into account. For example, in the case of the equation (5), the approximated model parameters of c', d', e' and f' may be calculated based on equation (8) below. In the case of the equation (6), the approximated model parameters of c', d', e' and f' may be calculated based on equation (9) below.

$$\begin{cases} c' &= (v_{1x} - v_{0x}) \\ e' &= (v_{1y} - v_{0y}) \\ d' &= -(e' * h/w) \\ f' &= c' * h/w \end{cases} \quad (8)$$

$$\begin{cases} d' &= (v_{2x} - v_{0x}) \\ f' &= (v_{2y} - v_{0y}) \\ c' &= f' * w/h \\ e' &= -(d' * w/h) \end{cases} \quad (9)$$

When the approximated model parameters of c', d', e' and f' are calculated in above Step 1, the calculation of the absolute values that are needed for similarity check in the Step 2 above may be changed accordingly: ($a_1$-$a_2$), ($b_1$-$b_2$), $$(c_1' - c_2'),\ (d_1' - d_2'),\ (e_1' - e_2') \text{ and } (f_1' - f_2').$$

In the Step 2 above, threshold values are needed to evaluate the similarity between two candidate sets of CPMV. There may be multiple ways to define the threshold values. In one embodiment, the threshold values may be defined per comparable parameter. Table 1 is one example in this embodiment showing threshold values defined per comparable model parameter. In another embodiment, the threshold values may be defined by considering the size of the current coding block. Table 2 is one example in this embodiment showing threshold values defined by the size of the current coding block.

TABLE 1

| Comparable parameter | Threshold value |
|---|---|
| a | 1 |
| b | 1 |
| c | 2 |
| d | 2 |
| e | 2 |
| f | 2 |

TABLE 2

| Size of the current block | Threshold value |
|---|---|
| Size <= 64 pixels | 1 |
| 64 pixels < Size <= 256 pixels | 2 |
| 256 pixels < Size <= 1024 pixels | 4 |
| 1024 pixels < Size | 8 |

In another embodiment, the threshold values may be defined by considering the weight or the height of the current block. Table 3 and Table 4 are examples in this embodiment. Table 3 shows threshold values defined by the width of the current coding block and Table 4 shows threshold values defined by the height of the current coding block.

TABLE 3

| Width of the current block | Threshold value |
|---|---|
| Width <= 8 pixels | 1 |
| 8 pixels < Width <= 32 pixels | 2 |
| 32 pixels < Width <= 64 pixels | 4 |
| 64 pixels < Width | 8 |

TABLE 4

| Height of the current block | Threshold value |
|---|---|
| Height <= 8 pixels | 1 |
| 8 pixels < Height <= 32 pixels | 2 |
| 32 pixels < Height <= 64 pixels | 4 |
| 64 pixels < Height | 8 |

In another embodiment, the threshold values may be defined as a group of fixed values. In another embodiment, the threshold values may be defined by any combinations of above embodiments. In one example, the threshold values may be defined by considering different parameters and the weight and the height of the current block. Table 5 is one example in this embodiment showing threshold values defined by the height of the current coding block. Note that in any above proposed embodiments, the comparable parameters, if needed, may represent any parameters defined in any equations from equation (4) to equation (9).

TABLE 5

| Comparable parameter | Threshold value |
|---|---|
| a | 1 |
| b | 1 |
| c | Width <= 8 pixels: 1 |
| e | 8 pixels < Width <= 32 pixels: 2 |
| | 32 pixels < Width <= 64 pixels: 4 |
| | 64 pixels < Width: 8 |
| d | Height <= 8 pixels: 1 |
| f | 8 pixels < Height <= 32 pixels: 2 |
| | 32 pixels < Height <= 64 pixels: 4 |
| | 64 pixels < Height: 8 |

The benefits of using the converted affine model parameters for candidate redundancy check include that: it creates a unified similarity check process for candidates with different affine model types, e.g., one merge candidate may user 6-parameter affine model with three CPMVs while another candidate may use 4-parameter affine model with two CPMVs; it considers the different impacts of each CPMV in a merge candidate when deriving the target MV at each sub-block; and it provides the similarity significance of two affine merge candidates related to the width and height of the current block.

Non-Adjacent Neighbor Based Derivation Process for Affine Inherited Merge Candidates For inherited merge candidates, non-adjacent neighbor based derivation process may be performed in three steps. Step 1 is for candidate scanning. Step 2 is for CPMV projection. Step 3 is for candidate pruning.

In Step 1, non-adjacent neighboring blocks are scanned and selected by following methods.

Scanning Area and Distance

In some examples, non-adjacent neighboring blocks may be scanned from left area and above area of the current coding block. The scanning distance may be defined as the number of coding blocks from the scanning position to the left side or top side of the current coding blocks.

As shown in FIG. 8, on either the left or above of the current coding block, multiple lines of non-adjacent neighboring blocks may be scanned. The distance shown in FIG. 8 represents the number of coding blocks from each candidate position to the left side or top side of the current block. For example, the area with “distance 2 (D2)” on the left side of the current block indicates that the candidate neighboring blocks located in this area are 2 blocks away from the current block. Similar indications may be applied to other scanning areas with different distances.

Figures 13A, 13B:
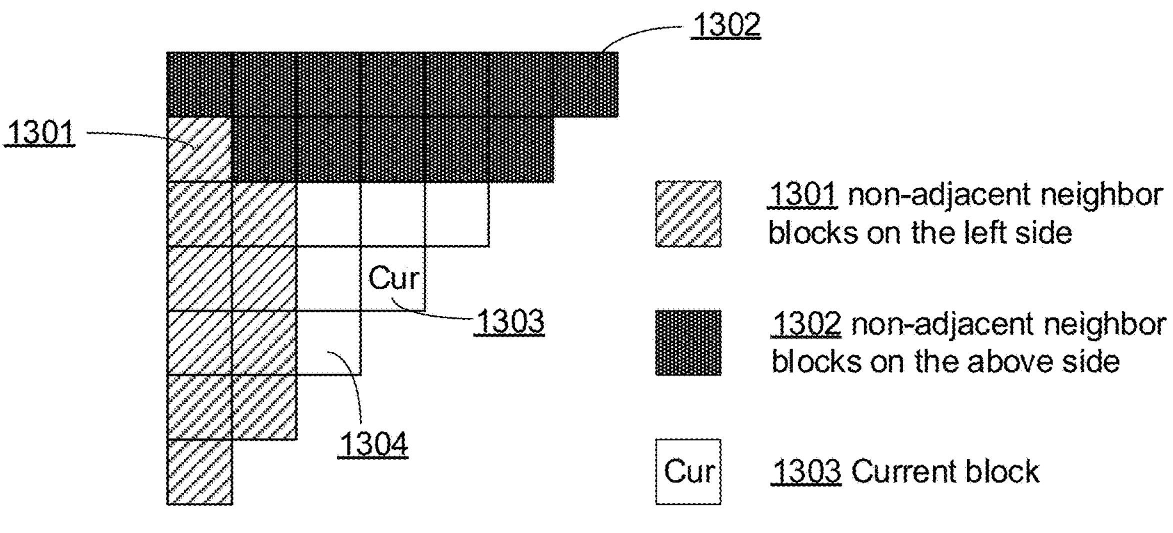
FIG. 13A illustrates neighbor blocks with the same size as the current block in accordance with some examples of the present disclosure.
FIG. 13B illustrates neighbor blocks with a different size than the current block in accordance with some examples of the present disclosure.

In one or more embodiments, the non-adjacent neighboring blocks at each distance may have the same block size as the current coding block, as shown in the FIG. 13A. As shown in FIG. 13A, the non-adjacent neighbor blocks 1301 on the left side and the non-adjacent neighbor blocks 1302 on the above side have the same size as the current block 1303. In some embodiments, the non-adjacent neighboring blocks at each distance may have a different block size as the current coding block, as shown in the FIG. 13B. The neighbor block 1304 is an adjacent neighbor block to the current block 1303. As shown in FIG. 13B, the non-adjacent neighbor blocks 1305 on the left side and the non-adjacent neighbor blocks 1306 on the above side have the same size as the current block 1307. The neighbor block 1308 is an adjacent neighbor block to the current block 1307.

Figure 10:
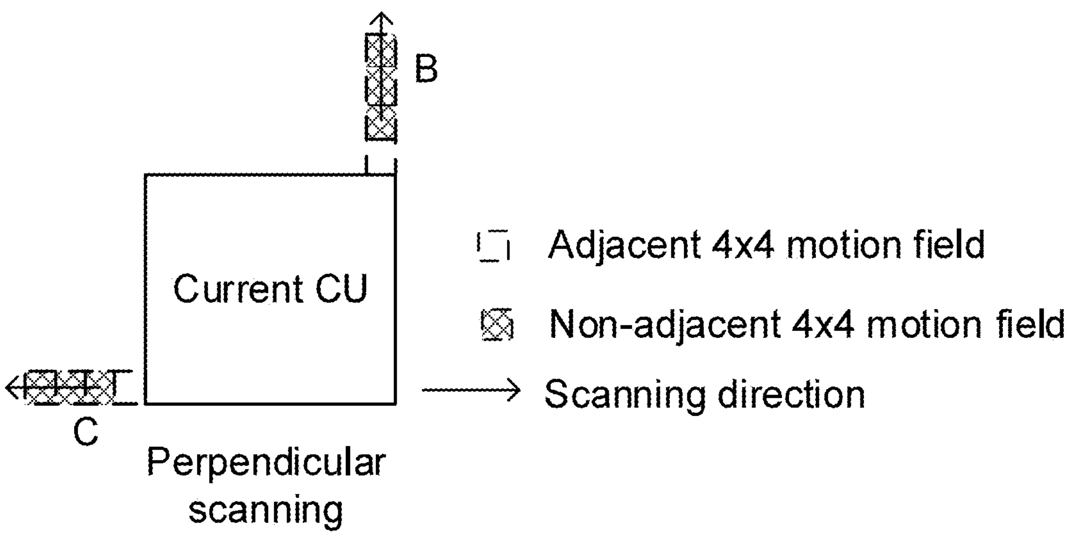
FIG. 10 illustrates perpendicular scanning of non-adjacent neighboring blocks in accordance with some examples of the present disclosure.

Note that when the non-adjacent neighboring blocks at each distance have the same block size as the current coding block, the value of the block size is adaptively changed according to the partition granularity at each different area in an image. Note that when the non-adjacent neighboring blocks at each distance have a different block size as the current coding block, the value of the block size may be predefined as a constant value, such as 4×4, 8×8 or 16×16. The 4×4 non-adjacent motion fields shown in FIG. 10 and FIG. 12 are examples in this case, where the motion fields may be considered as, but not limited to, special cases of sub-blocks.

Figures 11, 12:
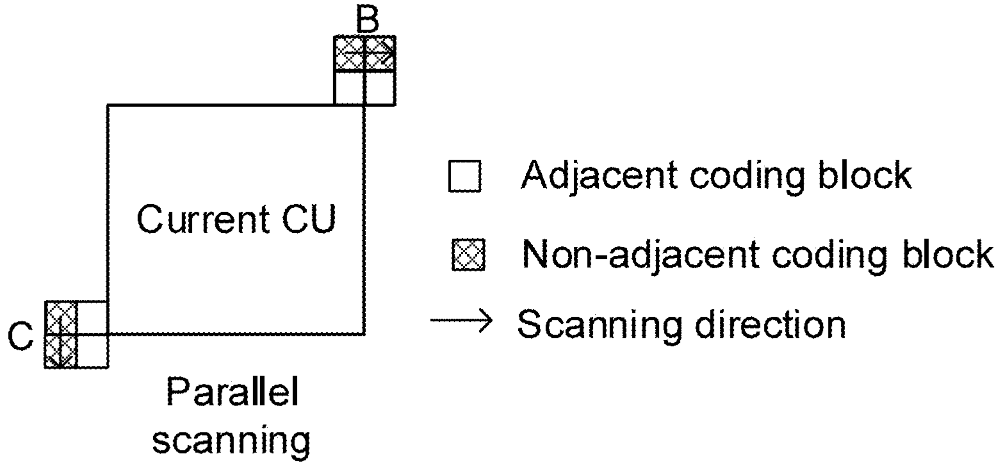
FIG. 11 illustrates parallel scanning of non-adjacent neighboring blocks in accordance with some examples of the present disclosure.
FIG. 12 illustrates combined perpendicular and parallel scanning of non-adjacent neighboring blocks in accordance with some examples of the present disclosure.

Similarly, the non-adjacent coding blocks shown in FIG. 11 may have different sizes as well. In one example, the non-adjacent coding blocks may have the size as the current coding block, which is adaptively changed. In another example, the non-adjacent coding blocks may have a predefined size with a fixed value, such as 4×4, 8×8 or 16×16.

Based on the defined scanning distance, the total size of the scanning area on either the left or above of the current coding clock may be determined by a configurable distance value. In one or more embodiments, the maximum scanning distance on the left side and above side may use a same value or different values. FIG. 13 shows an example where the maximum distance on both the left side and above side shares a same value of 2. The maximum scanning distance value(s) may be determined by the encoder side and signaled in a bitstream. Alternatively, the maximum scanning distance value(s) may be predefined as fixed value(s), such as the value of 2 or 4. When the maximum scanning distance is predefined as the value of 4, it indicates that the scanning process is terminated when the candidate list is full or all the non-adjacent neighboring blocks with at most distance 4 have been scanned, whichever comes first.

In one or more embodiments, within each scanning area at a specific distance, the starting and ending neighboring blocks may be position dependent.

In some embodiments, for the left side scanning areas, the starting neighboring blocks may be the adjacent bottom-left block of the starting neighboring block of the adjacent scanning area with smaller distance. For example, as shown in FIG. 8, the starting neighboring block of the “distance 2”

scanning area on the left side of the current block is the adjacent bottom-left neighboring block of the starting neighboring block of the "distance 1 (D1)" scanning area. In FIG. 8, D1, D2, D3 respectively indicates distance 1, distance 2, and distance 3. The ending neighboring blocks may be the adjacent left block of the ending neighboring block of the above scanning area with smaller distance. For example, as shown in FIG. 8, the ending neighboring block of the "distance 2" scanning area on the left side of the current block is the adjacent left neighboring block of the ending neighboring block of the "distance 1" scanning area above the current block.

Similarly, for the above side scanning areas, the starting neighboring blocks may be the adjacent top-right block of the starting neighboring block of the adjacent scanning area with smaller distance. The ending neighboring blocks may be the adjacent top-left block of the ending neighboring block of the adjacent scanning area with smaller distance.

Scanning Order

When the neighboring blocks are scanned in the non-adjacent areas, certain order or/and rules may be followed to determine the selections of the scanned neighboring blocks.

In some embodiments, the left area may be scanned first, and then followed by scanning the above areas. As shown in FIG. 8, three lines of non-adjacent areas (e.g., from distance 1 (D1) to distance 3 (D3)) on the left side may be scanned first, then followed by scanning the three lines of non-adjacent areas above the current block.

In some embodiments, the left areas and above areas may be scanned alternatively. For example, as shown in FIG. 8, the left scanning area with "distance 1" is scanned first, then followed by the scanning the above area with "distance 1."

For scanning areas located on the same side (e.g., left or above areas), the scanning order is from the areas with small distance to the areas with large distance. This order may be flexibly combined with other embodiments of scanning order. For example, the left and above areas may be scanned alternatively, and the order for same side areas is scheduled to be from small distance to large distance.

Within each scanning area at a specific distance, a scanning order may be defined. In one embodiment, for the left scanning areas, the scanning may be started from the bottom neighboring block to the top neighboring block. For the above scanning areas, the scanning may be started from the right block to the left block.

Scanning Termination

For inherited merge candidates, the neighboring blocks coded with affine mode are defined as qualified candidates. In some embodiments, the scanning process may be performed interactively. For example, the scanning performed in a specific area at a specific distance may be stopped at the instance when first X qualified candidates are identified, where X is a predefined positive value. For example, as shown in FIG. 8, the scanning in the left scanning area with distance 1 may be stopped when the first one or more qualified candidates are identified. Then the next iteration of scanning process is started by targeting at another scanning area, which is regulated by a pre-defined scanning order/rule.

In one or more embodiments, the X may be defined for each distance. For example, at each distance, X is set to be 1, which means the scanning is terminated for each distance if the first qualified candidate is found and the scanning process is restarted from a different distance of the same area or the same or different distance of a different area. Note that the value of X may be set as the same value or different values for different distances. If the maximum number of qualified candidates are found from all allowable distances (e.g., regulated by a maximum distance) of an area, the scanning process for one area is completely terminated.

In another embodiment, the X may be defined for an area. For example, X is set to be 3, which means the scanning is terminated for the whole area (e.g., left or above area of the current block) if the first 3 qualified candidates are found and the scanning process is restarted from the same or different distance of another area. Note that the value of X may be set as the same value or different values for different areas. If the maximum number of qualified candidates are found from all areas, the whole scanning process is completely terminated.

The values of X may be defined for both distance and areas. For example, for each area (e.g., left or above area of the current block), X is set to 3, and for each distance, X is set to 1. The values of X may be set as the same value or different values for different areas and distances.

In some embodiments, the scanning process may be performed continuously. For example, the scanning performed in a specific area at a specific distance may be stopped at the instance when all covered neighboring blocks are scanned and no more qualified candidates are identified or the maximum allowable number of candidates is reached.

During the candidate scanning process, each candidate non-adjacent neighboring block is determined and scanned by following the above proposed scanning methods. For easier implementation, each candidate non-adjacent neighboring block may be indicated or located by a specific scanning position. Once a specific scanning area and distance are decided by following above proposed methods, the scanning positions may be determined accordingly based on following methods.

Figure 15A:
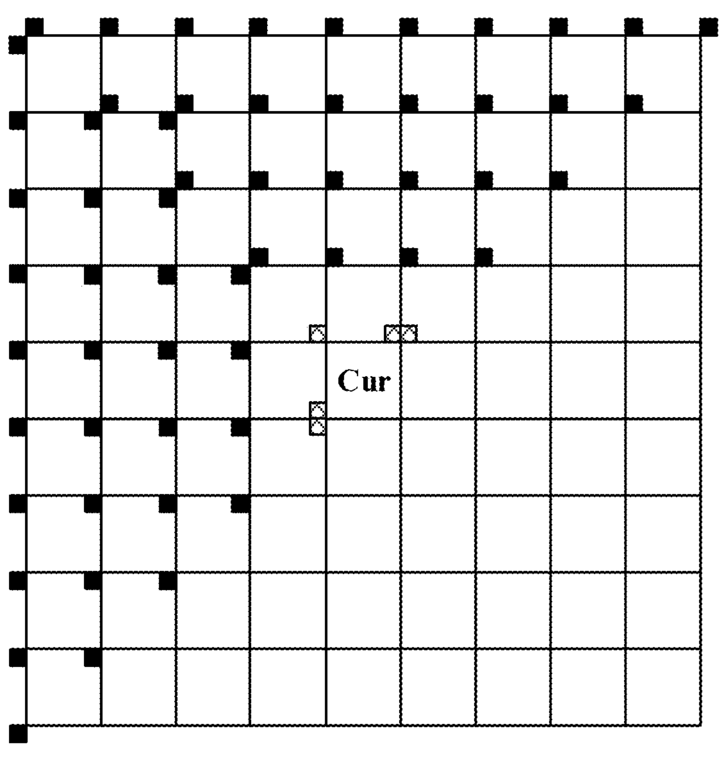
FIG. 15A illustrates scanning positions at bottom-left and top-right positions used for above and left non-adjacent neighboring blocks in accordance with some examples of the present disclosure.

In one method, bottom-left and top-right positions are used for above and left non-adjacent neighboring blocks respectively, as shown in FIG. 15A.

Figure 15B:
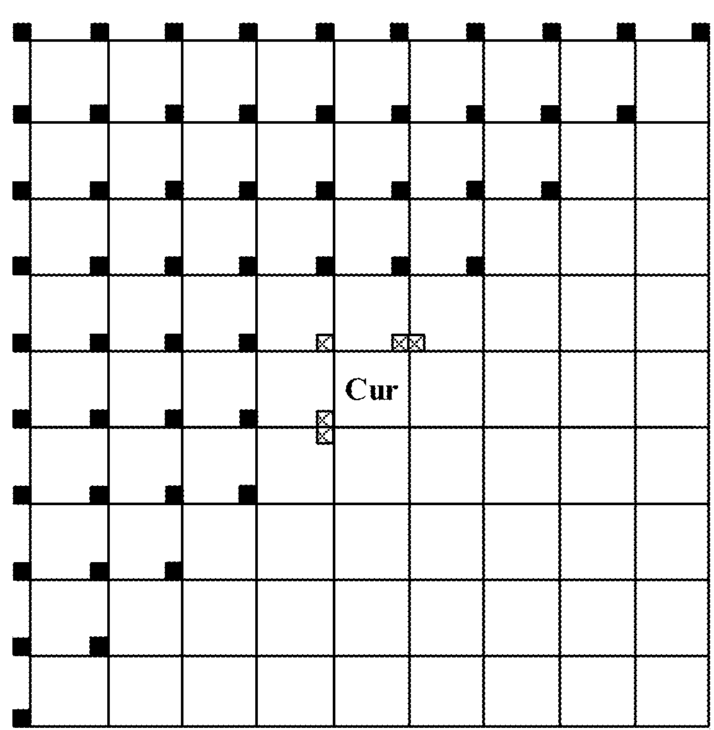
FIG. 15B illustrates scanning positions at bottom-right positions used for both above and left non-adjacent neighboring blocks in accordance with some examples of the present disclosure.

In another method, bottom-right positions are used for both above and left non-adjacent neighboring blocks, as shown in FIG. 15B.

Figure 15C:
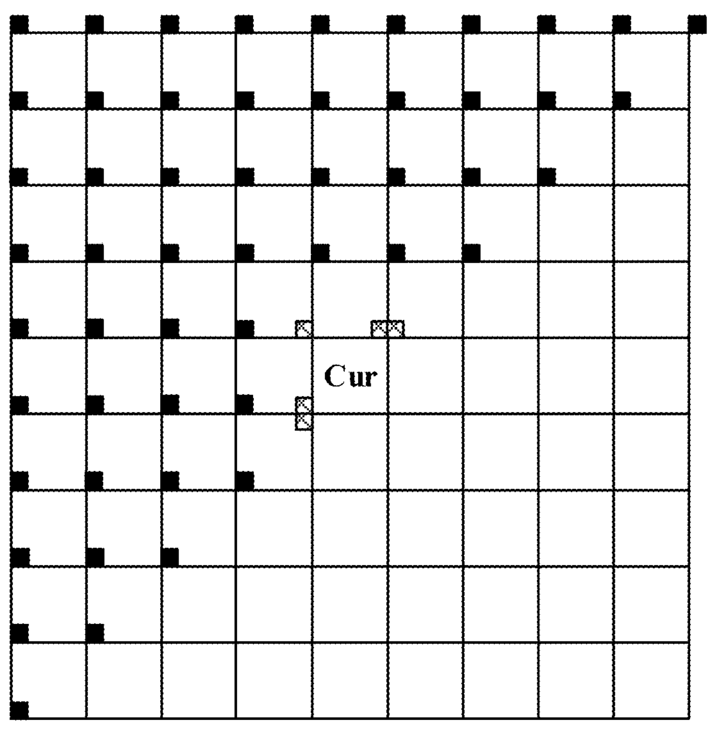
FIG. 15C illustrates scanning positions at bottom-left positions used for both above and left non-adjacent neighboring blocks in accordance with some examples of the present disclosure.

In another method, bottom-left positions are used for both above and left non-adjacent neighboring blocks, as shown in FIG. 15C.

Figure 15D:
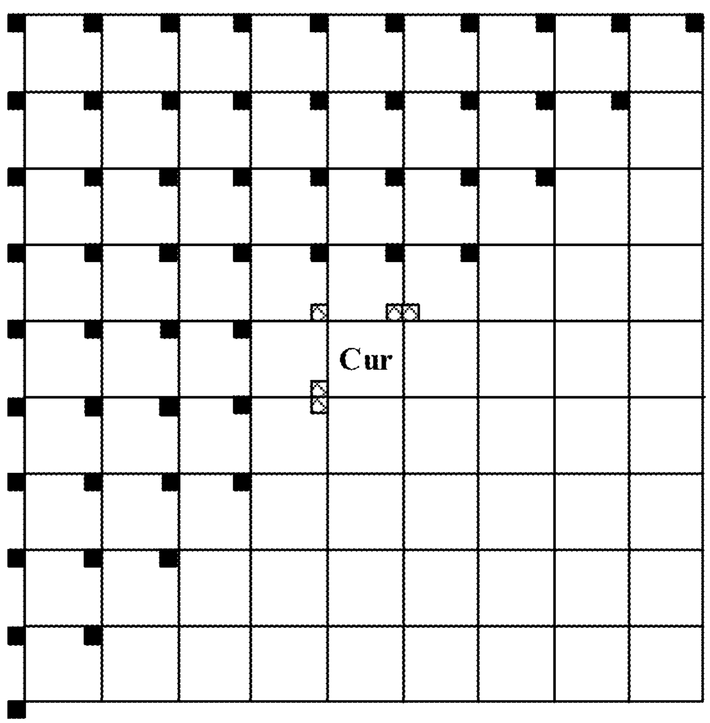
FIG. 15D illustrates scanning positions at top-right positions used for both above and left non-adjacent neighboring blocks in accordance with some examples of the present disclosure.

In another method, top-right positions are used for both above and left non-adjacent neighboring blocks, as shown in FIG. 15D.

For easier illustration, in FIGS. 15A-15D, each non-adjacent neighboring block is assumed to have the same block size as the current block. Without loss of generality, this illustration may be easily extended to non-adjacent neighboring blocks with different block sizes.

Further, in Step 2, the same process of CPMV projection as used in the current AVS and VVC standards may be utilized. In this CPMV projection process, the current block is assumed to share the same affine model with the selected neighboring block, then two or three corner pixel's coordinates (e.g., if the current block uses 4-parameter model, two coordinates (top-left pixel/sample location and top-right pixel/sample location) are used; if the current block uses 6-parameter model, three coordinates (top-left pixel/sample location, top-right pixel/sample location and bottom-left pixel/sample location) are used) are plugged into equation (1) or (2), which depends on whether the neighboring block is coded with a 4-parameter or 6-parameter affine model, to generate two or three CPMVs.

In Step 3, any qualified candidate that is identified in Step 1 and converted in Step 2 may go through a similarity check against all existing candidates that are already in the merge candidate list. The details of similarity check are already described in the section of "Affine Merge Candidate Pruning" above. If the newly qualified candidate is found to be similar with any existing candidate in the candidate list, this newly qualified candidate is removed/pruned.

Non-Adjacent Neighbor Based Derivation Process for Affine Constructed Merge Candidates In the case of deriving inherited merge candidates, one neighboring block is identified at one time, where this single neighboring block needs to be coded in affine mode and may contain two or three CPMVs. In the case of deriving constructed merge candidates, two or three neighboring blocks may be identified at one time, where each identified neighboring block does not need to be coded in affine mode and only one translational MV is retrieved from this block.

Figure 9:
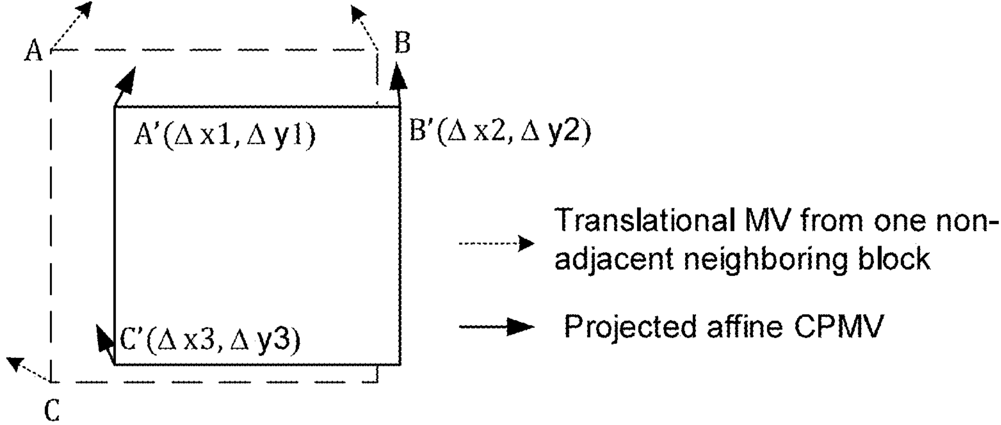
FIG. 9 illustrates derivation of constructed affine merge candidates using non-adjacent neighboring blocks in accordance with some examples of the present disclosure.

FIG. 9 presents an example where constructed affine merge candidates may be derived by using non-adjacent neighboring block. In FIGS. 9, A, B and C are the geographical positions of three non-adjacent neighboring blocks. A virtual coding block is formed by using the position of A as the top-left corner, the position of B as the top-right corner, and the position of C as the bottom-left corner. If considering the virtual CU as an affine coded block, the MVs at the positions of A', B' and C' may be derived by following the equation (3), where the model parameters (a, b, c, d, e, f) may be calculated by the translational MV at the positions of A, B and C. Once derived, the MVs at positions of A', B' and C' may be used as the three CPMVs for the current block, and the existing process (the one used in the AVS and VVC standards) of generating constructed affine merge candidates may be used.

For constructed merge candidates, non-adjacent neighbor based derivation process may be performed in five steps. The non-adjacent neighbor based derivation process may be performed in the five steps in an apparatus such as an encoder or a decoder. Step 1 is for candidate scanning. Step 2 is for affine model determination. Step 3 is for CPMV projection. Step 4 is for candidate generation. And Step 5 is for candidate pruning. In Step 1, non-adjacent neighboring blocks may be scanned and selected by following methods.

Scanning Area and Distance

In some embodiments, to maintain a rectangular coding block, the scanning process is only performed for two non-adjacent neighboring blocks. The third non-adjacent neighboring block may be dependent on the horizontal and vertical positions of the first and second non-adjacent neighboring blocks.

In some embodiments, as shown in FIG. 9, the scanning process is only performed for the positions of B and C. The position of A may be uniquely determined by the horizontal position of C and the vertical position of B.

To form a valid virtual coding block, the position of A may need to be at least valid. The validity of position A may be defined as whether the motion information at the position A is available or not. In one embodiment, the coding block located at the position A may need to be coded in inter-modes such that the motion information is available to form a virtual coding block.

In some embodiments, the scanning area and distance may be defined according to a specific scanning direction.

In some embodiments, the scanning direction may be perpendicular to the side of the current block. One example is shown in FIG. 10, where the scanning area is defined as one line of continuous motion fields on the left or above the current block. The scanning distance is defined as the number of motion fields from the scanning position to the side of the current block. Note that the size of the motion filed may be dependent on the max granularity of the applicable video coding standards. In the example shown in FIG. 10, the size of the motion field is assumed to be aligned with the current VVC standards and set to be 4×4.

In some embodiments, the scanning direction may be parallel to the side of the current block. One example is shown in FIG. 11, where the scanning area is defined as the one line of continuous coding blocks on the left or above the current block.

In some embodiments, the scanning direction may be a combination of perpendicular and parallel scanning to the side of the current block. One example is shown in FIG. 12. As shown in FIG. 12, the scanning direction may be also a combination of parallel and diagonal. Scanning at position B starts from left to right, and then in a diagonal direction to the left and upper block. The scanning at position B will repeat as shown in FIG. 12. Similarly, scanning at position C starts from top to bottom, and then in a diagonal direction to the left and upper block. The scanning at position C will repeat as shown in FIG. 12.

Scanning Order

In some embodiments, the scanning order may be defined as from the positions with smaller distance to the positions with larger distance to the current coding block. This order may be applied to the case of perpendicular scanning.

In some embodiments, the scanning order may be defined as a fixed pattern. This fix-pattern scanning order may be used for the candidate positions with similar distance. One example is the case of parallel scanning. In one example, the scanning order may be defined as top-down direction for the left scanning area, and may be defined as from left to right directions for the above scanning areas, like the example shown in FIG. 11.

For the case of the combined scanning method, the scanning order may be a combination of fix-pattern and distance dependent, like the example shown in FIG. 12.

Scanning Termination

For constructed merge candidates, the qualified candidate does not need to be affine coded since only translational MV is needed.

Dependent on the required number of candidates, the scanning process may be terminated when the first X qualified candidates are identified, where X is a positive value.

As shown in FIG. 9, in order to form a virtual coding block, three corners named as A, B and C are needed. For easier implementation, the scanning process in Step 1 may be only performed for identifying the non-adjacent neighboring blocks located at corners B and C, while the coordinate of A may be precisely determined by taking the horizontal coordinate of C and the vertical coordinate of B. In this way, the formed virtual coding block is restricted to be rectangle. In the case when either B or C point is unavailable, e.g., out of boundary, or the motion information at the non-adjacent neighboring blocks corresponding to B or C is unavailable (e.g., the block is coded in intra-mode or screen-content modes), the horizontal coordinate or vertical coordinate of C may be defined as the horizontal coordinate or vertical coordinate of the top-left point of the current block respectively.

In another embodiment, when the corner B and/or corner C is firstly determined from the scanning process in Step 1, the non-adjacent neighboring blocks located at corner B and/or C may be identified accordingly. Secondly, the position(s) of the corner B and/or C may be reset to pivot point within the corresponding non-adjacent neighboring blocks, such as the mass center of each non-adjacent neighboring block. For example, the mass center may be defined as the geometric center of each neighboring block.

When scanning process is performed for corners B and corner C as shown in FIG. 9, the process may be performed jointly or independently. In examples of independent scanning, the previously proposed scanning methods may be applied separately on the corners B and C. In examples of joint scanning, there may be different methods as follows.

In one embodiment, pairwise scanning may be performed. In one example of pairwise scanning, the candidate positions for corners B and C are simultaneously advanced. For easier illustration and without loss of generality, it is to take FIG. 17B as an example. As shown in the FIG. 17B, the scanning of corner B is started from the first non-adjacent neighboring block located on the above side of the current block, in a bottom-to-up direction. The scanning of corner C is started from the first non-adjacent neighboring block located on the left side of the current block, in a right-to-left direction. Therefore, in the example shown in FIG. 17B, pairwise scanning may be defined as that the candidate positions of B and C are both advanced with one unit of step size, where one unit of step size is defined as the height of the current coding block for corner B and defined as the width of the current coding block for corner C.

In another embodiment, alternative scanning may be performed. In one example of alternative scanning, the candidate positions for corners B and C are alternatively advanced. At one step, only the position of B or C may be advanced, while the position of C or B is not changed. In one example, the position of corner B may be progressively increased from the first non-adjacent neighboring block to the distance at the maximum number of non-adjacent neighboring blocks, while the position of corner C remains at the first non-adjacent neighboring block. In the next round, the position of the corner C moves to the second non-adjacent neighboring block, and the position of the corner B is traversed from the first to the maximum value again. The rounds are continued until all combinations are traversed.

For unification purpose, the methods of defining scanning area and distance, scanning order, and scanning termination proposed for deriving inherited merge candidates may completely or partially reused for deriving constructed merge candidates. In one or more embodiments, the same methods defined for inherited merge candidate scanning, which include but no limited to scanning area and distance, scanning order and scanning termination, may be completely reused for constructed merge candidate scanning.

Figure 16:
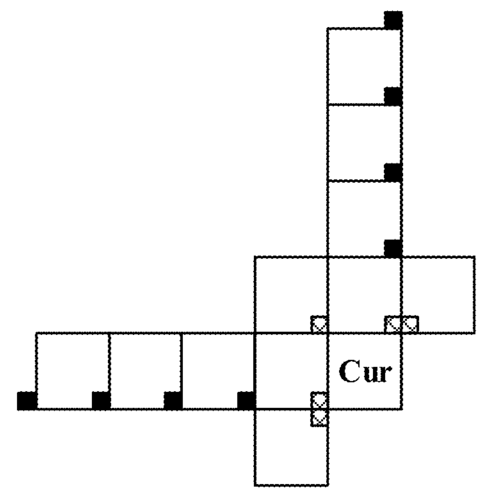
FIG. 16 illustrates a simplified scanning process for deriving constructed merge candidates in accordance with some examples of the present disclosure.

In some embodiments, the same methods defined for inherited merge candidate scanning, may be partly reused for constructed merge candidate scanning. FIG. 16 shows an example in this case. In FIG. 16, the block size of each non-adjacent neighboring blocks is same as the current block, which is similarly defined as inherited candidate scanning, but the whole process is a simplified version since the scanning at each distance is limited to be only one block.

Figure 17A:
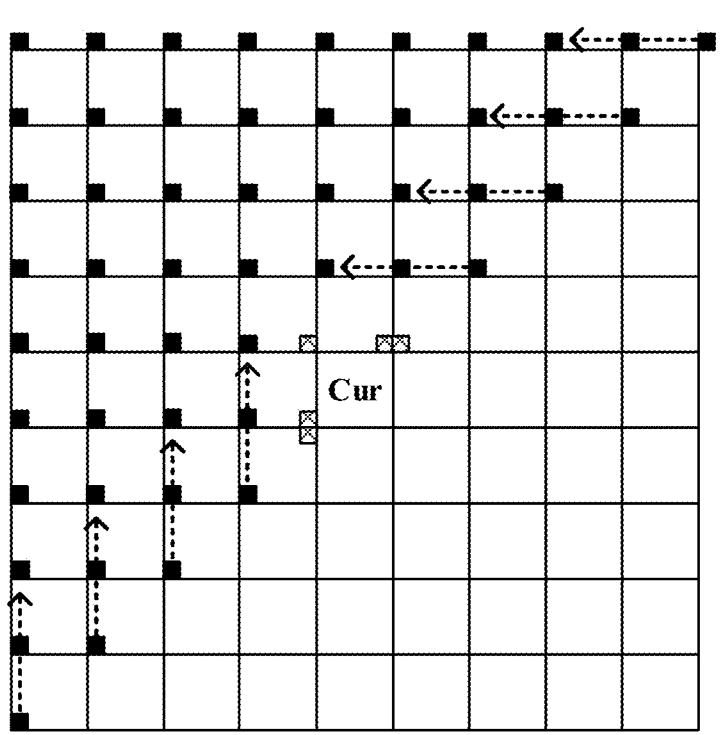
FIG. 17A illustrates spatial neighbors for deriving inherited affine merge candidates in accordance with some examples of the present disclosure.
Figure 17B:
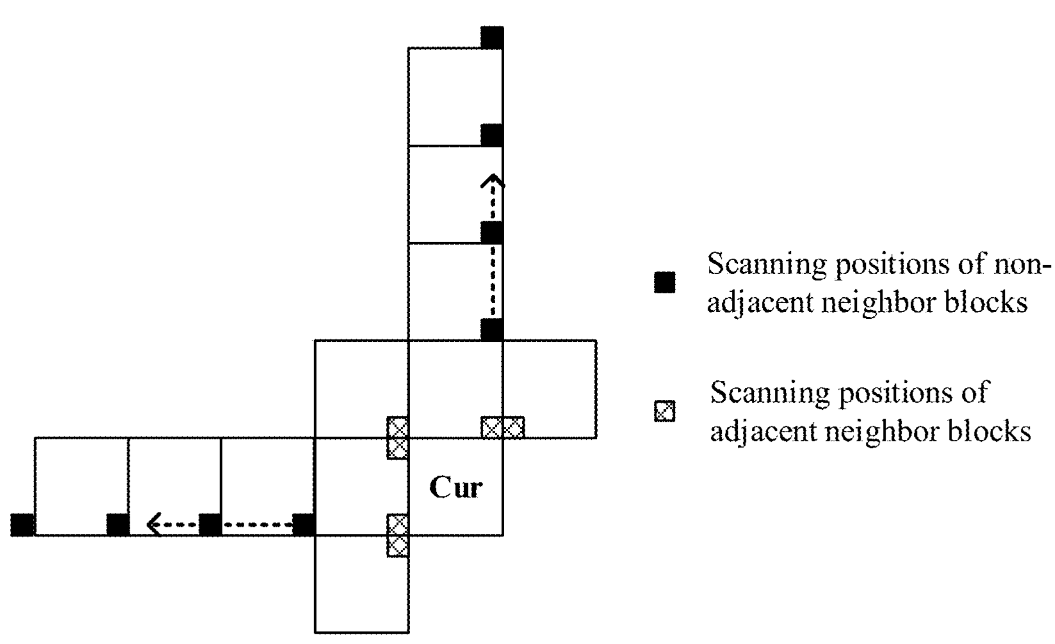
FIG. 17B illustrates spatial neighbors for deriving constructed affine merge candidates in accordance with some examples of the present disclosure.

FIGS. 17A-17B represent another example in this case. In FIGS. 17A-17B, both non-adjacent inherited merge candidates and non-adjacent constructed merge candidates are defined with the same block size as the current coding block, while the scanning order, scanning area, and scanning termination conditions may be defined differently.

In FIG. 17A, the maximum distance for left side non-adjacent neighbors is 4 coding blocks, while the maximum distance for above side non-adjacent neighbors is 5 coding blocks. Also, at each distance, the scanning direction is bottom-up for left side and right-to-left for above side. In FIG. 17B, the maximum distance of non-adjacent neighbors is 4 for both left side and above side. In addition, the scanning at a specific distance is unavailable because there is only one block at each distance. In FIG. 17A, the scanning operations within each distance may be terminated if M qualified candidates are identified. The value of M may be a predefined fixed value such as the value of 1 or any other positive integer, or a signaled value decided by the encoder, or a configurable value at the encoder or the decoder. In one example, the value of M may be the same as the merge candidate list size.

In FIGS. 17A-17B, the scanning operations at different distances may be terminated if N qualified candidates are identified. The value of N may be a predefined fixed value such as the value of 1 or any other positive integer, or a signaled value decided by the encoder, or a configurable value at the encoder or the decoder. In one example, the value of N may be the same as the merge candidate list size. In another example, the value of N may be the same as the value of M.

In both FIGS. 17A-17B, the non-adjacent spatial neighbors with closer distance to the current block may be prioritized, which indicates that non-adjacent spatial neighbors with distance i is scanned or checked before the neighbors with distance i+1, where i may be a non-negative integer representing a specific distance.

At a specific distance, up to two non-adjacent spatial neighbors are used, which means at most one neighbor from one side, e.g., the left and above, of the current block is selected for inherited or constructed candidate derivation, if available. As shown in FIG. 17A, the checking orders of the left side and above side neighbors are bottom-up and right-left, respectively. For FIG. 17B, this rule may be also applied, where the difference may be that at any specific distance there is only one option for each side of the current block.

For constructed candidates, as shown in the FIG. 17B, the positions of one left and above non-adjacent spatial neighbors are firstly determined independently. After that, the location of the top-left neighbor can be determined accordingly which can enclose a rectangular virtual block together with the left and above non-adjacent neighbors. Then, as shown in the FIG. 9, the motion information of the three non-adjacent neighbors is used to form the CPMVs at the top-left (A), top-right (B) and bottom-left (C) of the virtual block, which is finally projected to the current CU to generate the corresponding constructed candidates.

In Step 2, the translational MVs at the positions of the selected candidates after step 1 are evaluated and an appropriate affine model may be determined. For easier illustration and without loss of generality, FIG. 9 is used as an example again.

Due to factors such as hardware constrains, implementation complexity and different reference indexes, the scanning process may be terminated before enough number of candidates are identified. For example, the motion information of the motion field at one or more of the selected candidates after Step 1 may be unavailable.

If the motion information of all three candidates are available, the corresponding virtual coding block represents a 6-parameter affine model. If the motion information of one of the three candidates is unbailable, the corresponding virtual coding block represents a 4-parameter affine model. If the motion information of more than one of the three candidates is unbailable, the corresponding virtual coding block may be unable to represent a valid affine model.

In some embodiments, if the motion information at the top-left corner, e.g., the corner A in FIG. 9, of the virtual coding block is unavailable, or the motion information at both the top-right corner, e.g., the corner B in FIG. 9, and bottom-left corner, e.g., the corner C in the FIG. 9, is unavailable, the virtual block may be set to be invalid and unable to represent a valid model, then Step 3 and Step 4 may be skipped for the current iteration.

In some embodiments, if either the top-right corner, e.g., the corner B in the FIG. 9, or bottom-left corner, e.g., the corner C in FIG. 9, is unavailable, but not both are unavailable, the virtual block may represent a valid 4-parameter affine model.

In Step 3, if the virtual coding block is able to represent a valid affine model, the same projection process used for inherited merge candidate may be used.

In one or more embodiments, the same projection process used for inherited merge candidate may be used. In this case, a 4-parameter model represented by the virtual coding block from Step 2 is projected to a 4-parameter model for the current block, and a 6-parameter model represented by the virtual coding block from Step 2 is projected to a 6-parameter model for the current block.

In some embodiments, the affine model represented by the virtual coding block from Step 2 is always projected to a 4-parameter model or a 6-parameter model for the current block.

Note that according to equation (5) and (6), there may be two types of 4-parameter affine model, where the type A is that the top-left corner CPMV and top-right corner CPMV, termed as $V_0$ and $V_1$, are available, and the type B is that the top-left corner CPMV and bottom-left corner CPMV, termed as $V_0$ and $V_2$, are available.

In one or more embodiments, the type of the projected 4-parameter affine model is the same type of the 4-parameter affine model represented by the virtual coding block. For example, the affine model represented by the virtual coding block from Step 2 is type A or B 4-parameter affine model, then the projected affine model for the current block is also type A or B respectively.

In some embodiments, the 4-parameter affine model represented by the virtual coding block from Step 2 is always projected to the same type of 4-parameter model for the current block. For example, the type A or B of 4-parameter affine model represented by the virtual coding block is always projected to the type A 4-parameter affine model.

In Step 4, based on the projected CPMVs after Step 3, in one example, the same candidate generation process used in the current VVC or AVS standards may be used. In another embodiment, the temporal motion vectors used in the candidate generation process for the current VVC or AVS standards may be not used for the non-adjacent neighboring blocks based derivation method. When the temporal motion vectors are not used, it indicates that the generated combinations do not contain any temporal motion vectors.

In Step 5, any newly generated candidate after Step 4 may go through a similarity check against all existing candidates that are already in the merge candidate list. The details of similarity check are already described in the section of "Affine merge candidate pruning." If the newly generated candidate is found to be similar with any existing candidate in the candidate list, this newly generated candidate is removed or pruned.

Inheritance Based Derivation Method for Affine Constructed Merge Candidates

For each affine inherited candidate, all the motion information is inherited from one selected spatial neighboring block which is coded in affine mode. The inherited information includes CPMVs, reference indexes, prediction direction, affine model type, etc. On the other hand, for each affine constructed candidate, all the motion information is constructed from two or three selected spatial or temporal neighboring blocks, while the selected neighboring blocks could be not coded in affine mode and only translational motion information is needed from the selected neighboring blocks.

In this section, a new candidate derivation method which combines the features of inherited candidates and constructed candidates is disclosed.

In some embodiments, the combination of inheritance and construction may be realized by separating the affine model parameters into different groups, where one group of affine parameters are inherited from one neighboring block, while other groups of affine parameters are inherited from other neighboring blocks.

In one example, the parameters of one affine model may be constructed from two groups. As shown in Equation (3), an affine model may contain 6 parameters, including a, b, c, d, e and f. The translational parameters {a, b} may represent one group, while the non-translational parameters {c, d, e, f} may represent another group. With this grouping method, the two groups of parameters may be independently inherited from two different neighboring blocks in the first step and then concatenated/constructed to be a complete affine model in the second step. In this case, the group with non-translational parameters has to be inherited from one affine coded neighboring block, while the group with translational parameters may be from any inter-coded neighboring block, which may or may not be coded in affine mode. Note that the affine coded neighboring block may be selected from adjacent affine neighboring blocks or non-adjacent affine neighboring blocks based on previously proposed scanning methods for affine inherited candidates, such as the methods shown in FIG. 17A, that is the scanning method/rule including the scanning area and distance, scanning order, and scanning termination used in the Section of "Non-Adjacent Neighbor Based Derivation Process for Affine Inherited Merge Candidates" while the scanning method may be performed on both adjacent neighbor blocks or non-adjacent neighbor blocks. Alternatively, the affine coded neighboring block may be not physically existed, but virtually constructed from regular inter-coded neighboring blocks, such as the methods shown in FIG. 17B, that is the scanning method/rule including the scanning area and distance, scanning order, and scanning termination used in the Section of "Non-Adjacent Neighbor Based Derivation Process for Affine Constructed Merge Candidates."

In some examples, the neighboring blocks associated with each group may be determined in different ways. In one method, the neighboring blocks for different groups of parameters may be all from non-adjacent neighboring areas, while the scanning methods may be similarly designed as the previously proposed methods for non-adjacent neighbor based derivation process. In another method, the neighboring blocks for different groups of parameters may be all from adjacent neighboring areas, while the scanning methods may be the same as the current VVC or AVS video standards. In another method, the neighboring blocks for different groups of parameters may be partly from adjacent areas and partly from non-adjacent neighboring areas.

When neighboring blocks are scanned from non-adjacent neighboring areas for constructing current type of candidates, the scanning process may be differently performed from the non-adjacent neighbor based derivation process for affine inherited candidates. In one or more embodiments, the scanning area, distance and order may be similarly defined, but the scanning termination rule may be differently specified. For example, the non-adjacent neighboring blocks may be exhaustively scanned within a defined maximum distance at each area. In this case, all non-adjacent neighboring blocks within a distance may be scanned by following a scanning order. In some embodiments, the scanning area may be different. For example, in addition to the left and above area, the right bottom adjacent and non-adjacent area of the current coding block may be scanned to determine neighbors for generating translational or/and non-translational parameters. In addition, the neighbors scanned at the right bottom area may be used to find collocated temporal neighbors, instead of spatial neighbors. One scanning criteria may be conditionally based on whether the right-bottom collocated temporal neighbor(s) is/are already used for generating affine constructed neighbors. If used already, the scanning is not performed, otherwise the scanning is performed. Alternatively, if used already, which means the right-bottom collocated temporal neighbor(s) is/are available, the scanning is performed, otherwise the scanning is not performed.

When several groups of affine parameters are combined to construct a new candidate, there may be several rules to be followed. The first is eligibility criteria. In one example, the associated neighboring block or blocks for each group may be checked whether to use the same reference picture for at least one direction or both directions. In another example, the associated neighboring block or blocks for each group may be checked whether use the same precision/resolution for motion vectors.

When certain criteria are checked, the first X associated neighboring block(s) for each group may be used. The value of X may be defined as the same or different values for different groups of parameters. For example, the first 1 or 2 neighboring blocks containing non-translational affine parameters may be used, while the first 3 or 4 neighboring blocks containing translational affine parameters may be used.

The second is construction formula. In one example, the CPMVs of the new candidates may be derived in equation below:

$$\begin{cases} CPMV_x(x, y) & = a + c * x + d * y \\ CPMV_y(x, y) & = b + e * x + f * y \end{cases}$$

where (x, y) is a corner position within the current coding block (e.g., (0, 0) for top-left corner CPMV, (width, 0) for top-right corner CPMV), {c, d, e, f} is one group of parameters from one neighboring block, {a, b} is another group of parameters from another neighboring block.

In another example, the CPMVs of the new candidates may be derived in below equation:

$$\begin{cases} CPMV_x(x, y) & = a + c * (x + \Delta w) + d * (y + \Delta h) \\ CPMV_y(x, y) & = b + e * (x + \Delta w) + f * (y + \Delta h) \end{cases}$$

where the (Δw, Δh) is the distance between the top-left corner of the current coding block and the top-left corner of one of the associated neighboring block(s) for one group of parameters, such as the associated neighboring block of the group of {a, b}. The definitions of the other parameters in this equation are the same as the example above. The parameters may be grouped in another way: (a, b, c, d, e, f) are formed as one group, while the (Δw, Δh) are formed as another group. And the two groups of parameters are from two different neighboring blocks. Alternatively, the value of (Δw, Δh) may be predefined as fixed values such as (0, 0) or at any constant values, which is not dependent on the distance between a neighboring block and the current block.

Figure 18:
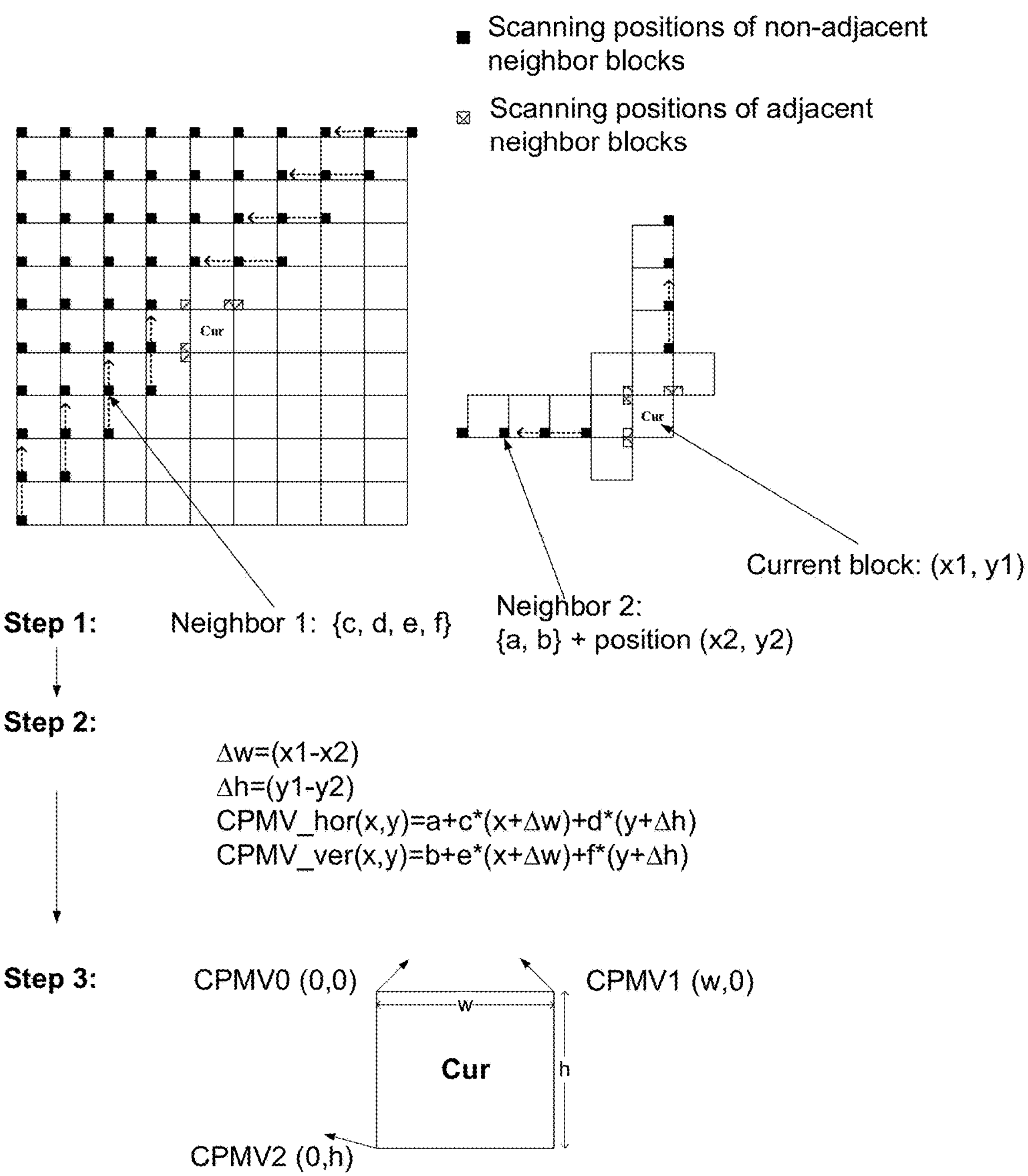
FIG. 18 illustrates an example of inheritance based derivation method for deriving affine constructed candidates in accordance with some examples of the present disclosure.

FIG. 18 shows an example of inheritance based derivation method for deriving affine constructed candidates. In FIG. 18, there are three steps to derive an affine constructed candidate. In Step 1, according to a specific grouping strategy, the encoder or the decoder may perform scanning of adjacent and non-adjacent neighboring blocks for each group. In the case of the FIG. 18, two groups are defined, where neighbor 1 is coded in affine mode and provides non-translational affine parameters, while neighbor 2 provides translational affine parameters. Neighbor 1 may be obtained according to the process in the Section of "Non-Adjacent Neighbor Based Derivation Process for Affine Inherited Merge Candidates" as shown in FIGS. 15A-15D and 17A while neighbor 1 may be an adjacent or non-adjacent neighbor block of the current block. Furthermore, neighbor 2 may be obtained according to the process as shown in FIGS. 16 and 17B.

In some embodiments, the neighbor 1, which is coded in the affine mode, may be scanned from adjacent or/and non-adjacent areas, by following above proposed scanning methods. In some embodiments, the neighbor 2, which is coded in the affine or a non-affine mode, may be also scanned from adjacent or non-adjacent areas. For example, the neighbor 2 may be from one of the scanned adjacent or non-adjacent areas if the motion information is not already used for deriving some affine merge or AMVP candidates, or from right-bottom positions of the current block if a collocated TMVP candidate at this position is available or/and already used for deriving some affine merge or AMVP candidates. Alternatively, a small coordinate offset (e.g., +1 or +2 or −1 or −2 for vertical or/and horizontal coordinates) may be applied when determining the position of neighbor 2 in order to provide a slightly diversified motion information for constructing a new candidate.

In Step 2, with the parameters and positions decided in Step 1, a specific affine model may be defined, which can derive different CPMVs according to the coordinate (x, y) of a CPMV. For examples, as shown in FIG. 18, the non-translational parameters {c, d, e, f} may be obtained based on neighbor 1 obtained in Step 1, and the translational parameters {a, b} may be obtained based on neighbor 2 obtained in Step 1. Furthermore, the distance parameters Δw, Δh may thus obtained based on the position of the current block $(x_1, y_1)$ and the position of neighbor 2 $(x_2, y_2)$. The distance parameters Δw, Δh may respectively indicate a horizontal distance and a vertical distance between the current block and neighbor 1 or neighbor 2. For example, the distance parameters Δw, Δh may respectively indicate the horizontal distance $(x_1-x_2)$ between the current block and neighbor 2 and the vertical distance $(y_1-y_2)$ between the current block and neighbor 2. Specifically, $\Delta w=x_1-x_2$ and $\Delta h=y_1-y_2$.

In Step 3, two or three CPMVs are derived for the current coding block, which can be constructed to form a new affine candidate In some embodiments, other prediction information may be further constructed. The prediction direction (e.g., bi or uni-predicted) and indexes of reference pictures may be the same as the associated neighboring blocks if neighboring blocks are checked to have the same directions and/or reference pictures. Alternatively, the prediction information is determined by reusing the minimum overlapped information among the associated neighboring blocks from different groups. For example, if only the reference index of one direction from one neighboring block is the same as the reference index of the same direction of the other neighboring block, the prediction direction of the new candidate is determined as uni-prediction, and the same reference index and direction are reused.

HMVP Based Derivation Method for Affine Constructed Merge Candidates

In the case of adjacent neighbor based derivation process, which is already defined in the current video standards VVC and AVS and described in the sections above and FIG. 7, a fixed order of scanning on adjacent neighbors is performed to identify two or three adjacent neighboring blocks. In the case of non-adjacent neighbor based derivation process, as proposed in earlier section and FIG. 17B, two non-adjacent neighbors are identified during another fixed order of scanning. In other words, for both the adjacent and non-adjacent neighbor based derivation methods, certain depth of local scanning is inevitable to identify a number of neighbors. This scanning process is dependent on the local buffering around each current block and also incurs certain amount of computation complexity.

On the other hand, the HMVP merge mode is already adopted in the current VVC and AVS, where the translational motion information from neighboring blocks are already stored in a history table, as described in the introduction section. In this case, the scanning process may be replaced by searching the HMVP table.

Therefore, for the previously proposed non-adjacent neighbor based derivation process and inheritance based derivation process, the translational motion information may be obtained from HMVP table, instead of the scanning method as shown in the FIG. 17B and FIG. 18. However, in order to derive affine constructed candidate afterwards, the position information, width, height and reference information are also needed, which may be accessible if the current HMVP table can be modified. Therefore, it is proposed to extend the HMVP table to store additional information in addition to the motion information of each history neighbor. In one embodiment, the additional information may include positions of an affine or non-affine neighboring blocks, or affine motion information such as CPMVs or equivalent regular motion derived from CPMVs (e.g., this regular motion may be from the internal sub-blocks of an affine coded neighboring block) reference index, etc.

Candidate Derivation Method for Affine AMVP And Regular Merge Mode

As described in the sections above, for affine AMVP mode, an affine candidate list is also needed for deriving CPMV predictors. As a result, all the above proposed derivation methods may be similarly applied to affine AMVP mode. The only difference is that when the above proposed derivation methods are applied in AMVP, the selected neighboring blocks must have the same reference picture index as the current coding block.

For regular merge mode, a candidate list is also constructed, but with only translational candidate MVs, not CPMVs. In this case, all the above proposed derivation methods can still be applied by adding an additional derivation step. In this additional derivation step, it is to derive a translation MV for the current block, which may be realized by selecting a specific pivot position (x, y) within the current block and then follow the same equation (3). In other words, for deriving CPMVs of an affine block, the three corner positions of the block are used as the pivot position (x, y) in equation (3), while for deriving translation MVs of regular inter-coded block, the center position of the block may be used as the pivot position (x, y) in equation (3). Once the translational MV is derived for the current block, it can be inserted to the candidate list as other candidates.

When new candidates are derived based on above proposed methods for affine AMVP and regular merge mode, the placement of the new candidates may be reordered.

In one embodiment, the newly derived candidates may be inserted into the affine AMVP candidate list by following the order as below:

(1) Inherited from adjacent spatial neighbors;
(2) Constructed from adjacent spatial neighbors;
(3) Inherited from non-adjacent spatial neighbors;
(4) Constructed from non-adjacent spatial neighbors;
(5) Translational MVs from adjacent spatial neighbors;
(6) Temporary MVs from adjacent temporal neighbors; and
(7) Zero MVs.

In another embodiment, the newly derived candidates may be inserted into the affine AMVP candidate list by following the order as below:

(1) Inherited from adjacent spatial neighbors;
(2) Constructed from adjacent spatial neighbors;
(3) Inherited from non-adjacent spatial neighbors;
(4) Translational MVs from adjacent spatial neighbors;
(5) Constructed from non-adjacent spatial neighbors;
(6) Temporary MVs from adjacent temporal neighbors; and
(7) Zero MVs.

In another embodiment, the newly derived candidates may be inserted into the affine AMVP candidate list by following the order as below:

(1) Inherited from adjacent spatial neighbors;
(2) Constructed from adjacent spatial neighbors;
(3) Translational MVs from adjacent spatial neighbors;
(4) Inherited from non-adjacent spatial neighbors;
(5) Constructed from non-adjacent spatial neighbors;
(6) Temporary MVs from adjacent temporal neighbors; and
(7) Zero MVs.

In another embodiment, the newly derived candidates may be inserted into the affine AMVP candidate list by following the order as below:

(1) Inherited from adjacent spatial neighbors;
(2) Constructed from adjacent spatial neighbors;
(3) Translational MVs from adjacent spatial neighbors;
(4) Temporary MVs from adjacent temporal neighbors;
(5) Inherited from non-adjacent spatial neighbors;
(6) Constructed from non-adjacent spatial neighbors; and
(7) Zero MVs.

In another embodiment, the newly derived candidates may be inserted into the affine AMVP candidate list by following the order as below:

(1) Inherited from adjacent spatial neighbors;
(2) Constructed from adjacent spatial neighbors;
(3) Translational MVs from adjacent spatial neighbors;
(4) Temporary MVs from adjacent temporal neighbors;
(5) Inherited from non-adjacent spatial neighbors; and
(6) Zero MVs.

In another embodiment, the newly derived candidates may be inserted into the regular merge candidate list by following the order as below:

(1) Spatial MVP from adjacent spatial neighbors;
(2) Temporal MVP from adjacent collocated neighbors;
(3) Spatial MVP from non-adjacent spatial neighbors;
(4) Inherited MVP from non-adjacent spatial affine neighbors;
(5) Constructed MVP from non-adjacent spatial neighbors;

(6) History-based MVP from a FIFO table;

(7) Pairwise average MVP; and (8) Zero MVs.

Reordering of Affine Merge Candidate List

In one embodiment, the non-adjacent spatial merge candidates may be inserted into the affine merge candidate list by following the order below: 1. Subblock-based Temporal Motion Vector Prediction (SbTMVP) candidate, if available; 2. Inherited from adjacent neighbors; 3. Inherited from non-adjacent neighbors; 4. Constructed from adjacent neighbors; 5. Constructed from non-adjacent neighbors; 6. Zero MVs.

In another embodiment, the non-adjacent spatial merge candidates may be inserted into the affine merge candidate list by following the order below: 1. SbTMVP candidate, if available; 2. Inherited from adjacent neighbors; 3. Constructed from adjacent neighbors; 4. Inherited from non-adjacent neighbors; 5. Constructed from non-adjacent neighbors; 6. Zero MVs.

In another embodiment, the non-adjacent spatial merge candidates may be inserted into the affine merge candidate list by following the order below: 1. SbTMVP candidate, if available; 2. Inherited from adjacent neighbors; 3. Constructed from adjacent neighbors; 4. One set of zero MVs; 5. Inherited from non-adjacent neighbors; 6. Constructed from non-adjacent neighbors; 7. Remaining zero MVs, if the list is still not full.

In another embodiment, the non-adjacent spatial merge candidates may be inserted into the affine merge candidate list by following the order below: 1. SbTMVP candidate, if available; 2. Inherited from adjacent neighbors; 3. Inherited from non-adjacent neighbors with distance smaller than X; 4. Constructed from adjacent neighbors; 5. Constructed from non-adjacent neighbors; 6. Constructed from inherited translational and non-translational neighbors; 7. Zero MVs, if the list is still not full.

In another embodiment, the non-adjacent spatial merge candidates may be inserted into the affine merge candidate list by following the order below: 1. SbTMVP candidate, if available; 2. Inherited from adjacent neighbors; 3. Inherited from non-adjacent neighbors; 4. The first candidate constructed from adjacent neighbors; 5. The first X candidates constructed from inherited translational and non-translational neighbors; 6. Constructed from non-adjacent neighbors; 7. Other Y candidates constructed from inherited translational and non-translational neighbors; 8. Zero MVs, if the list is still not full.

In some examples, where the value of X and Y may be a predefined fixed value such as the value of 2, or a signaled value (sequence/slice/block/CTU level signaled parameters) received by the decoder, or a configurable value at the encoder/decoder, or a dynamically decided value (e.g., X<=3, Y<=3) according to the number of available neighbors on the left and above of each individual coding block, or any combination of methods determining the value of X and Y. In one example, the value of X may be the same as the value of Y. In another example, the value of X may be different from the value of Y.

In another embodiment, the non-adjacent spatial merge candidates may be inserted into the affine merge candidate list by following the order below: 1. SbTMVP candidate, if available; 2. Inherited from adjacent neighbors; 3. Inherited from non-adjacent neighbors with distance smaller than X; 4. Constructed from adjacent neighbors; 5. Constructed from non-adjacent neighbors with distance smaller than Y; 6. Inherited from non-adjacent neighbors with distance bigger than X; 7. Constructed from non-adjacent neighbors with distance bigger than Y; 8. Zero MVs. In this embodiment, the value X and Y may be a predefined fixed value such as the value of 2, or a signaled value decided by the encoder, or a configurable value at the encoder or the decoder. In one example, the value of X may be the same as the value of Y. In another example, the value of N may be different from the value of M.

In some embodiments, if a new candidate is derived by using the inheritance based derivation method which constructs CPMVs by combining affine motion and translational MV, the placement of this new candidate may be dependent on the placement the other constructed candidates.

In one embodiment, for different constructed candidates, the reordering of the affine merge candidate list may follow the order as below:

(1) Constructed from adjacent spatial neighbors;

(2) Constructed from combining adjacent spatial affine neighbors and translational MVs;

(3) Constructed from non-adjacent spatial neighbors; and (4) Constructed from combining non-adjacent spatial affine neighbors and translational MVs.

In another embodiment, for different constructed candidates, the reordering of the affine merge candidate list may follow the order below:

(1) Constructed from adjacent spatial neighbors;

(2) Constructed from non-adjacent spatial neighbors;

(3) Constructed from combining adjacent spatial affine neighbors and translational MVs; and (4) Constructed from combining non-adjacent spatial affine neighbors and translational MVs.

Improved Reordering of Affine Candidate List

Based on the above proposed candidate derivation methods, one or more candidates may be derived for an existed affine merge candidate list, or an affine AMVP candidate list, or a regular merge candidate list, where the size of the corresponding list may be statically (e.g., configurable size) or adaptively (e.g., dynamically changed according to availability at encoder and then signaled to decoder) adjusted. Note that, when one or more new candidates is/are derived for regular merge candidate list, the new candidates are firstly derived as affine candidates, and then converted to translational motion vectors by using a pivot position (e.g., center sample or pixel position) within a coding block and associated affine models before insert into the regular merge candidate list.

In one or more embodiments, an adaptive reordering method such as ARMC may be applied to one or more of the above candidate lists after the candidate lists are updated or constructed by adding some new candidates which are derived by above proposed candidate derivation methods.

In another embodiment, a temporal candidate list may be created first, where the temporal candidate list may have a larger size than the existed candidate list (e.g., affine merge candidate list, affine AMVP candidate list, regular merge candidate list). Once the temporal candidate list is constructed by adding newly derived candidates and statically ordered by using above proposed insertion methods, an adaptive reordering method such as ARMC may be applied to reorder the temporal candidate list. After the adaptive reordering, the first N candidates of the temporal candidate list are inserted to the existed candidate lists, where the value of N may be a fixed or configurable value. In one example, the value of N may be the same as the size of the existed candidate list, where the selected N candidates from of the temporal candidate list are located.

In the above application scenarios of applying an adaptive reordering method such as ARMC, following methods may be used to improve the performance or/and reduce the complexity of the applied reordering methods.

In some embodiments, when a template matching cost is used for reordering different candidates, a cost function such as the sum of absolute differences (SAD) between samples of a template of the current block and their corresponding reference samples may be used. The reference samples of the template may be located by the same motion information of the current block. In case fractional motion information is used for the current block, an interpolation filtering process may be used to generate prediction samples of the template. Since the generated prediction samples are just used to comparing the motion accuracy between different candidates, not for final block reconstructions, the prediction accuracy of the template samples may be relaxed by using an interpolation filter with smaller tap. For example, in the case of adaptively reordering affine merge candidate list, a 2-tap or 4-tap interpolation filter may be used to generate prediction samples for the selected template of the current block. Or even the nearest integer samples (completely skip the interpolation filtering process) may be used as the prediction samples of the template. An interpolation filter with smaller tap may be similarly used when a template matching method is used to adaptively reorder the candidates in other candidate list such as regular merge candidate list or affine AMVP candidate list.

In some embodiments, when a template matching cost is used for reordering different candidates, a cost function such as the SAD between samples of a template of the current block and their corresponding reference samples may be used. The corresponding reference samples may be located at integer positions or fractional positions. When fractional positions are located, a certain level of prediction accuracy may be achieved by performing an interpolation filter process. Due to the limited prediction accuracy, the calculated matching costs for different candidates may contain noise level differences. To reduce the impact of the noise level cost difference, the calculated matching costs may be adjusted by removing a few bits of the least significance bits before candidate sorting process.

In some embodiments, a candidate list may be padded with zero MVs at the end of each list, if not enough candidates could be derived by using different derivation methods. In this case, the candidate cost may be only calculated for the first zero MV, while the remaining zero MVs may be statically assigned with an arbitrarily large cost value, such that these repeated zero MVs are placed at the end of the corresponding candidate list.

In some embodiments, all zero MVs may be statically assigned with an arbitrarily large cost value, such that all zero MVs are placed at the end of the corresponding candidate list.

In some embodiments, an early termination method may be applied for a reordering method to reduce complexity at the decoder side.

In one or more embodiments, when a candidate list is constructed, different types of candidates may be derived and inserted into the list. If one candidate or one type of candidates is not participated in the reorder process, but selected and signaled to the decoder, the reordering process, which is applied to other candidates, may be early terminated. In one example, in the case of applying ARMC for the affine merge candidate list, the SbTMVP candidate may be excluded from the reordering process. In this case, if the signaled merge index value for an affine coded block indicates a SbTMVP candidate at the decoder side, the ARMC process may be skipped or early terminated for this affine block.

In another embodiment, if one candidate or one type of candidates is not participated in the reorder process, but not selected and signaled to the decoder, both the derivation process and the reorder process for this specific candidate or this specific type of candidates may be skipped. Note that the skipped derivation process and reordering process are only applied to the specific candidate or the specific type of candidates, while the remaining candidates or types of candidates are still performed, where the derivation process is skipped indicates that the related operations of deriving the specific candidate or this specific type of candidates are skipped, but the predefined list position (e.g., according to a predefined insertion order) of the specific candidate or this specific type of candidates may be still kept, just the candidate content such as the motion information may be invalid due to skipped derivation process. Similarly, during the reordering process, the cost calculation of this specific candidate or this specific type of candidates may be skipped and the list position of this specific candidate or this specific type of candidates may be not changed after reordering other candidates.

Figure 21:
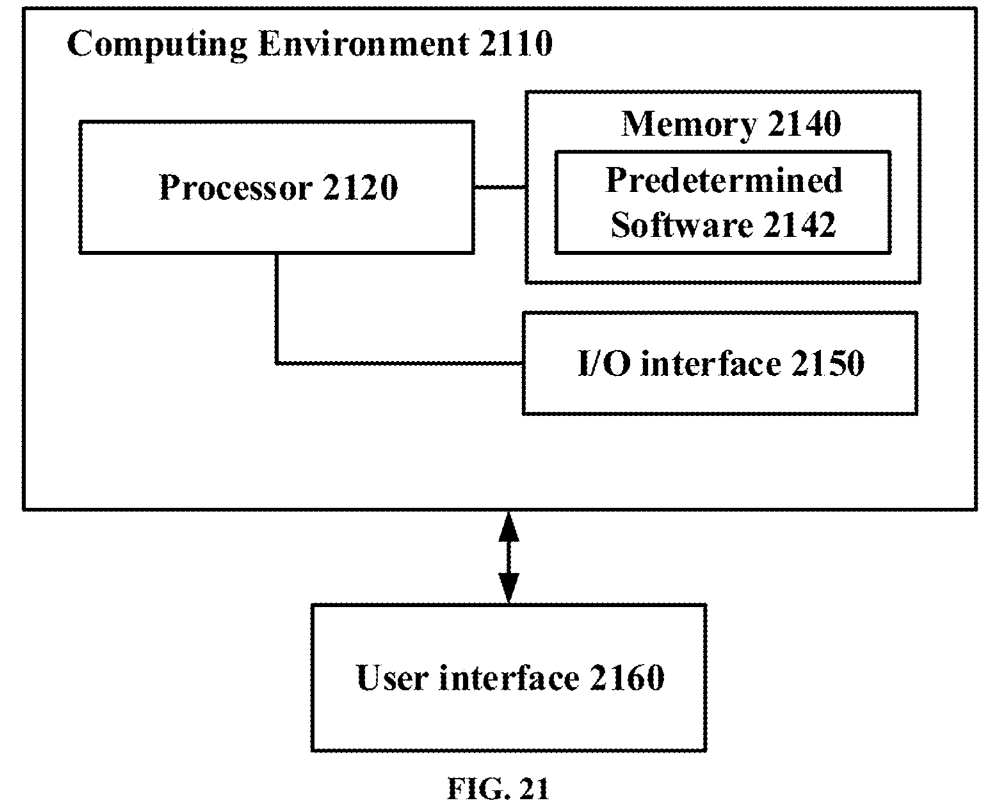
FIG. 21 is a diagram illustrating a computing environment coupled with a user interface in accordance with some examples of the present disclosure.

FIG. 21 shows a computing environment (or a computing device) 2110 coupled with a user interface 2160. The computing environment 2110 can be part of a data processing server. In some embodiments, the computing device 2110 can perform any of various methods or processes (such as encoding/decoding methods or processes) as described hereinbefore in accordance with various examples of the present disclosure. The computing environment 2110 may include a processor 2120, a memory 2140, and an I/O interface 2150.

The processor 2120 typically controls overall operations of the computing environment 2110, such as the operations associated with the display, data acquisition, data communications, and image processing. The processor 2120 may include one or more processors to execute instructions to perform all or some of the steps in the above-described methods. Moreover, the processor 2120 may include one or more modules that facilitate the interaction between the processor 2120 and other components. The processor may be a Central Processing Unit (CPU), a microprocessor, a single chip machine, a GPU, or the like.

The memory 2140 is configured to store various types of data to support the operation of the computing environment 2110. Memory 2140 may include predetermine software 2142. Examples of such data include instructions for any applications or methods operated on the computing environment 2110, video datasets, image data, etc. The memory 2140 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 2150 provides an interface between the processor 2120 and peripheral interface modules, such as a keyboard, a click wheel, buttons, and the like. The buttons may include but are not limited to, a home button, a start scan button, and a stop scan button. The I/O interface 2150 can be coupled with an encoder and decoder.

In some embodiments, there is also provided a non-transitory computer-readable storage medium including a plurality of programs, such as included in the memory 2140, executable by the processor 2120 in the computing environment 2110, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 2110 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Figure 22:
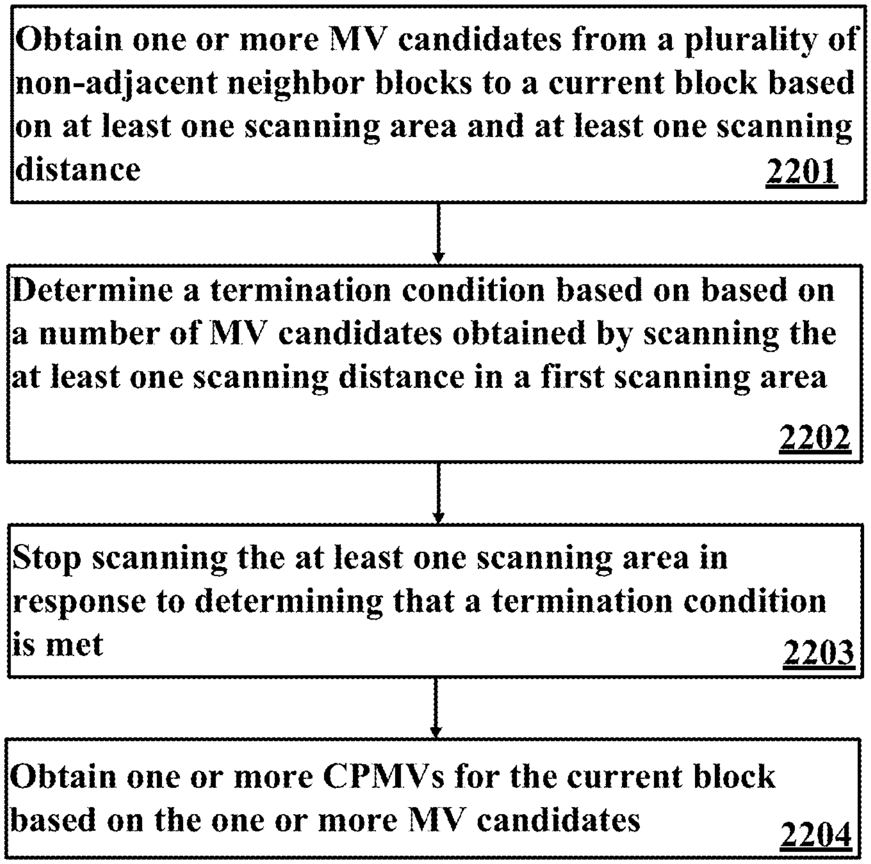
FIG. 22 is a flow chart illustrating a method for video decoding in accordance with some examples of the present disclosure.

FIG. 22 is a flowchart illustrating a method for video decoding according to an example of the present disclosure.

In step 2201, the processor 2120, at the decoder side, may obtain one or more MV candidates from a plurality of non-adjacent neighbor blocks to a current block based on at least one scanning area and at least one scanning distance, wherein one of the at least one scanning distance indicates a number of blocks away from one side of the current block.

In step 2202, the processor 2120 may determine a termination condition based on a number of MV candidates obtained by scanning the at least one scanning distance in a first scanning area, where the at least one scanning area may include the first scanning area.

In some examples, the processor 2120 may determine the termination condition based on a number of MV candidates obtained by scanning at a first scanning distance in the first scanning area, where the at least one scanning distance may include the first scanning distance.

In step 2203, the processor 2120 may stop scanning the at least one scanning area in response to determining that a termination condition is met.

In some examples, the termination condition may include following different scanning termination: determining that the number of MV candidates obtained by scanning at the first scanning distance in the first scanning area reaches a pre-determined first value, determining that the number of MV candidates obtained by scanning at the at least one scanning distance in the first scanning area reaches a pre-determined second value, or determining the number of MV candidates obtained by scanning at the first scanning distance in the first scanning area reaches the pre-determined first value and the number of MV candidates obtained by scanning at the at least one scanning distance in the first scanning area reaches the predetermined second value. In some examples, the pre-determined first value is the same as the pre-determined second value. In some examples, the pre-determined first value is different from the pre-determined second value.

For example, when the pre-determined first value is set to be 1, at one distance as illustrated in FIG. 8, scanning may be termination for this distance if the first qualified candidate is found and the scanning process is restarted from a different distance of the same area or the same or different distance of a different area.

For example, when the pre-determined second value is set to be 3, in one scanning area as illustrated in FIG. 8, scanning may be terminated for the whole area (e.g., left or above area of the current block) if the first 3 qualified candidates are found and the scanning process is restarted from the same or different distance of another area.

In some examples, the termination condition may include: determining that a number of MV candidates obtained by scanning at each of the at least one scanning distance reaches a pre-determined value, where the pre-determined value for each of the at least one scanning distance is the same or different. The first scanning area may be scanned at the at least one scanning distance based on this termination condition until the number of MV candidates obtained from the first scanning area reaches a pre-determined maximum value.

Figure 14A:
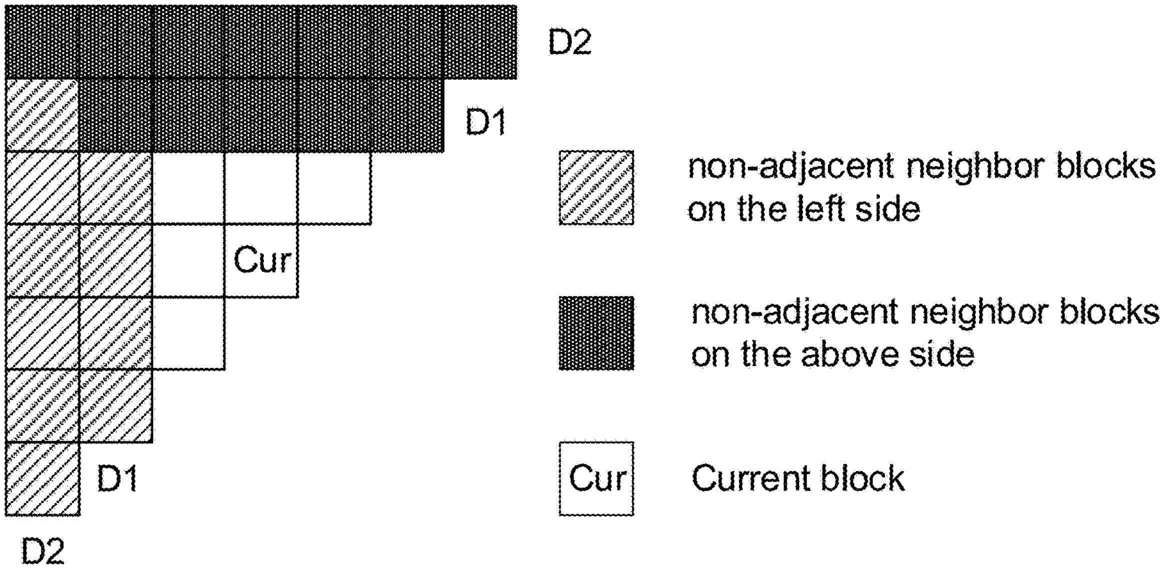
FIG. 14A illustrates an example of the bottom-left or top-right block of the bottommost or rightmost block in a previous distance is used as the bottommost or rightmost block of a current distance in accordance with some examples of the present disclosure.
Figure 14B:
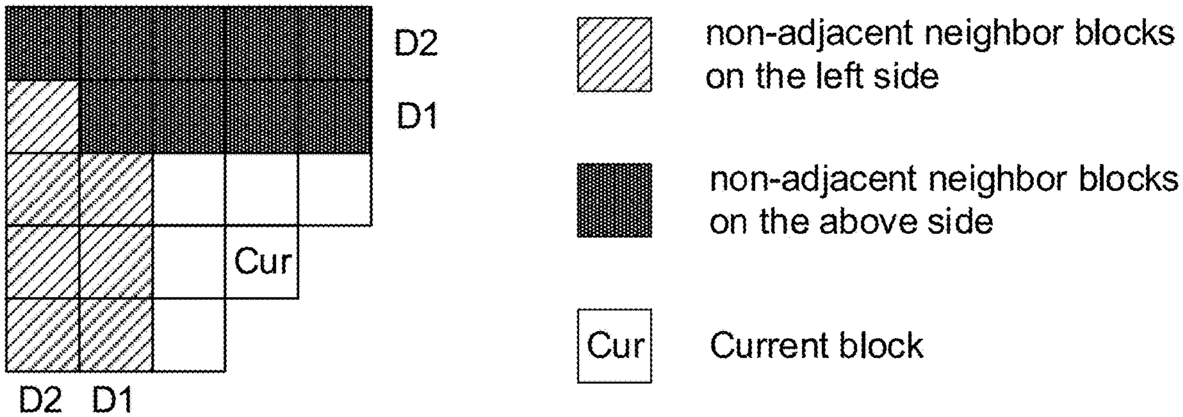
FIG. 14B illustrates an example of the left or top block of the bottommost or rightmost block in the previous distance is used as the bottommost or rightmost block of the current distance in accordance with some examples of the present disclosure.

In some examples, the at least one scanning area may include the first scanning area and a second scanning area, the first scanning area is scanned using a plurality of first scanning distances, the second scanning area is scanned using a plurality of second scanning distances. For example, as shown in FIGS. 8, 14A-14B, the first scanning area may be the left scanning area and the plurality of first scanning distances may include distance 1, distance 2, and distance 3. A first scanning distance may be one of distance 1, distance 2, or distance 3 used for scanning in the left scanning area. Additionally, the second scanning area may be the top/above scanning area and the plurality of scanning distances may include distance 1, distance 2, and distance 3. A second scanning distance may be one of distance 1, distance 2, or distance 3 used for scanning in the top/above scanning area.

As discussed above, in some examples, the area with "distance 2" in the left scanning area, i.e., the left side, of the current block indicates that the candidate neighbor blocks located in this area are 2 blocks away from the left side of the current block, along a direction perpendicular to left side. Furthermore, the area with "distance 1" on the left side of the current block indicates that the candidate neighbor blocks located in this area are 1 block away from the left side of the current block, along the perpendicular to left side, and the area with "distance 3" on the left side of the current block indicates that the candidate neighbor blocks located in this area are 3 block away from the left side of the current block, along the perpendicular to left side.

In some examples, the area with "distance 1" in the top/above scanning area, i.e., the left side, of the current block indicates that the candidate neighbor blocks located in this area are 1 block away from the top side of the current block, along a direction perpendicular to top side. Furthermore, the area with "distance 2" on the left side of the current block indicates that the candidate neighbor blocks located in this area are 2 blocks away from the top side of the current block, along the perpendicular to top side, and the area with "distance 3" on the top side of the current block indicates that the candidate neighbor blocks located in this area are 3 block away from the top side of the current block, along the perpendicular to top side.

Furthermore, the termination condition may include: determining that a number of MV candidates obtained by scanning the first scanning area reaches a pre-determined second value, or determining that a number of MV candidates obtained by scanning the second scanning area reaches a pre-determined third value, where the pre-determined second value is the same as or different from the pre-determined third value. Based on these termination conditions, the first scanning area may be scanned at the plurality of first scanning distances and the second scanning area may be scanned at the plurality of second scanning distances based on the termination condition until the number of MV candidates obtained by scanning the first scanning area and the second area reaches a pre-determined maximum value.

For example, the first scanning area may be the left scanning area and the second scanning area may be the top scanning area as shown in FIG. 8.

In step 2204, the processor 2120 may obtain one or more CPMVs for the current block based on the one or more MV candidates.

FIG. 23 is a flowchart illustrating a method for video encoding corresponding the method for video decoding as shown in FIG. 22.

In step 2301, the processor 2120, at the encoder side, may determine one or more candidates from a plurality of non-adjacent neighbor blocks to a current block based on at least one scanning area and at least one scanning distance, wherein one of the at least one scanning distance indicates a number of blocks away from one side of the current block.

In step 2302, the processor 2120 may determine a termination condition based on a number of MV candidates obtained by scanning the at least one scanning distance in a first scanning area, where the at least one scanning area may include the first scanning area.

In some examples, the processor 2120 may determine the termination condition based on a number of MV candidates obtained by scanning at a first scanning distance in the first scanning area, where the at least one scanning distance may include the first scanning distance.

In step 2303, the processor 2120 may stop scanning the at least one scanning are in response to determining that a termination condition is met.

In some examples, the termination condition may include following different scanning termination: determining that the number of MV candidates obtained by scanning at the first scanning distance in the first scanning area reaches a pre-determined first value, determining that the number of MV candidates obtained by scanning at the at least one scanning distance in the first scanning area reaches a pre-determined second value, or determining the number of MV candidates obtained by scanning at the first scanning distance in the first scanning area reaches the pre-determined first value and the number of MV candidates obtained by scanning at the at least one scanning distance in the first scanning area reaches the predetermined second value. In some examples, the pre-determined first value is the same as the pre-determined second value. In some examples, the pre-determined first value is different from the pre-determined second value.

For example, when the pre-determined first value is set to be 1, at one distance as illustrated in FIG. 8, scanning may be termination for this distance if the first qualified candidate is found and the scanning process is restarted from a different distance of the same area or the same or different distance of a different area.

For example, when the pre-determined second value is set to be 3, in one scanning area as illustrated in FIG. 8, scanning may be terminated for the whole area (e.g., left or above area of the current block) if the first 3 qualified candidates are found and the scanning process is restarted from the same or different distance of another area.

In some examples, the termination condition may include: determining that a number of MV candidates obtained by scanning at each of the at least one scanning distance reaches a pre-determined value, where the pre-determined value for each of the at least one scanning distance is the same or different. The first scanning area may be scanned at the at least one scanning distance based on this termination condition until the number of MV candidates obtained from the first scanning area reaches a pre-determined maximum value.

In some examples, the at least one scanning area may include the first scanning area and a second scanning area, the first scanning area is scanned using a plurality of first scanning distances, the second scanning area is scanned using a plurality of second scanning distances. For example, as shown in FIG. 8, the first scanning area may be the left scanning area and the plurality of first scanning distances may include distance 1, distance 2, and distance 3. A first scanning distance may be one of distance 1, distance 2, or distance 3 used for scanning in the left scanning area. Additionally, the second scanning area may be the top/above scanning area and the plurality of scanning distances may include distance 1, distance 2, and distance 3. A second scanning distance may be one of distance 1, distance 2, or distance 3 used for scanning in the top/above scanning area.

As discussed above, in some examples, the area with "distance 2" in the left scanning area, i.e., the left side, of the current block indicates that the candidate neighbor blocks located in this area are 2 blocks away from the left side of the current block, along a direction perpendicular to left side. Furthermore, the area with "distance 1" on the left side of the current block indicates that the candidate neighbor blocks located in this area are 1 block away from the left side of the current block, along the perpendicular to left side, and the area with "distance 3" on the left side of the current block indicates that the candidate neighbor blocks located in this area are 3 block away from the left side of the current block, along the perpendicular to left side.

In some examples, the area with "distance 1" in the top/above scanning area, i.e., the left side, of the current block indicates that the candidate neighbor blocks located in this area are 1 block away from the top side of the current block, along a direction perpendicular to top side. Furthermore, the area with "distance 2" on the left side of the current block indicates that the candidate neighbor blocks located in this area are 2 blocks away from the top side of the current block, along the perpendicular to top side, and the area with "distance 3" on the top side of the current block indicates that the candidate neighbor blocks located in this area are 3 block away from the top side of the current block, along the perpendicular to top side.

Furthermore, the termination condition may include: determining that a number of MV candidates obtained by scanning the first scanning area reaches a pre-determined second value, or determining that a number of MV candidates obtained by scanning the second scanning area reaches a pre-determined third value, where the pre-determined second value is the same as or different from the pre-determined third value. Based on these termination conditions, the first scanning area may be scanned at the plurality of first scanning distances and the second scanning area may be scanned at the plurality of second scanning distances based on the termination condition until the number of MV candidates obtained by scanning the first scanning area and the second area reaches a pre-determined maximum value.

For example, the first scanning area may be the left scanning area and the second scanning area may be the top scanning area as shown in FIG. 8.

In step 2304, the processor 2120 may determine one or more CPMVs for the current block based on the one or more MV candidates.

FIG. 24 is a flowchart illustrating a method for video decoding according to an example of the present disclosure.

In step 2401, the processor 2120, at the decoder side, may obtain one or more first parameters based on one or more first neighbor blocks of a current block.

In step 2402, the processor 2120 may obtain one or more second parameters based on the one or more first neighbor blocks and/or one or more second neighbor blocks of the current block.

In some examples, the one or more first neighbor blocks and the one or more second neighbor blocks may be obtained from a plurality of neighbor blocks to the current block based on at least one scanning area and at least one scanning distance, where one of the at least one scanning distance indicates a number of blocks away from one side of the current block.

In some examples, the one or more first neighbor blocks and the one or more second neighbor blocks may be obtained by exhaustively scanning the at least one scanning area at the at least one scanning distance.

For example, as shown in FIG. 18, Neighbor 1 is one first neighbor block which is obtained by scanning the left scanning area of the current block according to the derivation process for affine inherited merge candidates and one or more such first neighbor blocks may be obtained by exhaustively scanning the left scanning area and/or the top scanning area are at different scanning distances.

Further, as shown in FIG. 18, Neighbor 2 is one second neighbor block which is obtained by scanning the left scanning area of the current block according to the derivation process for affine constructed merge candidates and one or more such second neighbor blocks may be obtained by exhaustively scanning the left scanning area and/or the top scanning area are at different scanning distances.

In some examples, the at least one scanning area may include at least one of following areas: a first scanning area, a second scanning area, or a third scanning area. For example, the first scanning area is determined according to a first maximum scanning distance indicating a maximum number of blocks away from a left side of the current block, the second scanning area is determined according to a second maximum scanning distance indicating a maximum number of blocks away from a top side of the current block, and the first maximum scanning distance is the same as or different than the second maximum scanning distance, and the third scanning area is located at the right bottom of the current block and includes adjacent and non-adjacent areas to the current block.

For example, as shown in FIG. 18, the first scanning area may be the left scanning area of the current block, the second scanning area may be the top scanning area of the current block, and the third scanning area may be the right bottom adjacent and non-adjacent area of the current block.

In some examples, the processor 2120 may obtain one or more collocated temporal neighbor blocks from the third scanning area and determine not to scan the third scanning area to obtain the first neighbor block or the second neighbor block in response to determining that the one or more collocated temporal neighbor blocks are used for generating one or more affine constructed neighbor blocks.

In some examples, the processor 2120 may obtain one or more collocated temporal neighbor blocks from the third scanning area and determine to scan the third scanning area to obtain the first neighbor block or the second neighbor block in response to determining that the one or more collocated temporal neighbor blocks are used for generating one or more affine constructed neighbor blocks. Furthermore, the processor 2120 may determine not to scan the third scanning area to obtain the first neighbor block or the second neighbor block in response to determining that the one or more collocated temporal neighbor blocks are not used for generating one or more affine constructed neighbor blocks.

In some examples, the one or more first neighbor blocks may include a pre-determined first number of first neighbor blocks. For example, the first 1 or 2 neighbor blocks. In some examples, the one or more second neighbor blocks may include a pre-determined second number of second neighbor blocks. For examples, the first 3 or 4 neighbor blocks. The pre-determined first number is the same as or different from pre-determined second number.

In some examples, the processor 2120 may determine that the pre-determined first number of first neighbor blocks are valid in response to determining that the pre-determined first number of first neighbor blocks use a same reference picture for at least one motion direction; and determining that the pre-determined second number of second neighbor blocks are valid in response to determining that the pre-determined second number of second neighbor blocks use a same reference picture for at least one motion direction.

In some examples, the processor 2120 may obtain the one or more first neighbor blocks from a plurality of adjacent neighbor blocks and a plurality of non-adjacent neighbor blocks, where the plurality of adjacent neighbor blocks are adjacent to the current block, and the plurality of non-adjacent neighbor blocks are respectively located at a number of blocks away from one side of the current block. Furthermore, the processor 2120 may obtain the one or more second neighbor blocks from the plurality of adjacent neighbor blocks and the plurality of non-adjacent neighbor blocks.

In some examples, the processor 2120 may determine that the neighbor block is one of the one or more second neighbor blocks in response to determining that motion information of a neighbor block from the plurality of adjacent neighbor blocks and the plurality of non-adjacent neighbor blocks is not used for deriving an affine merge or AMVP candidate. Furthermore, the processor 2120 may determine that the collocated TMVP candidate is one of the one or more second neighbor blocks in response to determining that a collocated Temporal Motion Vector Prediction (TMVP) candidate in the third scanning area is available or the collocated TMVP candidate is used for deriving an affine merge or AMVP candidate.

In some examples, the processor 2120 may obtain adjusted positions for the one or more second neighbor blocks by applying a coordinate offset to the one or more second neighbor blocks and may obtain the one or more second parameters based on the adjusted positions of the one or more second neighbor blocks. For example, a small coordinate offset (e.g., +1 or +2 or −1 or −2 for vertical or/and horizontal coordinates) may be applied when determining the position of Neighbor 2 as shown in FIG. 18 in order to provide a slightly diversified motion information for constructing a new candidate.

In step 2403, the processor 2120 may construct one or more affine models using the one or more first parameters and the one or more second parameters.

In step 2404, the processor 2120 may obtaining one or more CPMVs for the current block based on the one or more affine models.

FIG. 25 is a flowchart illustrating a method for video encoding corresponding the method for video decoding as shown in FIG. 24.

In step 2501, the processor 2120, at the encoder side, may determine one or more first parameters based on one or more first neighbor blocks of a current block.

In step 2502, the processor 2120 may determine one or more second parameters based on the one or more first neighbor blocks and/or one or more second neighbor blocks of the current block.

In some examples, the one or more first neighbor blocks and the one or more second neighbor blocks may be determined from a plurality of neighbor blocks to the current block based on at least one scanning area and at least one scanning distance, where one of the at least one scanning distance indicates a number of blocks away from one side of the current block.

In some examples, the one or more first neighbor blocks and the one or more second neighbor blocks may be determined by exhaustively scanning the at least one scanning area at the at least one scanning distance.

For example, as shown in FIG. 18, Neighbor 1 is one first neighbor block which is determined by scanning the left scanning area of the current block according to the derivation process for affine inherited merge candidates and one or more such first neighbor blocks may be determined by exhaustively scanning the left scanning area and/or the top scanning area are at different scanning distances.

Further, as shown in FIG. 18, Neighbor 2 is one second neighbor block which is determined by scanning the left scanning area of the current block according to the derivation process for affine constructed merge candidates and one or more such second neighbor blocks may be determined by exhaustively scanning the left scanning area and/or the top scanning area are at different scanning distances.

In some examples, the at least one scanning area may include at least one of following areas: a first scanning area, a second scanning area, or a third scanning area. For example, the first scanning area is determined according to a first maximum scanning distance indicating a maximum number of blocks away from a left side of the current block, the second scanning area is determined according to a second maximum scanning distance indicating a maximum number of blocks away from a top side of the current block, and the first maximum scanning distance is the same as or different than the second maximum scanning distance, and the third scanning area is located at the right bottom of the current block and includes adjacent and non-adjacent areas to the current block.

For example, as shown in FIG. 18, the first scanning area may be the left scanning area of the current block, the second scanning area may be the top scanning area of the current block, and the third scanning area may be the right bottom adjacent and non-adjacent area of the current block.

In some examples, the processor 2120 may determine one or more collocated temporal neighbor blocks from the third scanning area and determine not to scan the third scanning area to determine the first neighbor block or the second neighbor block in response to determining that the one or more collocated temporal neighbor blocks are used for generating one or more affine constructed neighbor blocks. The one or more affine constructed neighbor blocks may include neighbor blocks derived based on non-adjacent neighbor based derivation process for affine constructed merge candidates, and also include neighbor blocks derived based on adjacent based derivation process.

In some examples, the processor 2120 may determine one or more collocated temporal neighbor blocks from the third scanning area and determine to scan the third scanning area to determine the first neighbor block or the second neighbor block in response to determining that the one or more collocated temporal neighbor blocks are used for generating one or more affine constructed neighbor blocks. Furthermore, the processor 2120 may determine not to scan the third scanning area to obtain the first neighbor block or the second neighbor block in response to determining that the one or more collocated temporal neighbor blocks are not used for generating one or more affine constructed neighbor blocks.

In some examples, the one or more first neighbor blocks may include a pre-determined first number of first neighbor blocks. For example, the first 1 or 2 neighbor blocks. In some examples, the one or more second neighbor blocks may include a pre-determined second number of second neighbor blocks. For examples, the first 3 or 4 neighbor blocks. The pre-determined first number is the same as or different from pre-determined second number.

In some examples, the processor 2120 may determine that the pre-determined first number of first neighbor blocks are valid in response to determining that the pre-determined first number of first neighbor blocks use a same reference picture for at least one motion direction; and determining that the pre-determined second number of second neighbor blocks are valid in response to determining that the pre-determined second number of second neighbor blocks use a same reference picture for at least one motion direction.

In some examples, the processor 2120 may determine the one or more first neighbor blocks from a plurality of adjacent neighbor blocks and a plurality of non-adjacent neighbor blocks, where the plurality of adjacent neighbor blocks are adjacent to the current block, and the plurality of non-adjacent neighbor blocks are respectively located at a number of blocks away from one side of the current block. Furthermore, the processor 2120 may determine the one or more second neighbor blocks from the plurality of adjacent neighbor blocks and the plurality of non-adjacent neighbor blocks.

In some examples, the processor 2120 may determine that the neighbor block is one of the one or more second neighbor blocks in response to determining that motion information of a neighbor block from the plurality of adjacent neighbor blocks and the plurality of non-adjacent neighbor blocks is not used for deriving an affine merge or AMVP candidate. Furthermore, the processor 2120 may determine that the collocated TMVP candidate is one of the one or more second neighbor blocks in response to determining that a collocated Temporal Motion Vector Prediction (TMVP) candidate in the third scanning area is available or the collocated TMVP candidate is used for deriving an affine merge or AMVP candidate.

In some examples, the processor 2120 may determine adjusted positions for the one or more second neighbor blocks by applying a coordinate offset to the one or more second neighbor blocks and may obtain the one or more second parameters based on the adjusted positions of the one or more second neighbor blocks. For example, a small coordinate offset (e.g., +1 or +2 or −1 or −2 for vertical or/and horizontal coordinates) may be applied when determining the position of Neighbor 2 as shown in FIG. 18 in order to provide a slightly diversified motion information for constructing a new candidate.

In step 2503, the processor 2120 may construct one or more affine models using the one or more first parameters and the one or more second parameters.

In step 2504, the processor 2120 may determine one or more CPMVs for the current block based on the one or more affine models.

FIG. 26 is a flowchart illustrating a method for video decoding according to an example of the present disclosure.

In step 2601, the processor 2120, at the decoder side, may obtain one or more MV candidates from one or more candidate lists according to a pre-determined order, where the one or more candidate lists may include an AMVP candidate list, a regular merge candidate list, and an affine merge candidate list, and the one or more MV candidates are from a plurality of neighbor blocks to a current block.

In some examples, the one or more MV candidates may include one or more MV candidates inherited from adjacent spatial neighbor blocks and one or more MV candidates constructed from adjacent spatial neighbor blocks, one or more translational MV candidates from adjacent spatial neighbor blocks and one or more temporary MV candidates from adjacent temporal neighbor blocks, and one or more MV candidates inherited from non-adjacent spatial neighbor blocks. The processor 2120 may further obtain from a candidate list the one or more MV candidates constructed from the adjacent spatial neighbor blocks after the one or more MV candidates inherited from the adjacent spatial neighbor blocks, obtain from the candidate list the one or more translational MV candidates from the adjacent spatial neighbor blocks after the one or more MV candidates constructed from the adjacent spatial neighbor blocks, obtain from the candidate list the one or more temporary MV candidates from the adjacent temporal neighbor blocks after the one or more translational MV candidates from the adjacent spatial neighbor blocks, and obtain from the candidate list the one or more MV candidates inherited from the non-adjacent spatial neighbor blocks after the one or more temporary MV candidates from the adjacent temporal neighbor blocks. For example, the newly derived candidates may be inserted into the affine AMVP candidate list by following the order below: 1. Inherited from adjacent spatial neighbors; 2. Constructed from adjacent spatial neighbors; 3. Translational MVs from adjacent spatial neighbors; 4. Temporary MVs from adjacent temporal neighbors; 5. Inherited from non-adjacent spatial neighbors; 6. Zero MVs.

In some examples, the one or more MV candidates may include a Subblock-based Temporal Motion Vector Prediction (SbTMVP) candidate, one or more MV candidates inherited from adjacent neighbor blocks and one or more MV candidates inherited from non-adjacent neighbor blocks, one or more MV candidates constructed from adjacent neighbor blocks and one or more MV candidates constructed from non-adjacent neighbor blocks, and one or more MV candidates constructed from inherited translational and non-translational neighbor blocks. The processor 2120 may further obtain from a candidate list the one or more MV candidates inherited from adjacent neighbor blocks after the SbTMVP candidate, obtain from the candidate list the one or more MV candidates inherited from non-adjacent neighbor blocks after the one or more MV candidates inherited from adjacent neighbor blocks, obtain from the candidate list the one or more MV candidates constructed from adjacent neighbor blocks after the one or more MV candidates inherited from non-adjacent neighbor blocks, obtain from the candidate list the one or more MV candidates constructed from non-adjacent neighbor blocks after the one or more MV candidates constructed from adjacent neighbor blocks, and obtain from the candidate list the one or more MV candidates constructed from inherited translational and non-translational neighbor blocks after the one or more MV candidates constructed from non-adjacent neighbor blocks. For example, the newly derived candidates may be inserted into the affine AMVP candidate list by following the order below: 1. SbTMVP candidate, if available; 2. Inherited from adjacent neighbors; 3. Inherited from non-adjacent neighbors; 4. Constructed from adjacent neighbors; 5. Constructed from non-adjacent neighbors; 6. Constructed from inherited translational and non-translational neighbors; 7. Zero MVs, if the list is still not full.

In some examples, the one or more MV candidates may include the one or more MV candidates include a Subblock-based Temporal Motion Vector Prediction (SbTMVP) candidate, one or more MV candidates inherited from adjacent neighbor blocks and one or more MV candidates inherited from non-adjacent neighbor blocks, a first MV candidate constructed from adjacent neighbor blocks and one or more MV candidates constructed from non-adjacent neighbor blocks, and one or more MV candidates constructed from inherited translational and non-translational neighbor blocks including a first number of MV candidates and a second number of MV candidates. The processor 2120 may further obtain from a candidate list the one or more MV candidates inherited from adjacent neighbor blocks after the SbTMVP candidate, obtain from the candidate list the one or more MV candidates inherited from non-adjacent neighbor blocks after the one or more MV candidates inherited from adjacent neighbor blocks, obtain from the candidate list the first MV candidate constructed from adjacent neighbor blocks after the one or more MV candidates inherited from non-adjacent neighbor blocks, obtain from the candidate list the first number of MV candidates constructed from inherited translational and non-translational neighbor blocks after the first MV candidate constructed from adjacent neighbor blocks, obtain from the candidate list the one or more MV candidates constructed from non-adjacent neighbor blocks after the first number of MV candidates constructed from inherited translational and non-translational neighbor blocks, and obtain from the candidate list the second number of MV candidates after the one or more MV candidates constructed from non-adjacent neighbor blocks.

In some examples, the first number and the second number may be determined in at least one of following manners: predefining the first number as a first fixed value; predefining the second number as a second fixed value, wherein the first fixed value is the same as or different from the second fixed value; receiving the first number or the second number by a decoder signaled at any level; configured the first number or the second number by the decoder or an encoder; or dynamically determining the first number and the second number according to a number of available neighbor blocks in a left area and a top area of the current block.

In step 2602, the processor 2120 may obtain one or more CPMVs for the current block based on the one or more MV candidates.

FIG. 27 is a flowchart illustrating a method for video encoding corresponding the method for video decoding as shown in FIG. 26.

In step 2701, the processor 2120, at the encoder side, may determine one or more MV candidates from one or more candidate lists according to a pre-determined order, where the one or more candidate lists may include an AMVP candidate list, a regular merge candidate list, and an affine merge candidate list, and the one or more MV candidates are from a plurality of neighbor blocks to a current block.

In some examples, the one or more MV candidates may include one or more MV candidates inherited from adjacent spatial neighbor blocks and one or more MV candidates constructed from adjacent spatial neighbor blocks, one or more translational MV candidates from adjacent spatial neighbor blocks and one or more temporary MV candidates from adjacent temporal neighbor blocks, and one or more MV candidates inherited from non-adjacent spatial neighbor blocks. The processor 2120 may further insert into a candidate list the one or more MV candidates constructed from the adjacent spatial neighbor blocks after the one or more MV candidates inherited from the adjacent spatial neighbor blocks, insert into the candidate list the one or more translational MV candidates from the adjacent spatial neighbor blocks after the one or more MV candidates constructed from the adjacent spatial neighbor blocks, insert into the candidate list the one or more temporary MV candidates from the adjacent temporal neighbor blocks after the one or more translational MV candidates from the adjacent spatial neighbor blocks, and insert into the candidate list the one or more MV candidates inherited from the non-adjacent spatial neighbor blocks after the one or more temporary MV candidates from the adjacent temporal neighbor blocks. For example, the newly derived candidates may be inserted into the affine AMVP candidate list by following the order below: 1. Inherited from adjacent spatial neighbors; 2. Constructed from adjacent spatial neighbors; 3. Translational MVs from adjacent spatial neighbors; 4. Temporary MVs from adjacent temporal neighbors; 5. Inherited from non-adjacent spatial neighbors; 6. Zero MVs.

In some examples, the one or more MV candidates may include a Subblock-based Temporal Motion Vector Prediction (SbTMVP) candidate, one or more MV candidates inherited from adjacent neighbor blocks and one or more MV candidates inherited from non-adjacent neighbor blocks, one or more MV candidates constructed from adjacent neighbor blocks and one or more MV candidates constructed from non-adjacent neighbor blocks, and one or more MV candidates constructed from inherited translational and non-translational neighbor blocks. The processor 2120 may further insert into a candidate list the one or more MV candidates inherited from adjacent neighbor blocks after the SbTMVP candidate, insert into the candidate list the one or more MV candidates inherited from non-adjacent neighbor blocks after the one or more MV candidates inherited from adjacent neighbor blocks, insert into the candidate list the one or more MV candidates constructed from adjacent neighbor blocks after the one or more MV candidates inherited from non-adjacent neighbor blocks, insert into the candidate list the one or more MV candidates constructed from non-adjacent neighbor blocks after the one or more MV candidates constructed from adjacent neighbor blocks, and insert into the candidate list the one or more MV candidates constructed from inherited translational and non-translational neighbor blocks after the one or more MV candidates constructed from non-adjacent neighbor blocks. For example, the newly derived candidates may be inserted into the affine AMVP candidate list by following the order below: 1. SbTMVP candidate, if available; 2. Inherited from adjacent neighbors; 3. Inherited from non-adjacent neighbors; 4. Constructed from adjacent neighbors; 5. Constructed from non-adjacent neighbors; 6. Constructed from inherited translational and non-translational neighbors; 7. Zero MVs. if the list is still not full.

In some examples, the one or more MV candidates may include the one or more MV candidates include a Subblock-based Temporal Motion Vector Prediction (SbTMVP) candidate, one or more MV candidates inherited from adjacent neighbor blocks and one or more MV candidates inherited from non-adjacent neighbor blocks, a first MV candidate constructed from adjacent neighbor blocks and one or more MV candidates constructed from non-adjacent neighbor blocks, and one or more MV candidates constructed from inherited translational and non-translational neighbor blocks including a first number of MV candidates and a second number of MV candidates. The processor 2120 may further insert into a candidate list the one or more MV candidates inherited from adjacent neighbor blocks after the SbTMVP candidate, insert into the candidate list the one or more MV candidates inherited from non-adjacent neighbor blocks after the one or more MV candidates inherited from adjacent neighbor blocks, insert into the candidate list the first MV candidate constructed from adjacent neighbor blocks after the one or more MV candidates inherited from non-adjacent neighbor blocks, insert into the candidate list the first number of MV candidates constructed from inherited translational and non-translational neighbor blocks after the first MV candidate constructed from adjacent neighbor blocks, insert into the candidate list the one or more MV candidates constructed from non-adjacent neighbor blocks after the first number of MV candidates constructed from inherited translational and non-translational neighbor blocks, and insert into the candidate list the second number of MV candidates after the one or more MV candidates constructed from non-adjacent neighbor blocks.

In some examples, the first number and the second number may be determined in at least one of following manners: predefining the first number as a first fixed value; predefining the second number as a second fixed value, wherein the first fixed value is the same as or different from the second fixed value; receiving the first number or the second number by a decoder signaled at any level; configured the first number or the second number by the decoder or an encoder; or dynamically determining the first number and the second number according to a number of available neighbor blocks in a left area and a top area of the current block.

In step 2702, the processor 2120 may determine one or more CPMVs for the current block based on the one or more MV candidates.

FIG. 28 is a flowchart illustrating a method for video decoding according to an example of the present disclosure.

In step 2801, the processor 2120, at the decoder side, may obtain a temporal candidate list with a first list size, where the first list size is greater than a list size of any existing candidate list including an affine merge candidate list, an AMVP candidate list, or a regular merge candidate list, and the temporal candidate list may include a plurality of MV candidates obtained from a plurality of neighbor blocks to a current block.

In some examples, the temporal candidate list may be created for a corresponding existing candidate list, and the corresponding existing candidate list may include the affine merge candidate list, the AMVP candidate list, or the regular merge candidate list. In some examples, for each existing candidate list, one temporal candidate list may be created. For example, a first temporal candidate list may be created for an affine merge candidate list, a second temporal candidate list may be created for an AMVP candidate list, and a third temporal candidate list may be created for a regular merge candidate list.

In some examples, the processor 2120 may apply adaptive reordering on the plurality of MV candidates in the temporal candidate list, and/or one or more MV candidates in one or more existing candidate lists.

In some examples, the processor 2120 may apply adaptive reordering on the plurality of MV candidates in the temporal candidate list and/or the one or more MV candidates in the corresponding existing candidate list in response to determining that the temporal candidate list is created for one existing candidate list. Further, the processor 2120 may apply adaptive reordering on the one or more MV candidates in the corresponding existing candidate list in response to determining that no temporal candidate list is created for one existing candidate list.

For example, for each existing candidate list, one temporal list may be or may not be created. If the temporal candidate list is created, adaptive reordering is applied on the temporal candidate list or/and the existing list. If the temporal candidate list is not created, adaptive reordering is applied only on the exiting candidate list.

In step 2802, the processor 2120 may obtain a first number of MV candidates from the temporal candidate list based on the plurality of MV candidates that are reordered, where the first number is smaller than a number of the plurality of MV candidates in the temporal candidate list.

In some examples, the first number of MV candidates may be obtained from the plurality of MV candidates that are adaptively reordered based on a TM cost between prediction samples of a template of the current block and corresponding references samples. Furthermore, the processor 2120 may use an interpolation filter with a tap number smaller than a predetermined tap number to generate the prediction samples in response to determining that fractional motion information is used for the current block or skip interpolation filtering and generating the prediction samples based on nearest integer samples in response to determining that the fractional motion information is used for the current block.

In some examples, the processor 2120 may apply interpolation filtering to the corresponding reference samples in response to determining that the corresponding reference samples are located at fractional positions.

In some examples, the processor 2120 may adjust the TM cost by removing one or more bits from the TM cost. For example, to reduce the impact of the noise level cost difference, the calculated matching costs may be adjusted by removing a few bits of the least significance bits before candidate sorting process.

In some examples, the processor 2120 may assign a predetermined fixed value to zero MV candidates except the first zero MV candidate in the temporal candidate list so as to place the zero MV candidates except the first zero MV candidate at the end of the temporal candidate list and/or a corresponding existing candidate list in response to determining that the temporal candidate list includes more than one zero MV candidates, where the predetermined fixed value is greater than a threshold value.

In some examples, the processor 2120 may assign the predetermined fixed value to zero MV candidates except the first zero MV candidate in the existing candidate list so as to place the zero candidates except the first zero MV candidate at the end of the existing candidate list in response to determining that an existing candidate list includes more one zero MV candidates.

In some examples, the processor 2120 may assign a predetermined fixed value to the at least one zero MV candidate so as to place all the at least one zero MV candidate at the end of the temporal candidate and/or a corresponding existing candidate list in response to determining that the temporal candidate list includes at least one zero MV candidate, where the predetermined fixed value is greater than a threshold value.

In some examples, the processor 2120 may assign the predetermined fixed value to the at least one zero MV candidate so as to place all the at least one zero MV candidate at the end of a existing candidate list in response to determining that the existing candidate list includes at least one zero MV candidate.

In some examples, the processor 2120 may skip applying the adaptive reordering for remaining MV candidates in the temporal candidate list and/or a corresponding existing candidate list in response to determining that one MV candidate or one type of MV candidates is not participated in the adaptive reordering.

In some examples, the processor 2120 may skip deriving the MV candidate or the type of MV candidates and/or skipping applying the adaptive reordering for the MV candidates or the type of MV candidates in response to determining that one MV candidate or one type of MV candidates is not participated in the adaptive reordering.

In some examples, the processor 2120 may skip deriving the MV candidate or the type of MV candidates so that candidate content of the MV candidate or the type of MV candidates are invalid and one or more positions of the MV candidate or the type of MV candidates in the temporal candidate list are remained and skip calculating the TM cost for the MV candidate or the type of MV candidates.

FIG. 29 is a flowchart illustrating a method for video encoding corresponding the method for video decoding as shown in FIG. 28.

In step 2901, the processor 2120, at the encoder side, may determine a temporal candidate list with a first list size, where the first list size is greater than a list size of any existing candidate list including an affine merge candidate list, an AMVP candidate list, or a regular merge candidate list, and the temporal candidate list may include a plurality of MV candidates obtained from a plurality of neighbor blocks to a current block.

In some examples, the temporal candidate list may be created for a corresponding existing candidate list, and the corresponding existing candidate list may include the affine merge candidate list, the AMVP candidate list, or the regular merge candidate list. In some examples, for each existing candidate list, one temporal candidate list may be created. For example, a first temporal candidate list may be created for an affine merge candidate list, a second temporal candidate list may be created for an AMVP candidate list, and a third temporal candidate list may be created for a regular merge candidate list.

In some examples, the processor 2120 may apply adaptive reordering on the plurality of MV candidates in the temporal candidate list, and/or one or more MV candidates in one or more existing candidate lists.

In some examples, the processor 2120 may apply adaptive reordering on the plurality of MV candidates in the temporal candidate list and/or the one or more MV candidates in the corresponding existing candidate list in response to determining that the temporal candidate list is created for one existing candidate list. Further, the processor 2120 may apply adaptive reordering on the one or more MV candidates in the corresponding existing candidate list in response to determining that no temporal candidate list is created for one existing candidate list.

For example, for each existing candidate list, one temporal list may be or may not be created. If the temporal candidate list is created, adaptive reordering is applied on the temporal candidate list or/and the existing list. If the temporal candidate list is not created, adaptive reordering is applied only on the exiting candidate list.

In step 2902, the processor 2120 may determine a first number of MV candidates from the temporal candidate list based on the plurality of MV candidates that are reordered, where the first number is smaller than a number of the plurality of MV candidates in the temporal candidate list.

In some examples, the first number of MV candidates may be obtained from the plurality of MV candidates that are adaptively reordered based on a TM cost between prediction samples of a template of the current block and corresponding references samples. Furthermore, the processor 2120 may use an interpolation filter with a tap number smaller than a predetermined tap number to generate the prediction samples in response to determining that fractional motion information is used for the current block or skip interpolation filtering and generating the prediction samples based on nearest integer samples in response to determining that the fractional motion information is used for the current block.

In some examples, the processor 2120 may apply interpolation filtering to the corresponding reference samples in response to determining that the corresponding reference samples are located at fractional positions.

In some examples, the processor 2120 may adjust the TM cost by removing one or more bits from the TM cost. For example, to reduce the impact of the noise level cost difference, the calculated matching costs may be adjusted by removing a few bits of the least significance bits before candidate sorting process.

In some examples, the processor 2120 may assign a predetermined fixed value to zero MV candidates except the first zero MV candidate in the temporal candidate list so as to place the zero MV candidates except the first zero MV candidate at the end of the temporal candidate list and/or a corresponding existing candidate list in response to determining that the temporal candidate list includes more than one zero MV candidates, where the predetermined fixed value is greater than a threshold value.

In some examples, the processor 2120 may assign the predetermined fixed value to zero MV candidates except the first zero MV candidate in the existing candidate list so as to place the zero candidates except the first zero MV candidate at the end of an existing candidate list in response to determining that the existing candidate list includes more one zero MV candidates.

In some examples, the processor 2120 may assign a predetermined fixed value to the at least one zero MV candidate so as to place all the at least one zero MV candidate at the end of the temporal candidate and/or a corresponding existing candidate list in response to determining that the temporal candidate list includes at least one zero MV candidate, where the predetermined fixed value is greater than a threshold value.

In some examples, the processor 2120 may assign the predetermined fixed value to the at least one zero MV candidate so as to place all the at least one zero MV candidate at the end of an existing candidate list in response to determining that the existing candidate list includes at least one zero MV candidate.

In some examples, the processor 2120 may skip applying the adaptive reordering for remaining MV candidates in the temporal candidate list and/or a corresponding existing candidate list in response to determining that one MV candidate or one type of MV candidates is not participated in the adaptive reordering.

In some examples, the processor 2120 may skip deriving the MV candidate or the type of MV candidates and/or skipping applying the adaptive reordering for the MV candidates or the type of MV candidates in response to determining that one MV candidate or one type of MV candidates is not participated in the adaptive reordering.

In some examples, the processor 2120 may skip deriving the MV candidate or the type of MV candidates so that candidate content of the MV candidate or the type of MV candidates are invalid and one or more positions of the MV candidate or the type of MV candidates in the temporal candidate list are remained and skip calculating the TM cost for the MV candidate or the type of MV candidates.

In some examples, there is provided an apparatus for video coding. The apparatus includes a processor 2120 and a memory 2140 configured to store instructions executable by the processor; where the processor, upon execution of the instructions, is configured to perform any method as illustrated in FIGS. 22-29.

In some other examples, there is provided a non-transitory computer readable storage medium, having instructions stored therein. When the instructions are executed by a processor 2120, the instructions cause the processor to perform any method as illustrated in FIGS. 22-29. In one example, the plurality of programs may be executed by the processor 2120 in the computing environment 2110 to receive (for example, from the video encoder 20 in FIG. 2) a bitstream or data stream including encoded video information (for example, video blocks representing encoded video frames, and/or associated one or more syntax elements, etc.), and may also be executed by the processor 2120 in the computing environment 2110 to perform the decoding method described above according to the received bitstream or data stream. In another example, the plurality of programs may be executed by the processor 2120 in the computing environment 2110 to perform the encoding method described above to encode video information (for example, video blocks representing video frames, and/or associated one or more syntax elements, etc.) into a bitstream or data stream, and may also be executed by the processor 2120 in the computing environment 2110 to transmit the bitstream or data stream (for example, to the video decoder 30 in FIG. 3). Alternatively, the non-transitory computer-readable storage medium may have stored therein a bitstream or a data stream including encoded video information (for example, video blocks representing encoded video frames, and/or associated one or more syntax elements etc.) generated by an encoder (for example, the video encoder 20 in FIG. 2) using, for example, the encoding method described above for use by a decoder (for example, the video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method of video decoding, comprising:

obtaining a first parameter based on a first neighbor block of a current block;

obtaining a second parameter based on at least one of the first neighbor block or a second neighbor block of the current block;

constructing an affine model using the first parameter and the second parameter; and obtaining a control point motion vector (CPMV) for the current block based on the affine model, wherein the first neighbor block and the second neighbor block are obtained from a plurality of neighbor blocks of the current block based on at least one scanning area and at least one scanning distance, wherein the at least one scanning distance indicates a number of blocks away from one side of the current block, wherein the first neighbor block and the second neighbor block are obtained by scanning the at least one scanning area at the at least one scanning distance with a scanning order from a smaller scanning distance to a larger scanning distance for a scanning area of the at least one scanning area.

2. The method of claim 1, wherein the at least one scanning area comprises at least one of a first scanning area, a second scanning area, or a third scanning area, the first scanning area is determined according to a first maximum scanning distance indicating a maximum number of blocks away from a left side of the current block, the second scanning area is determined according to a second maximum scanning distance indicating a maximum number of blocks away from a top side of the current block, and the first maximum scanning distance is the same as or different from the second maximum scanning distance, and the third scanning area is located at right bottom of the current block and comprises adjacent and non-adjacent areas to the current block, wherein the third scanning area is configured for obtaining a collocated temporal neighbor block.

3. The method of claim 2, further comprising:

obtaining a collocated temporal neighbor block from the third scanning area; and in response to determining that the collocated temporal neighbor block is used for generating an affine constructed neighbor block, determining not to scan the third scanning area to obtain the first neighbor block or the second neighbor block.

4. The method of claim 2, further comprising:

obtaining a collocated temporal neighbor block from the third scanning area;

in response to determining that the collocated temporal neighbor block is used for generating an affine constructed neighbor block, determining to scan the third scanning area to obtain the first neighbor block or the second neighbor block; and in response to determining that the collocated temporal neighbor block is not used for generating an affine constructed neighbor block, determining not to scan the third scanning area to obtain the first neighbor block or the second neighbor block.

5. The method of claim 1, wherein the first neighbor block is one of a pre-determined first number of first neighbor blocks, the second neighbor block is one of a pre-determined second number of second neighbor blocks, wherein the pre-determined first number is the same as or different from the pre-determined second number, the method further comprises:

in response to determining that the pre-determined first number of first neighbor blocks use a same reference picture for at least one motion direction, determining that the pre-determined first number of first neighbor blocks are valid; and in response to determining that the pre-determined second number of second neighbor blocks use a same reference picture for at least one motion direction, determining that the pre-determined second number of second neighbor blocks are valid.

6. The method of claim 1, further comprising:

obtaining the first neighbor block from adjacent neighbor blocks and non-adjacent neighbor blocks, wherein the adjacent neighbor blocks are adjacent to the current block, and the non-adjacent neighbor blocks are respectively located at a number of blocks away from one side of the current block; and obtaining the second neighbor block from the adjacent neighbor blocks and the non-adjacent neighbor blocks.

7. The method of claim 6, wherein the at least one scanning area comprises at least one of a first scanning area, a second scanning area, or a third scanning area, wherein the method further comprises:

in response to determining that motion information of a neighbor block from the adjacent neighbor blocks and the non-adjacent neighbor blocks is not used for deriving an affine merge or advanced motion vector prediction (AMVP) candidate, determining that the neighbor block is the second neighbor block; and in response to determining that a collocated Temporal Motion Vector Prediction (TMVP) candidate in the third scanning area is available or the collocated TMVP candidate is used for deriving an affine merge or AMVP candidate, determining that the collocated TMVP candidate is the second neighbor block.

8. The method of claim 1, further comprising:

obtaining an adjusted position for the second neighbor block by applying a coordinate offset to the second neighbor block; and obtaining the second parameter based on the adjusted position of the second neighbor block.

9. The method of claim 1, further comprising:

obtaining a motion vector (MV) candidate from a non-adjacent neighbor block to the current block based on the at least one scanning area and the at least one scanning distance;

determining a termination condition based on a number of MV candidates obtained by scanning the at least one scanning distance in a first scanning area, wherein the at least one scanning area comprises the first scanning area;

in response to determining that the termination condition is met, stopping scanning the at least one scanning area; and obtaining a control point motion vector (CPMV) for the current block based on the MV candidate.

10. The method of claim 9, wherein the termination condition comprises:

determining that the number of MV candidates obtained by scanning at a first scanning distance in the first scanning area reaches a pre-determined first value, determining that the number of MV candidates obtained by scanning at the at least one scanning distance in the first scanning area reaches a pre-determined second value, or determining that the number of MV candidates obtained by scanning at the first scanning distance in the first scanning area reaches the pre-determined first value and that the number of MV candidates obtained by scanning at the at least one scanning distance in the first scanning area reaches the pre-determined second value, wherein the pre-determined first value is the same as or different from the pre-determined second value.

11. The method of claim 9, wherein the termination condition comprises:

determining that a number of MV candidates obtained by scanning at at least one of the at least one scanning distance reaches a pre-determined value, wherein the pre-determined value for the at least one of the at least one scanning distance is the same or different, wherein the method further comprises:

scanning the first scanning area at the at least one scanning distance based on the termination condition until the number of MV candidates obtained from the first scanning area reaches a pre-determined maximum value.

12. The method of claim 9, wherein the at least one scanning area comprises the first scanning area and a second scanning area, the first scanning area is scanned using a plurality of first scanning distances, the second scanning area is scanned using a plurality of second scanning distances, wherein the termination condition comprises:

determining that the number of MV candidates obtained by scanning the first scanning area reaches a pre-determined third value; or determining that the number of MV candidates obtained by scanning the second scanning area reaches a pre-determined fourth value, wherein the pre-determined third value is the same as or different from the pre-determined fourth value, wherein the method further comprises:

scanning the first scanning area at the plurality of first scanning distances and scanning the second scanning area at the plurality of second scanning distances based on the termination condition until the number of MV candidates obtained by scanning the first scanning area and the second scanning area reaches a pre-determined maximum value.

13. An apparatus for video decoding, comprising:

one or more processors; and a memory coupled to the one or more processors and configured to store instructions executable by the one or more processors, wherein the one or more processors, upon execution of the instructions, are configured to perform operations comprising:

obtaining a first parameter based on a first neighbor block of a current block;

obtaining a second parameter based on at least one of the first neighbor block or a second neighbor block of the current block;

constructing an affine model using the first parameter and the second parameter; and obtaining a control point motion vector (CPMV) for the current block based on the affine model, wherein the first neighbor block and the second neighbor block are obtained from a plurality of neighbor blocks of the current block based on at least one scanning area and at least one scanning distance, wherein the scanning distance indicates a number of blocks away from one side of the current block, wherein the first neighbor block and the second neighbor block are obtained by scanning the at least one scanning area at the at least one scanning distance with a scanning order from a smaller scanning distance to a larger scanning distance for a scanning area of the at least one scanning area.

14. The apparatus for video decoding of claim 13, wherein the at least one scanning area comprise at least one of a first scanning area, a second scanning area, or a third scanning area, the first scanning area is determined according to a first maximum scanning distance indicating a maximum number of blocks away from a left side of the current block, the second scanning area is determined according to a second maximum scanning distance indicating a maximum number of blocks away from a top side of the current block, and the first maximum scanning distance is the same as or different from the second maximum scanning distance, and the third scanning area is located at the right bottom of the current block and comprises adjacent and non-adjacent areas to the current block.

15. The apparatus for video decoding of claim 13, wherein the first neighbor block is one of a pre-determined first number of first neighbor blocks, the second neighbor block is one of a pre-determined second number of second neighbor blocks, wherein the pre-determined first number is the same as or different from the pre-determined second number, wherein the operations further comprise:

in response to determining that the pre-determined first number of first neighbor blocks use a same reference picture for at least one motion direction, determining that the pre-determined first number of first neighbor blocks are valid; and in response to determining that the pre-determined second number of second neighbor blocks use a same reference picture for at least one motion direction, determining that the pre-determined second number of second neighbor blocks are valid.

16. The apparatus for video decoding of claim 13, wherein the operations further comprise:

obtaining the first neighbor block from adjacent neighbor blocks and non-adjacent neighbor blocks, wherein the adjacent neighbor blocks are adjacent to the current block, and the non-adjacent neighbor blocks are respectively located at a number of blocks away from one side of the current block; and obtaining the second neighbor block from the adjacent neighbor blocks and the non-adjacent neighbor blocks.

17. The apparatus for video decoding of claim 16, wherein the at least one scanning area comprises at least one of a first scanning area, a second scanning area, or a third scanning area, wherein the operations further comprise:

in response to determining that motion information of a neighbor block from the adjacent neighbor blocks and the non-adjacent neighbor blocks is not used for deriving an affine merge or advanced motion vector prediction (AMVP) candidate, determining that the neighbor block is a second neighbor block; and in response to determining that a collocated Temporal Motion Vector Prediction (TMVP) candidate in the third scanning area is available or the collocated TMVP candidate is used for deriving an affine merge or AMVP candidate, determining that the collocated TMVP candidate is a second neighbor block.

18. The apparatus for video decoding of claim 13, wherein the operations further comprise:

obtaining an adjusted position for the second neighbor block by applying a coordinate offset to the second neighbor block; and obtaining the second parameter based on the adjusted position of the second neighbor block.

19. The apparatus for video decoding of claim 13, wherein the operations further comprise:

obtaining a motion vector (MV) candidate from a non-adjacent neighbor block to a current block based on the at least one scanning area and the at least one scanning distance;

determining a termination condition based on a number of MV candidates obtained by scanning the at least one scanning distance in a first scanning area, wherein the at least one scanning area comprises the first scanning area;

in response to determining that the termination condition is met, stopping scanning the at least one scanning area; and obtaining a control point motion vector (CPMV) for the current block based on the MV candidate.

20. A non-transitory computer-readable storage medium storing a bitstream and instructions which when executed by a computing device having one or more processors, cause the one or more processors to perform an encoding method comprising:

determining a first parameter based on a first neighbor block of a current block;

determining a second parameter based on at least one of the first neighbor block or a second neighbor block of the current block;

constructing an affine model using the first parameter and the second parameter; and determining a control point motion vector (CPMV) for the current block based on the affine model, wherein the first neighbor block and the second neighbor block are determined from a plurality of neighbor blocks of the current block based on at least one scanning area and at least one scanning distance, wherein the scanning distance indicates a number of blocks away from one side of the current block, wherein the first neighbor block and the second neighbor block are determined by scanning the at least one scanning area at the at least one scanning distance with a scanning order from a smaller scanning distance to a larger scanning distance for a scanning area of the at least one scanning area.

* * * * *